US006646573B1

(12) United States Patent
Kushler et al.

(10) Patent No.: US 6,646,573 B1
(45) Date of Patent: Nov. 11, 2003

(54) REDUCED KEYBOARD TEXT INPUT SYSTEM FOR THE JAPANESE LANGUAGE

(75) Inventors: Clifford A. Kushler, Lynnwood, WA (US); Edward P. Flinchem, Seattle, WA (US); Ethan R. Bradford, Seattle, WA (US); Daiju Matsuo, Seattle, WA (US)

(73) Assignee: America Online, Inc., Dulles, VA (US)

( * ) Notice: Subject to any disclaimer, the term of this patent is extended or adjusted under 35 U.S.C. 154(b) by 0 days.

(21) Appl. No.: 09/454,406

(22) Filed: Dec. 3, 1999

Related U.S. Application Data

(60) Provisional application No. 60/110,890, filed on Dec. 4, 1998.

(51) Int. Cl.[7] .......................... H03M 1/22; H03K 17/94

(52) U.S. Cl. .......................... 341/28; 341/22; 400/110; 707/535

(58) Field of Search ..................... 341/22, 28; 400/110; 379/93.18, 93.27, 368; 345/171; 707/535, 536

(56) References Cited

U.S. PATENT DOCUMENTS 3,967,273 A 6/1976 Knowlton (List continued on next page.)

FOREIGN PATENT DOCUMENTS

EP 0 319 193 A2 6/1989
EP 0 319 193 A3 6/1989

(List continued on next page.)

OTHER PUBLICATIONS

Arnott, J.L., et al., "Probabilistic Character Disambiguation for Reduced Keyboards Using Small Text Samples," *AAC Augmentative and Alternative Communication,* vol. 8, Sep. 1992, pp. 215–223.

(List continued on next page.)

*Primary Examiner*—Timothy Edwards
(74) *Attorney, Agent, or Firm*—Glenn Patent Group; Michael A. Glenn

(57) ABSTRACT

A reduced keyboard system for the Japanese language which uses word-level disambiguation of entered keystroke sequences, and which enables the user to select the desired interpretation of an ambiguous input key sequence as kana, and then select the desired textual interpretation associated with the selected kana interpretation. The system uses a highly compressed database format which has several advantages in terms of reduced size and minimal processing requirements during operation. Also disclosed is a reduced keyboard system which uses sequences of two keystrokes to specify each syllable, including the syllables with palatalized vowels that are written with two kana each. Input sequences of keystrokes are interpreted as ordered pairs of keystrokes which select a character according to its position in a two-dimensional matrix. The first keystroke of each ordered pair specifies the row of the matrix in which the desired character appears, and the second keystroke of each pair specifies the column. The organization of the characters in the first five columns of the matrix conforms to the manner in which the Japanese syllabary is learned and conceptualized by a native Japanese speaker. An additional three columns are organized in a manner that corresponds with the natural model of how the syllables with palatalized vowels are formed (each as a combination of two kana). Up to two more specialized columns are added to handle two special cases that do not fit into the simple patterns of the first eight columns.

56 Claims, 34 Drawing Sheets

U.S. PATENT DOCUMENTS

| | | | |
|---|---|---|---|
| 4,191,854 A | | 3/1980 | Coles |
| 4,339,806 A | | 7/1982 | Yoshida |
| 4,360,892 A | | 11/1982 | Endfield |
| 4,396,992 A | | 8/1983 | Hayashi et al. |
| 4,427,848 A | | 1/1984 | Tsakanikas |
| 4,442,506 A | | 4/1984 | Endfield |
| 4,464,070 A | | 8/1984 | Hanft et al. |
| 4,481,508 A | | 11/1984 | Kamei et al. |
| 4,544,276 A | | 10/1985 | Horodeck |
| 4,649,563 A | | 3/1987 | Riskin |
| 4,661,916 A | | 4/1987 | Baker et al. |
| 4,669,901 A | | 6/1987 | Feng |
| 4,674,112 A | | 6/1987 | Kondraske et al. |
| 4,677,659 A | | 6/1987 | Dargan |
| 4,744,050 A | | 5/1988 | Hirosawa et al. |
| 4,754,474 A | | 6/1988 | Feinson |
| RE32,773 E | | 10/1988 | Goldwasser et al. |
| 4,807,181 A | | 2/1989 | Duncan, IV et al. |
| 4,817,129 A | | 3/1989 | Riskin |
| 4,866,759 A | | 9/1989 | Riskin |
| 4,872,196 A | | 10/1989 | Royer et al. |
| 4,891,786 A | | 1/1990 | Goldwasser |
| 4,969,097 A | | 11/1990 | Levin |
| 5,031,206 A | | 7/1991 | Riskin |
| 5,067,103 A | | 11/1991 | Lapeyre |
| 5,131,045 A | | 7/1992 | Roth |
| 5,163,084 A | | 11/1992 | Kim et al. |
| 5,200,988 A | | 4/1993 | Riskin |
| 5,218,538 A | | 6/1993 | Zhang |
| 5,229,936 A | | 7/1993 | Decker et al. |
| 5,255,310 A | | 10/1993 | Kim et al. |
| 5,258,748 A | | 11/1993 | Jones |
| 5,289,394 A | | 2/1994 | Lapeyre |
| 5,305,205 A | | 4/1994 | Weber et al. |
| 5,339,358 A | | 8/1994 | Danish et al. |
| 5,388,061 A | | 2/1995 | Hankes |
| 5,392,338 A | | 2/1995 | Danish et al. |
| 5,535,421 A | | 7/1996 | Weinreich |
| 5,664,896 A | | 9/1997 | Blumberg |
| 5,786,776 A | | 7/1998 | Kisaichi et al. |
| 5,818,437 A | | 10/1998 | Grover et al. |
| 5,847,697 A | | 12/1998 | Sugimoto |
| 5,936,556 A | * | 8/1999 | Sakita ......................... 341/28 |
| 5,952,942 A | | 9/1999 | Balakrishnan et al. |
| 6,005,498 A | | 12/1999 | Yang et al. |
| 6,054,941 A | * | 4/2000 | Chen ........................... 341/28 |
| 6,098,086 A | * | 8/2000 | Krueger et al. ............. 707/535 |

FOREIGN PATENT DOCUMENTS

| | | |
|---|---|---|
| EP | 0 464 726 A3 | 1/1992 |
| EP | 0 464 726 A2 | 1/1992 |
| EP | 0 540 147 A3 | 5/1993 |
| EP | 0 540 147 A2 | 5/1993 |
| EP | 0 651 315 A1 | 5/1995 |
| EP | 0 660 216 A1 | 6/1995 |
| EP | 0 732 646 A2 | 9/1996 |
| GB | 2 298 166 A | 8/1996 |
| WO | WO 82/00442 | 2/1982 |
| WO | WO 90/07149 | 6/1990 |
| WO | WO 96/27947 | 9/1996 |
| WO | WO 97/04580 | 2/1997 |
| WO | WO 97/05541 | 2/1997 |

OTHER PUBLICATIONS

Foulds, R., et al., "Lexical Prediction Techniques Applied to Reduce Motor Requirements for Augmentative Communication," *RESNA 10th Annual Conference,* San Jose, CA, 1987, pp. 115–117.

Foulds, R.A., et al., "Statistical Disambiguation of Multi–Character Keys Applied to Reduce Motor Requirements for Augmentative and Alternative Communication," *AAC Augmentative and Alternative Communication* (1987), pp. 192–195.

IBM Technical Disclosure Bulletin, "*Speed Keyboard for Data Processor,*" vol. 23, 3 pages, Jul. 1980. © IBM Corp., 1993.

Kamphuis, H., et al., "Katdas; A Small Number of Keys Direct Access System," *RESNA 12th Annual Conference,* New Orleans, Louisiana, 1989, pp. 278–279.

King, M.T., "JustType™—Efficient Communication with Eight Keys," *Proceedings of the RESNA '95 Annual Conference,* Vancouver, BC, Canada, 1995, 3 pages.

Kreifeldt, J.G., et al., "Reduced Keyboard Designs Using Disambiguation," *Proceedings of the Human Factors Society 33rd Annual Meeting,* 1989, pp. 441–444.

Levine, S.H., "An Adaptive Approach to Optimal Keyboard Design for Nonvocal Communication," *IEEE,* 1985, pp. 334–337.

Levine, S.H., et al., "Adaptive Technique for Customized Interface Design With Application to Nonvocal Communication," *RESNA 9th Annual Conference,* Minneapolis, Minnesota, 1986, pp. 399–401.

Levine, S.H., et al., "Computer Disambiguation of Multi–Character Key Text Entry: An Adaptive Design Approach," *IEEE,* 1986, pp. 298–301.

Levine, S.H., et al., "Multi–Character Key Text Entry Using Computer Disambiguation," *RESNA 10th Annual Conference,* San Jose, California, 1987, pp. 177–178.

Matias, E., et al., "Half–QWERTY: Typing With One Hand Using Your Two–Handed Skills," *Conference Companion, CHI '94,* (Apr. 24–28, 1994), pp. 51–52.

Minneman, S.L., "A Simplified Touch–Tone® Telecommunication Aid for Deaf and Hearing Impaired Individuals," *RESNA 8th Annual Conference,* Memphis Tennessee, 1985, pp. 209–211.

Oommen, B.J., et al., "Correction to 'An Adaptive Learning Solution to the Keyboard Optimization Problem'," *IEEE Transactions on Systems, Man, and Cybernetics,* vol. 22, No. 5 (Oct. 1992) pp. 1233–1243.

Smith, Sidney L., et al., "Alphabetic Data Entry Via the Touch–Tone Pad: A Comment," *Human Factors,* 13(2), Apr. 1971, pp. 189–190.

Sugimoto, M., et al., "SHK: Single Hand Key Card for Mobile Devices," *CHI 1996* (Apr. 13–18, 1996), pp. 7–8.

Swiffin, A.L., et al., "Adaptive and Predictive Techniques in a Communication Prosthesis," *AAC Augmentative and Alternative Communication,* (1987), pp. 181–191.

Swiffin, A.L., et al., "PAL: An Effort Efficient Portable Communication Aid and Keyboard Emulator," *RESNA 8th Annual Conference,* Memphis, Tennessee, 1985, pp. 197, 199.

Witten, I.H., Principles of Computer Speech, New York: Academic Press, (1982), pp. 246–253.

* cited by examiner

A Logical Symbol Index Table for Japanese

552 {

| | 1 | 2 | 3 | 4 | 5 | 6 | 7 | 8 | 9 | 10 |
|---|---|---|---|---|---|---|---|---|---|---|
| 1 | い | う | お | あ | え | い | え | あ | お | う |
| 2 | か | く | き | こ | け | | | | | |
| 3 | し | さ | す | せ | そ | | | | | |
| 4 | て | つ | と | つ | ち | た | | | | |
| 5 | な | に | の | ね | ぬ | | | | | |
| 6 | は | ひ | ふ | ほ | へ | | | | | |
| 7 | ま | み | も | め | む | | | | | |
| 8 | よ | ゆ | よ | や | や | ゆ | | | | |
| 9 | り | ゐ | ら | れ | ろ | | | | | |
| 10 | ん | - | わ | を | | | | | | |
| 11 | '' | ° | | | | | | | | |

550 {   551

Alternate Instruction Semantics for Secondary Instructions

Semantics for Frequency/Class Specification

| Level 1 | Level 2 | Level 3 |
|---|---|---|
| 2 か | 2 か | 2 か |
| Y1: **Y0 + か**<br>M1:M0 + 化<br>M2:M0 + 課<br>M3:M0 + 火<br>M4:M0 + 科<br>:<br>M17:M0 + 価<br>:<br>M23:M0 + 稼<br>M24:M0 + 箇<br>M25:M0 + 描<br>M26:M0 + 何<br>M27:M0 + 欠<br>M28:M0 + 書<br>M29:M0 + 賀<br>Y2: **Y0 + き**<br>M1:M0 + 期<br>M2:M0 + 器<br>M3:M0 + 機<br>M4:M0 + 危<br>M5:M0 + 気<br>: | Y1: **Y1+く**{かく}<br>M1:M0 + 各<br>M2:M0 + 核<br>M3:M28 + く{書く}<br>M4:M0 + 閣<br>M5:M0 + 画<br>M6:M26 + く{描く}<br>M7:M0 + 格<br>M8:M0 + 角<br>M9:M27 + く{欠く}<br>M10:M0 + 確<br>M11:M0 + 拡<br>M12:M0 + 殻<br>M13:M0 + 獲<br>M14:M29+[M3]{ 賀来}<br>M15:M0 + 劃<br>M16:M0 + 掴<br>Y2: **Y0 + く**{こく}<br>M1:M0 + 国<br>M2:M0 + 石<br>: | Y1: **Y16+く**{かかく}<br>M1:M2 + [M7]{ 価格}<br>Y2: **Y11+く**{きかく}<br>M1:M5 + [M5]{企画}<br>M2:M6 + [M7]{規格}<br>Y3: **Y17+く**{きこく}<br>M1:M1 + [M1]{帰国}<br>:<br>:<br>:<br>Y9: **Y1+か**{かくか}<br>M1:M1 + [M2]{各課}<br>:<br>:<br>:<br>:<br>Y13: **Y11+き**{きかき}<br>M1:M2 + [M2]{気化器} |

FIG. 18

| Level 1 | Level 2 | Level 3 |
| --- | --- | --- |
| 2 か | 2 か | 2 か |
| Y2: Y0 + き<br>(continued)<br>M6:M0 + 帰<br>M7:M0 + 企<br>M8:M0 + 幾<br>M9:M0 + 規<br>M9:M0 + 聞<br>:<br>Y3: Y0 + く<br>M1:M0 + 九<br>M2:M0 + 区<br>M3:M0 + 来<br>:<br>Y4: Y0 + こ<br>M1:M0 + 個<br>M2:M0 + 子<br>M3:M0 + 小<br>:<br>Y5: Y0 + け<br>M1:M0 + 気<br>M2:M0 + 毛<br>M3:M0 + 消<br>: | Y3: Y2 + き{きき}<br>M1:M3 + [M2]{機器}<br>M2:M4 + [M3]{危機}<br>:<br>Y4: Y4 + こ{ここ}<br>: M1:M1 + 々{個々}<br>:<br>Y11: Y2 + か{きか}<br>: M1:M6 + [M1]{帰化}<br>: M2:M5 + [M1]{気化}<br>: M3:M10 + か {聞か}<br>: M4:M8 +[M26]{幾何}<br>: M5:M7 + P {企□}<br>: M6:M9 + P {規□}<br>: :<br>: :<br>Y16: Y1 + か{かか}<br>M1:M28 + か{書か}<br>M2:M17 + P{価□}<br>Y17: Y2 + こ{きこ}<br>: M1:M6 + P{帰□}<br>:<br>: | |

FIG. 18 (continued)

Example 1

Object displayed at insertion point 88

After key 21: お
After key 25: あの
After key 22: おなか
After key 68: うなぎ
After key 21: おねがい
After key 62: お願い
After key 23: お願いし
After key 27: お願いしま
After key 23: お願いします
After key 60: お願いします

Example 2

Object displayed at insertion point 88

After key 21: お
After key 29: いる
After key 22: いらく
After key 68: ありが
After key 24: いりぐち
After key 21: ありがとう
After key 22: ありがとうご
After key 23: ありがとうござ
After key 21: ありがとうござい
After key 27: ありがとうございま
After key 23: ありがとうございます

Example 3

Object displayed at insertion point 88

After key 22: か
After key 25: この
After key 60: この
After key 60: くに
After key 62: 国
After key 62: 邦
After key 62: クニ
After key 62: くに
After key 62: 国
After key 60: くに
After key 60: かね
After key 62: 金
After key 62: 鍾
After press-and-hold of key 62: 金

Example 1

Object displayed at insertion point 88

After key 21: お
After key 22: いか
After key 24: あきだ
After key 24: あかつち
After key 22: あかつちか
After key 24: おくつてきだ
After key 68: うきだつけど
After key 23: うかつだけどさ
After key 21: おくつてください
After key 62: 送つてください

FIG. 19

Basic Japanese Syllabary

| | | | | |
|---|---|---|---|---|
| あ A | い I | う U | え E | お O |
| か KA | き KI | く KU | け KE | こ KO |
| さ SA | し SHI | す SU | せ SE | そ SO |
| た TA | ち CHI | つ TSU | て TE | と TO |
| な NA | に NI | ぬ NU | ね NE | の NO |
| は HA | ひ HI | ふ FU | へ HE | ほ HO |
| ま MA | み MI | む MU | め ME | も MO |
| や YA | - - | ゆ YU | - - | よ YO |
| ら RA | り RI | る RU | れ RE | ろ RO |
| わ WA | - - | - - | - - | を WO |
| ん N | - - | - - | - - | - - |

FIG. 20

Additional Japanese Syllabary Using Diacritics

| | | | | |
|---|---|---|---|---|
| が GA | ぎ GI | ぐ GU | げ GE | ご GO |
| ざ ZA | じ JI | ず ZU | ぜ ZE | ぞ ZO |
| だ DA | ぢ JI | づ ZU | で DE | ど DO |
| ば BA | び BI | ぶ BU | べ BE | ぼ BO |
| ぱ PA | ぴ PI | ぷ PU | ぺ PE | ぽ PO |

FIG. 21

Japanese Syllabary with Palatalized Vowels

| | | |
|---|---|---|
| きゃ KYA | きゅ KYU | きょ KYO |
| ぎゃ GYA | ぎゅ GYU | ぎょ GYO |
| しゃ SHA | しゅ SHU | しょ SHO |
| じゃ JA | じゅ JU | じょ JO |
| ちゃ CHA | ちゅ CHU | ちょ CHO |
| にゃ NYA | にゅ NYU | にょ NYO |
| ひゃ HYA | ひゅ HYU | ひょ HYO |
| びゃ BYA | びゅ BYU | びょ BYO |
| ぴゃ PYA | ぴゅ PYU | ぴょ PYO |
| みゃ MYA | みゅ MY | みょ MYO |
| りゃ RYA | りゅ RYU | りょ RYO |

FIG. 22

Classifying Matrix for Japanese Syllabary

| Key 1→ / Key 2↓ | ア | イ | ウ | エ | オ | セ | ユ | ヨ | ツ | ソ |
|---|---|---|---|---|---|---|---|---|---|---|
| ア | あ A | い I | う U | え E | お O | | | | | |
| カ | か KA | き KI | く KU | け KE | こ KO | きゃ KYA | きゅ KYU | きょ KYO | | |
| サ | さ SA | し SHI | す SU | せ SE | そ SO | しゃ SHA | しゅ SHU | しょ SHO | | |
| タ | た TA | ち CHI | つ TSU | て TE | と TO | ちゃ CHA | ちゅ CHU | ちょ CHO | っ (tsu) | |
| ナ | な NA | に NI | ぬ NU | ね NE | の NO | にゃ NYA | にゅ NYU | にょ NYO | | |
| ハ | は HA | ひ HI | ふ FU | へ HE | ほ HO | ひゃ HYA | ひゅ HYU | ひょ HYO | | |
| マ | ま MA | み MI | む MU | め ME | も MO | みゃ MYA | みゅ MYU | みょ MYO | | |
| ヤ | や YA | | ゆ YU | | よ YP | ゃ (ya) | ゅ (yu) | ょ (yo) | | |
| ラ | ら RA | り RI | る RU | れ RE | ろ RO | りゃ RYA | りゅ RYU | りょ RYO | | |
| ワ ン | わ WA | | | | を WO | | | | | ん N |

FIG. 23a

Classifying Matrix for Japanese Syllabary

| Key 2→<br>Key 1↓ | 1 | 2 | 3 | 4 | 5 | 6 | 7 | 8 | 9 | 0 |
|---|---|---|---|---|---|---|---|---|---|---|
| ア | あ<br>A | い<br>I | う<br>U | え<br>E | お<br>O | ぁ<br>(a) | ぃ<br>(i) | ぅ<br>(u) | ぇ<br>(e) | ぉ<br>(o) |
| カ | か<br>KA | き<br>KI | く<br>KU | け<br>KE | こ<br>KO | | きゃ<br>KYA | きゅ<br>KYU | きょ<br>KYO | |
| サ | さ<br>SA | し<br>SHI | す<br>SU | せ<br>SE | そ<br>SO | | しゃ<br>SHA | しゅ<br>SHU | しょ<br>SHO | |
| タ | た<br>TA | ち<br>CHI | つ<br>TSU | て<br>TE | と<br>TO | っ<br>(tsu) | ちゃ<br>CHA | ちゅ<br>CHU | ちょ<br>CHO | |
| ナ | な<br>NA | に<br>NI | ぬ<br>NU | ね<br>NE | の<br>NO | | にゃ<br>NYA | にゅ<br>NYU | にょ<br>NYO | |
| ハ | は<br>HA | ひ<br>HI | ふ<br>FU | へ<br>HE | ほ<br>HO | | ひゃ<br>HYA | ひゅ<br>HYU | ひょ<br>HYO | |
| マ | ま<br>MA | み<br>MI | む<br>MU | め<br>ME | も<br>MO | | みゃ<br>MYA | みゅ<br>MYU | みょ<br>MYO | |
| ヤ | や<br>YA | | ゆ<br>YU | | よ<br>YP | | ゃ<br>(ya) | ゅ<br>(yu) | ょ<br>(yo) | |
| ラ | ら<br>RA | り<br>RI | る<br>RU | れ<br>RE | ろ<br>RO | | りゃ<br>RYA | りゅ<br>RYU | りょ<br>RYO | |
| ワ ン | わ<br>WA | | | | を<br>WO | | ん<br>N | | —<br>(long vowel) | |

FIG. 23b

Alternative Classifying Matrix for Japanese Syllabary

| Key 2→ Key 1↓ | ア | イ | ウ | エ | オ | セ | ユ | ヨ | ツ ソ |
|---|---|---|---|---|---|---|---|---|---|
| ア | あ A | い I | う U | え E | お O | や YA | ゆ YU | よ YO | |
| カ | か KA | き KI | く KU | け KE | こ KO | き や KYA | き ゆ KYU | き よ KYO | |
| サ | さ SA | し SHI | す SU | せ SE | そ SO | し や SHA | し ゆ SHU | し よ SHO | |
| タ | た TA | ち CHI | つ TSU | て TE | と TO | ち や CHA | ち ゆ CHU | ち よ CHO | っ (tsu) |
| ナ | な NA | に NI | ぬ NU | ね NE | の NO | に や NYA | に ゆ NYU | に よ NYO | |
| ハ | は HA | ひ HI | ふ FU | へ HE | ほ HO | ひ や HYA | ひ ゆ HYU | ひ よ HYO | |
| マ | ま MA | み MI | む MU | め ME | も MO | み や MYA | み ゆ MYU | み よ MYO | |
| ラ | ら RA | り RI | る RU | れ RE | ろ RO | り や RYA | り ゆ RYU | り よ RYO | |
| ワ ン | わ WA | | | | を WO | | | | ん N |

FIG. 24

REDUCED KEYBOARD TEXT INPUT SYSTEM FOR THE JAPANESE LANGUAGE

This application claims benefit of Provisional application Ser. No. 60/110,890 filed Dec. 4, 1998.

FIELD OF THE INVENTION

The invention relates generally to reduced keyboard systems, and more specifically to reduced keyboard systems generating text composed of the hiragana, katakana and kanji characters of the Japanese language.

BACKGROUND OF THE INVENTION

For many years, portable computers have been getting smaller and smaller. The principal size-limiting component in the effort to produce a smaller portable computer has been the keyboard. If standard typewriter-size keys are used, the portable computer must be at least as large as the keyboard. Miniature keyboards have been used on portable computers, but the miniature keyboard keys have been found to be too small to be easily or quickly manipulated by a user.

Incorporating a full-size keyboard in a portable computer also hinders true portable use of the computer. Most portable computers cannot be operated without placing the computer on a flat work surface to allow the user to type with both hands. A user cannot easily use a portable computer while standing or moving. In the latest generation of small portable computers, called Personal Digital Assistants (PDAs) or palm-sized computers, companies have attempted to address this problem by incorporating handwriting recognition software in the device. A user may directly enter text by writing on a touch-sensitive panel or screen. This handwritten text is then converted by the recognition software into digital data. Unfortunately, in addition to the fact that printing or writing with a pen is in general slower than typing, the accuracy and speed of the handwriting recognition software has to date been less than satisfactory. In the case of the Japanese language, with its large number of complex characters, the problem becomes especially difficult. To make matters worse, today's handheld computing devices which require text input are becoming smaller still. Recent advances in two-way paging, cellular telephones, and other portable wireless technologies has led to a demand for small and portable two-way messaging systems, and especially for systems which can both send and receive electronic mail ("e-mail").

It would therefore be advantageous to develop a keyboard for entry of text into a computer device that is both small and operable with one hand while the user is holding the device with the other hand. Prior development work has considered use of a keyboard that has a reduced number of keys. As suggested by the keypad layout of a touch-tone telephone, many of the reduced keyboards have used a 3-by-4 array of keys. A number of the keys in the array are associated with multiple characters. There is therefore a need for a method for the user to indicate which of the characters associated with a given key is the desired character.

One suggested approach for unambiguously specifying hiragana characters entered on a reduced keyboard requires the user to enter two or more keystrokes to specify each kana. The keystrokes may be entered either simultaneously (chording) or in sequence (multiple-stroke specification). Neither chording nor multiple-stroke specification has produced a keyboard having adequate simplicity and efficiency of use. Multiple-stroke specification is inefficient, and chording is often complicated to learn and use.

Each syllable in the Japanese syllabary consists of either a single vowel, or a consonant followed by a vowel. There are two exceptions: the syllable ん which has no vowel, and the "small" っ which is used to indicate the "doubling" or "hardening" of the pronunciation of the following consonant. These syllables can be written as hiragana (commonly used when writing native Japanese words) or katakana (commonly used when writing words of foreign origin). The term kana is used to refer to either hiragana or katakana. The syllabary is commonly represented as a table of rows and columns (shown in Table 1), wherein each row may have up to five entries in columns corresponding to the five Japanese vowels あ,い,う,え, and お. Each row corresponds to an initial consonant, although a given consonant may undergo sound changes for certain entries in a row (e.g. s(a)さ⇒sh(i)し; t(a)た⇒ts(u)つ; etc.). The first row consists of five syllables corresponding to each of the five vowels with no initial consonant. The 8$^{th}$ row consists of the palatalized vowels や,ゆ, and よ (YI and YE are not used in modern Japanese). The diacritic marks " and ° are used to indicate changes in the pronunciation of the consonant, generally indicating a change from an unvoiced to a voiced consonant. Table 2 shows the basic syllables formed by adding the diacritic marks " and ° to syllables in Table 1. Smaller versions of the syllables や,ゆ, and よ are also used in combination with syllables in the second, or "い" columns of Tables 1 and 2 to represent syllables consisting of the corresponding consonant and the palatalized vowel (e.g. き followed by "small" ゃ to represent きゃ). These syllables with palatalized vowels are thus written as a pair of kana, as shown in Table 3, which includes forms written with diacritic marks.

Lexicographic order in Japanese is generally represented by the sequence of syllables in the first column (corresponding to the vowel A) of Table 1: あ,か,さ,た,な, は,ま,や,ら,わ, and ん, where each of these syllables (except ん) represents a sub-class of up to five syllables composed from the vowels あ,い,う,え, and お, in that order. Currently, products such as cellular telephones that require Japanese text input generally use a multiple-stroke specification method wherein each of nine keys is associated with each of the first nine rows (あ through ら). Multiple strokes on a key are used to indicate which of the syllables of the corresponding row is intended, wherein each additional stroke on a key sequentially changes the character to be output to the character appearing in the next column of Table 1 or 2. A separating key or a timeout method is used to allow entry of consecutive characters associated with the same key. A tenth key is used for the syllables わ,を,ん, and the katakana "bo" symbol, which indicates a vowel-only syllable that repeats the vowel of the preceding syllable. The "small" や,ゆ, and よ are also associated with the や key, requiring additional keystrokes to be selected. An additional key is commonly used to add the diacritic marks following a syllable.

Entering Japanese hiragana (or katakana) using a reduced keyboard continues to be a challenging problem. With the current multi-stroking approach as described above, generating a single kana syllable requires an average of at least three keystrokes. Syllables with palatalized vowels which are represented by two characters (i.e. those in Table 3 consisting of a syllable from the second, or "い", column of Tables 1 and 2, followed by a "small" や,ゆ, or よ) can require up to eight keystrokes to generate. It would therefore be desirable to develop a reduced keyboard system that tends to minimize the number of keystrokes required to enter hiragana, and is also simple and intuitive to use.

Typing standard Japanese text, which includes Chinese characters (kanji) in addition to kana, on a reduced keyboard is an even more challenging problem. Entering text on a standard computer with a full keyboard and a large display is generally achieved by first typing the pronunciation of the desired text using the letters of the Latin alphabet (called "romaji" in Japanese) corresponding to each hiragana syllable as shown in Tables 1–3. As the letters are typed, the input is automatically converted to the corresponding hiragana syllables and displayed on the screen. In many cases, the user then needs to convert the text which is initially displayed as hiragana into the specific textual interpretation desired. The hiragana that are displayed represent the phonetic reading of the combination of kanji and hiragana that the user actually wants to enter, and which conveys the user's intended meaning. Due to the large number of homophones in the Japanese language, there can be a number of possible meaningful combinations of kanji and hiragana that correspond to the hiragana input by the user. On a standard computer, a number of these alternative conversions can be displayed where, for example, each alternative is associated with a numeric key so that pressing the key converts the input hiragana to the displayed kanji interpretation. Additional complications arise when trying to implement this process on a small hand-held device due to the limited display size and the small number of keys available.

An alternative approach for specifying hiragana entered on a reduced keyboard allows the user to enter each hiragana with a single keystroke. Each key of the reduced keyboard is associated with multiple hiragana characters. As a user enters a sequence of keys, there is therefore ambiguity in the resulting output since each keystroke may indicate one of several hiragana. The system must therefore provide a means by which the user can efficiently indicate which of the possible interpretations of each keystroke was intended. Several approaches have been suggested for resolving the ambiguity of the keystroke sequence.

A number of suggested approaches for determining the correct character sequence that corresponds to an ambiguous keystroke sequence are summarized in the article "Probabilistic Character Disambiguation for Reduced Keyboards Using Small Text Samples," published in the Journal of the International Society for Augmentative and Alternative Communication by John L. Arnott and Muhammad Y. Javad (hereinafter the "Arnott article"). The Arnott article notes that the majority of disambiguation approaches employ known statistics of character sequences in the relevant language to resolve character ambiguity in a given context. That is, existing disambiguating systems statistically analyze ambiguous keystroke groupings as they are being entered by a user to determine the appropriate interpretation of the keystrokes. The Arnott article also notes that several disambiguating systems have attempted to use word level disambiguation to decode text from a reduced keyboard. Word level disambiguation processes complete words by comparing the entire sequence of received keystrokes with possible matches in a dictionary after the receipt of an unambiguous character signifying the end of the word. The Arnott article discusses many of the disadvantages of word-level disambiguation. For example, word level disambiguation oftentimes fails to decode a word correctly, because of the limitations in identifying unusual words and the inability to decode words that are not contained in the dictionary. Because of the decoding limitations, word level disambiguation does not give error-free decoding of unconstrained English text with an efficiency of one keystroke per character. The Arnott article therefore concentrates on character level disambiguation rather than word level disambiguation, and indicates that character level disambiguation appears to be the most promising disambiguation technique. However, in contrast to alphabetic languages, each hiragana character in Japanese represents a syllable, rather than a single letter that represents what is essentially a phoneme. For this reason, character level disambiguation is inefficient in the Japanese language because there are almost no constraints on possible sequences of hiragana, and the probability distribution of hiragana sequences is not skewed enough for this approach to be effective.

Still another suggested approach is disclosed in a textbook entitled *Principles of Computer Speech,* authored by I. H. Witten, and published by Academic Press in 1982 (hereinafter the "Witten approach"). Witten discusses a system for reducing ambiguity from text entered using a telephone touch pad. Witten recognizes that for approximately 92% of the words in a 24,500 word English dictionary, no ambiguity will arise when comparing the keystroke sequence with the dictionary. When ambiguities do arise, however, Witten notes that they must be resolved interactively by the system presenting the ambiguity to the user and asking the user to make a selection between the number of ambiguous entries. A user must therefore respond to the system's prediction at the end of each word. Such a response slows the efficiency of the system and increases the number of keystrokes required to enter a given segment of text.

In the case of the Japanese language, users of word processing software are accustomed to having to select from a number of ambiguous interpretations following the entry of a word due to the large number of homophones in the language. The same sequence of kana can frequently be converted to two or more different kanji interpretations. Thus, after entering a sequence of kana, the user is generally required to select the desired kanji conversion from a set of possible choices, and often is also required to somehow confirm that the correct conversion was selected. When the hiragana are entered using a reduced keyboard, there is also ambiguity as to what the user actually intends as the sequence of hiragana to be converted to kanji. As a result, the number of possible interpretations is greatly increased.

Disambiguating an ambiguous keystroke sequence continues to be a challenging problem. As noted in the publications discussed above, satisfactory solutions that minimize the number of keystrokes required to enter a segment of text have failed to achieve the necessary efficiencies to be acceptable for use in a portable computer. It would therefore be desirable to develop a disambiguating system that resolves the ambiguity of entered keystrokes while minimizing the total number of keystrokes required, within the context of a simple and easy to understand user interface. Such a system would thereby maximize the efficiency of text entry.

An effective reduced keyboard input system for the Japanese language must satisfy all of the following criteria. First, the arrangement of the syllables of the Japanese language (kana) on the keyboard, and the method by which they are generated, must be easy for a native speaker to understand and learn to use. Second, the system must tend to minimize the number of keystrokes required to enter text in order to enhance the efficiency of the reduced keyboard system. Third, the system must reduce the cognitive load on the user by reducing the amount of attention and decision-making required during the input process. Fourth, the approach should minimize the amount of memory and processing resources needed to implement a practical system.

Kisaichi et al. [JP 8-314920; U.S. Pat. No. 5,786,776; EP 0 732 646 A2] disclose an approach wherein the keys 1–0 of a telephone keypad are labeled with the hiragana syllables {あいうえお}, {かきくけこ}, {さしすせそ}, {なにぬねの}, {たちつてと}, {はひふへほ}, {まみむめも}, {やゆよ}, {らりるれろ}, and {物}, respectively. This corresponds to what is the de facto standard for Japanese telephone keypads wherein the keys 1–9 of the telephone keypad are labeled with the hiragana syllables あ, か, さ, た, な, は, ま, や,, and ら, respectively. The single hiragana appearing on each key represents the complete set of hiragana assigned to that key, corresponding to the entire row of hiragana appearing in Table 1 in which the single hiragana appears in the first column. The 0 key is often labeled explicitly with {わ, を, ん}.

Kisaichi et al. disclose a word-level disambiguation approach, wherein the user ambiguously inputs a sequence of characters (hiragana) by pressing the key with which each character is associated a single time. At the end of each input sequence, the user presses a "Conversion/Next Candidate" key to display the first textual interpretation of one of the possible sequences of hiragana associated with the input key sequence. Kisaichi et al. disclose a dictionary structure wherein all textual interpretations of a given input key sequence are stored consecutively in a contiguous block of memory. Each additional press of the "Conversion/Next Candidate" key displays the next textual interpretation stored in the dictionary, if one exists. If no more textual interpretations exist, an error message is displayed and optional anomaly processing may be performed. When the desired textual interpretation is displayed, a special "Confirmation" key must be pressed to confirm that the desired text has been displayed before the user can go on to enter the next text object.

There are a number of difficulties with the approach disclosed by Kisaichi et al. One is that, due to the fact that there is ambiguity both in specification of the hiragana string and in the conversion of each possible hiragana candidate string, there tend to be a very large number of possible textual interpretations of a given key sequence. This can require the user to step through a large number of interpretations using the "Conversion/Next Candidate" key in order to find the desired interpretation. Further, in stepping through the possible interpretations, the user sees various kanji and/or hiragana strings that correspond to a variety of hiragana strings due to the ambiguity in the input. This can be distracting, and require additional attention from the user in trying to find the desired interpretation. In addition, the database of textual interpretations is arranged such that all data consists only of complete words, and all data for all key sequences of a given length is also stored consecutively in a contiguous block of memory. Kisaichi et al. do not disclose any approach to enable the display of an appropriate stem corresponding to a longer, yet uncompleted word at those points in an input sequence that do not correspond to any completed word. At such points in the input, the system of Kisaichi et al. can only display a default indication of each key entered, such as a numeral or a default letter or character. This is confusing to the user, and fails to provide feedback which is effective in helping the user to confirm that the intended keys have been entered. Finally,.the user is required to press the "Confirmation" key for each word input, having to enter an additional keystroke for each input. Thus, the system disclosed by Kisaichi et al. fails to satisfy the criteria discussed above.

Another significant challenge facing any application of word-level disambiguation is successfully implementing it on the kinds of hardware platforms on which its use is most advantageous. As mentioned above, such devices include two-way pagers, cellular telephones, and other hand-held wireless communications devices. These systems are battery powered, and consequently are designed to be as frugal as possible in hardware design and resource utilization. Applications designed to run on such systems must minimize both processor bandwidth utilization and memory requirements. These two factors tend in general to be inversely related. Since word-level disambiguation systems require a large database of words to function, and must respond quickly to input keystrokes to provide a satisfactory user interface, it would be a great advantage to be able to compress the required database without significantly impacting the processing time required to utilize it. In the case of the Japanese language, additional information must be included in the database to support the conversion of sequences of kana to the kanji intended by the user.

Another challenge facing any application of word-level disambiguation is providing sufficient feedback to the user about the keystrokes being input. With an ordinary typewriter or word processor, each keystroke represents a unique character which can be displayed to the user as soon as it is entered. But with word-level disambiguation this is often not possible, since each keystroke represents multiple characters, and any sequence of keystrokes may match multiple words or word stems. It would therefore be desirable to develop a disambiguating system that minimizes the ambiguity of entered keystrokes, and also maximizes the efficiency with which the user can resolve any ambiguity which does arise during text entry. One way to increase the user's efficiency is to provide appropriate feedback following each keystroke, which includes displaying the most likely word following each keystroke, and in cases where the current keystroke sequence does not correspond to a completed word, displaying the most likely stem of a yet uncompleted word.

In order to create an effective reduced keyboard input system for the Japanese language, a system has been designed that does meet all of the criteria mentioned above. First, the arrangement of the syllables of the Japanese language (kana) on the keyboard, and the method by which they are generated, are easy for a native speaker to understand and learn to use. Second, the system tends to minimize the number of keystrokes required to enter text. Third, the system reduces the cognitive load on the user by reducing the amount of attention and decision-making required during the input process, and by the provision of appropriate feedback. Fourth, the approach disclosed herein tends to minimize the amount of memory and processing resources required to implement a practical system.

SUMMARY OF THE INVENTION

The present invention provides a reduced keyboard using word level disambiguation to resolve ambiguities in keystrokes to enter text in the Japanese language. The keyboard may be constructed with full-size mechanical keys, preferably twelve keys arrayed in three columns and four rows as on a standard telephone keypad. Alternatively, the keyboard can be implemented on a display panel which is touch sensitive, wherein contact with the surface of the display generates input signals to the system corresponding to the location of contact.

A plurality of kana characters and symbols are assigned to each of at least several of the keys, so that keystrokes by a user are ambiguous. A user enters a keystroke sequence wherein each keystroke is intended to be the entry of one kana. Each keystroke sequence is thus intended to represent the phonetic reading of a word or common phrase (hereinafter referred to by the Japanese term "Yomikata"). Because individual keystrokes are ambiguous, the keystroke sequence could potentially match more than one Yomikata with the same number of kana.

The keystroke sequence is processed by comparing the keystroke sequence with one or more stored vocabulary modules to match the sequence with corresponding Yomikata. The various Yomikatas associated with a given key sequence are stored in the vocabulary module in the order determined by their expected frequency of occurrence in general usage, where the expected frequency of a Yomikata is calculated as the sum of the frequencies of occurrence of all possible textual interpretations of that Yomikata (including words composed of kanji, hiragana, katakana, or any combination thereof) in general usage (hereinafter referred to by the Japanese term "Midashigo"). In another preferred embodiment, the Yomikata and Midashigo are initially stored in the order determined by their expected frequency of occurrence in general usage, and this order is modified to reflect the frequency of actual usage by the system user. The most frequent Yomikata that matches the sequence of keystrokes and corresponds to at least one completed word or phrase is automatically identified and presented to the user on a display as each keystroke is received. If there is no completed word or phrase whose Yomikata matches the sequence of keystrokes, the most commonly occurring stem of a yet uncompleted word or phrase is automatically identified and presented to the user on the display. The term "selection list" is used generically to refer to any list of textual interpretations (either Yomikata or Midashigo) generated by the system corresponding to an input keystroke sequence. On devices with sufficient display area available (hereinafter referred to as "large-screen devices"), the selection list may be shown (in whole or in part) in a "selection list region" of the display. On such devices, as each keystroke is received, the various Yomikata corresponding to the input sequence are simultaneously presented to the user in a list on the display in descending order of expected frequency in the selection list region. On devices with limited display area, the selection list is maintained internally, and text objects in the list are displayed one at a time in response to activations of a Select key as described below. For each Yomikata in the stored vocabulary module that is associated with one or more alternate textual interpretations, or Midashigo, the Midashigo are stored in order of decreasing frequency of expected occurrence in general usage, so that the most commonly used Midashigo is presented first. As briefly noted above, in an alternate embodiment, the system keeps track of which Midashigo are selected for output by the user most frequently, and modifies the order of presentation to first present the Midashigo most frequently selected.

In accordance with one aspect of the invention, the user presses an unambiguous Select key to delimit an entered keystroke sequence. After receiving the Select key, the disambiguating system automatically selects the most frequently occurring Yomikata and adds the kana to the text being constructed when the user continues to enter additional text. By default, the Yomikata is shown on the display in the form of hiragana, unless the kana is one of the few katakana for which there is no corresponding hiragana (e.g. ヴ) In another embodiment, the Yomikata is displayed in the form of katakana, or, in some of the alternate keyboard arrangements described below, in the form of romaji.

In accordance with another aspect of the invention, the Select key that is pressed to delimit the end of a keystroke sequence is also used to select less commonly occurring Yomikata. If the most commonly occurring Yomikata presented on the display is not the desired Yomikata, the user presses the Select key again to advance from the most frequently occurring Yomikata to the second most frequently used Yomikata, which replaces the Yomikata first displayed. If this is not the desired Yomikata, the user presses the Select key again to advance to the third most frequently used Yomikata, and so on. By repetitively pressing the Select key, the user may therefore select the desired Yomikata from the stored vocabulary module. In accordance with another aspect of the invention, upon reaching the end of the Yomikata found in the stored vocabulary, the first and most frequently occurring Yomikata is again displayed, and the cycle repeats.

In accordance with yet another aspect of the invention, each keystroke of the input sequence is also interpreted as a numeral associated with the key, so that the last item displayed following the associated Yomikata is the number corresponding to the input key sequence. This number may be selected for output, thus eliminating the need for a separate numeric mode in the system.

In accordance with another aspect of the invention, once the user has selected the desired Yomikata corresponding to the input key sequence, if the desired Midashigo is identical to the Yomikata which has been selected and is already shown on the display as kana text (i.e. no conversion is required), the user may simply proceed to press the keys corresponding to the next desired text to be input. No additional confirmation or conversion keystroke is required—the selected text has already been provisionally sent to the display for output, and unless it is explicitly changed (e.g. by additional presses of the Select key), it will remain as part of the output text. The user can immediately proceed to enter additional following text, move the text cursor location, or select some other system function. If the desired Midashigo is not the selected Yomikata on the display, i.e., the desired Midashigo consists of kanji, kanji plus hiragana, or katakana, the user presses a Convert key until the desired Midashigo is displayed. If the first (default) Yomikata displayed after the entry of a key sequence is the desired Yomikata, a user need not press the Select key, and may immediately press the Convert key to obtain the desired Midashigo.

The present invention also discloses a method for unambiguously generating the syllables of the Japanese language from ordered pairs of keystrokes on a reduced keyboard in such a way as to meet two of the criteria mentioned above. First, the arrangement of the syllables of the Japanese language (kana) on the keyboard, and the method by which they are generated, are easy for a native speaker to understand and learn to use. Second, the arrangement tends to minimize the number of keystrokes required to unambiguously enter the syllables of the Japanese language. In this aspect of the invention, a sequence of two keystrokes is entered to specify each syllable unambiguously, including the syllables with palatalized vowels shown in Table 3 that are written with two kana each.

Input sequences of keystrokes are interpreted as ordered pairs of keystrokes which select a character according to its position in a two-dimensional matrix. The first keystroke of each ordered pair specifies the row of the matrix in which the desired character appears, and the second keystroke of each pair specifies the column. The organization of the characters in the first five columns of the matrix conforms to the manner in which the Japanese syllabary is learned and conceptualized by a native Japanese speaker, as they are shown in Table 1. An additional three columns may be organized in a manner that corresponds with the natural model of how the syllables with palatalized vowels are formed (each as a combination of two kana), although these are generally regarded as a separate matrix from the basic syllabary (Table 3). Two more columns may be added to handle two special cases (small っ and ん) that do not fit into the simple patterns of the first eight columns. These two characters can also be handled somewhat differently in a variety of alternate embodiments. The simplicity and logical organization of this matrix approach makes it possible to use the matrix even when there is no display available to provide feedback to the user. When a display is available, the matrix can be used to organize how feedback is provided to make the operation of the system transparent to the user.

The Japanese syllabary includes 108 syllables (counting the "small" っ, ゃ, ゅ, and ょ as separate syllables from the full-sized つ, や, ゆ, and よ since they are written and pronounced in a distinct fashion). There are some additional seldom used syllables, such as the "small" versions of the vowel syllables ぁ, ぃ, ぅ, ぇ, and ぉ that are primarily used in katakana. These seldom used syllables may also be easily generated by using the matrix system as discussed above. Of the 108 syllables, 37 are generated by simply adding one of the diacritic marks, dakuten (")or handakuten (°), to one of the other 71 syllables. These 71 syllables without diacritic marks can be logically organized into a single matrix of nine or ten rows and eight to ten columns. A plurality of the keys on the reduced keyboard of the present invention may be labeled with two kana, one representing the consonant associated with a given row of the matrix, and second kana representing the vowel associated with a given column of the matrix.

The organization is logical and intuitive for a native speaker of Japanese for 106 of the 108 syllables, and the method for generating the remaining two syllables, i.e., small っ, and ん, is simple and easily learned. Every syllable is generated by a single pair of keystrokes, including syllables with palatalized vowels that are represented by two separate kana. This results in significantly fewer keystrokes than is required by the currently used multiple-stroke method for entering kana on a reduced keyboard. Thus, the present invention provides a reduced keyboard that is easily understood and quickly learned by native speakers of Japanese, and that is efficient in terms of reducing the length of input keystroke sequences.

In yet another aspect of the invention, both ambiguous and unambiguous methods of specification of syllables as described above may be combined to achieve greater efficiencies in the input method. In one preferred embodiment, the first syllable of each word or phrase to be generated is specified unambiguously by entering an ordered pair of keystrokes using the matrix approach as discussed above, while the remaining syllables of the word or phrase are specified ambiguously with a single keystroke for each syllable using the word level disambiguation method.

In accordance with yet another aspect of the invention, multiple interpretations of the keystroke sequence are provided to the user in the selection list. The keystroke sequence is interpreted as forming one or more words, where the most frequently occurring corresponding word is displayed, and where other corresponding words may also be displayed in a selection list. Simultaneously, the keystroke sequence is interpreted as a number (as explained above), as a word entered using the two-stroke method of the present system or the well-known multiple-stroke specification method, and as a stem of an uncompleted word. On large-screen devices, the multiple interpretations are simultaneously presented to the user in a selection list region for each keystroke of a keystroke sequence entered by the user. On any device, the user may select from the alternate interpretations by pressing the Select key a number of times.

In accordance with still another aspect of the invention, the database of words and phrases that is used to disambiguate input key sequences is stored in a vocabulary module using tree data structures. Words corresponding to a particular keystroke sequence are constructed from data stored in the tree structure in the form of instructions. The instructions modify the set of words and word stems associated with the immediately preceding keystroke sequence (i.e., the particular keystroke sequence without the last keystroke) to create a new set of words and word stems associated with the keystroke sequence to which the current keystroke has been appended. Constructing words in this manner reduces the storage space of the vocabulary module, since the instructions to build word stems are stored only once, at the top of the tree structure, and are shared by all words constructed from the word stems. The tree structure also greatly reduces processing requirements, since no searching is required to locate stored objects, i.e., words and word stems, for example. The objects stored in the tree data structure may contain frequency or other ranking information which indicates which object is to be displayed first to the user, thus further reducing processing requirements. Furthermore, this tree data structure may be modified using a special algorithm which further compresses the total size required for the database, without engendering an additional processing burden when the database is utilized to retrieve objects associated with keystroke sequences.

In yet another aspect of the present invention, the tree data structure includes two types of instructions. Primary instructions create the Yomikata of the words and phrases stored in a vocabulary module which consist of sequences of kana corresponding to the pronunciation of the words and phrases. Corresponding to each Yomikata is a list of secondary instructions which create the Midashigo associated with each Yomikata. Each Yomikata is created by a primary instruction which modifies one of the Yomikata associated with the immediately preceding keystroke sequence. Likewise, each Midashigo is created by a secondary instruction which modifies one of the Midashigo associated with the Yomikata which was modified by the primary instruction with which the secondary instruction is associated.

The internal, logical representation of the keys in an embodiment need not mirror the physical arrangement represented by the labels on the actual keys. For example, in a database constructed to represent a Japanese vocabulary module, four additional characters (い, う, え, お) may also be associated with the key labeled only with the single characters あ. Similarly, characters with special diacritic marks such as the dakuten and handakuten ("and °) can also be associated with a key. For example, the characters (き, く, け, こ, が, ぎ, ぐ, げ, and ご) may also be associated with the key labeled only with the single character か. This allows the user to easily recall and type words containing characters with diacritic marks, performing only one key activation per character, simply by activating the logically associated physical key for the associated accented character.

Furthermore, in yet another aspect of the invention, greater efficiencies in database compression are achieved by storing each kanji character only once in the database structure for any particular associated reading. In general, a database may include a number of different instances of the same kanji with the same reading (e.g. the kanji 物 (read as ぶつ) in 動物 (どうぶつ) and 植物 (しょくぶつ)). In one preferred embodiment, starting immediately from the root of the tree structure, each reading associated with a given kanji is included in the database, together with a full specification of the code for the kanji. Other occurrences of the kanji having the same reading in the database (not starting immediately from the root of the tree structure) are defined though an indirect reference, which specifies the relative position of the fully specified kanji in the list of Midashigo associated with the reading starting immediately from the root of the tree structure.

The combined effects of the assignment of multiple characters to keys, the delimiting of words using a Select key, the selection of the desired Yomikata using a Select key optionally followed by the selection of the desired Midashigo using a Convert key, the presentation of the most commonly occurring word or word stem as the first word in the selection list, the inclusion of multiple interpretations in the selection list, the automatic addition of a selected word to a sentence by the first keystroke of the following word, the ability to compress a large database for disambiguation without incurring any significant processing penalties, and the ability to generate words with characters with diacritic marks by typing the key associated with the characters without a diacritic mark produces a surprising result: for the Japanese language, well over 99% of words found in a representative corpus of text material can be typed on the system with extremely high efficiency. On average, in comparison with entering text on a full keyboard containing one key for each possible basic kana (i.e. 50 keys including those shown in Table 1 plus the "small" っ, ゃ, ゅ, and ょ), only 0.61 additional keystrokes per word are required using the reduced keyboard of the present invention with only twelve keys. Compared with a conventional keyboard where kana are entered by spelling the desired word using romaji, on average the system actually requires even fewer keystrokes. When words include characters with diacritics, additional keystroke savings can be achieved. When the words are presented in frequency of use order, the desired word is most often the first word presented and in many cases is the only word presented. The user can then proceed to enter the next word with no additional keystrokes required. High speed entry of text is therefore achieved using a keyboard having a small number of keys.

The reduced keyboard disambiguation system disclosed herein reduces the size of the computer or other device that incorporates the system. The reduced number of keys allows a device to be constructed to be held by the user in one hand, while being operated with the other hand. The disclosed system is particularly advantageous for use with cellular telephones, PDAs, two-way pagers, or other small electronic devices that benefit from accurate, high-speed text entry. The system efficiently compresses a large database for disambiguating keystroke sequences without requiring additional processing bandwidth when utilizing the compressed database. The system can provide both efficiency and simplicity when implemented on a touchscreen based device or a device with a limited number of mechanical keys that may also have limited display screen area.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1*d* is a schematic view of a cellular telephone keypad incorporating an embodiment of the reduced keyboard system of the present invention with display capabilities, showing the display following an activation of key 2 as the first of an ordered pair of keystrokes in the unambiguous two-stroke method;

FIG. 18 is a chart showing the partial contents of the database of the present invention for a sequence of three consecutive keystrokes on a key, which is ambiguously associated with the syllables か, き, く, け, and こ;

FIG. 19 shows three representative examples of system operation, showing the contents of the text display of the system illustrated in FIG. 1*a* following each keystroke on a sequence of keys entered while inputting text;

FIG. 20 is a table showing basic Japanese syllabary;

FIG. 21 is a table showing additional Japanese syllabary using diacritics;

FIG. 22 is a table showing Japanese syllabary with palatalized vowels;

FIG. 23*a* is a table showing a classifying matrix for Japanese syllabary;

FIG. 23*b* is a table showing an alternative classifying matrix for Japanese syllabary; and FIG. 24 is a table showing another alternative classifying matrix for Japanese syllabary.

DETAILED DESCRIPTION OF THE PREFERRED EMBODIMENT

I. System Construction and Basic Operation

Figure 1A:
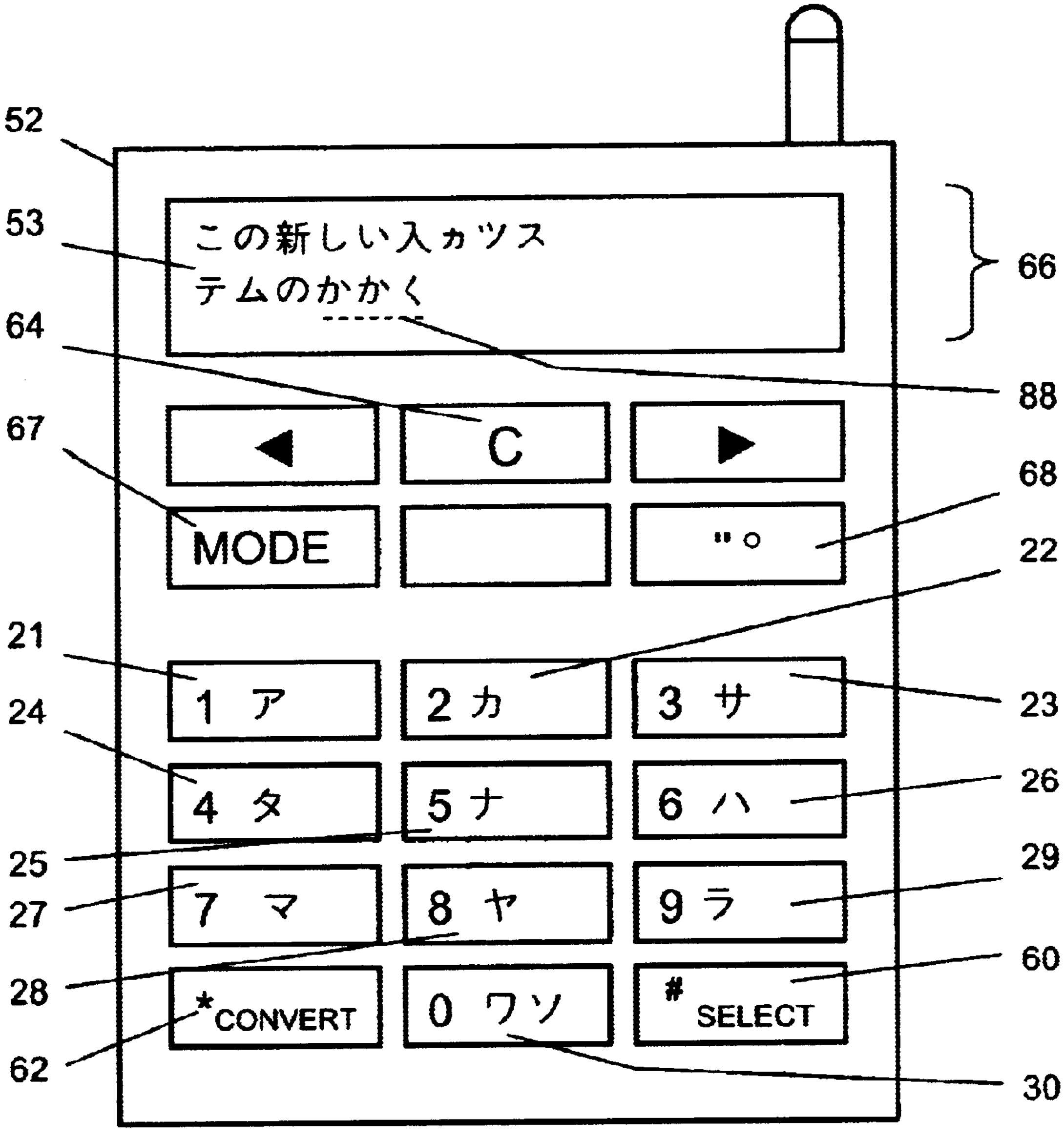
FIG. 1*a* is a schematic view of an embodiment of a cellular telephone incorporating a reduced keyboard disambiguating system of the present invention.

With reference to FIG. 1*a*, a reduced keyboard disambiguating system formed in accordance with the present invention is depicted as incorporated in a portable cellular telephone 52 having a display 53. Portable cellular telephone 52 contains a reduced keyboard 54 implemented on the standard telephone keys. For purposes of this application, the term "keyboard" is defined broadly to include any input device including a touch screen having defined areas for keys, discrete mechanical keys, membrane keys, etc. An arrangement of the kana on each key in the keyboard 54 is depicted in FIG. 1*a*, corresponding to what has become a de facto standard for Japanese telephones. Note that keyboard 54 thus has a reduced number of data entry keys as compared to a standard QWERTY keyboard, or a keyboard which includes at least 46 keys, where one key is assigned for each of the kana in the basic Japanese syllabary shown in Table 1. More specifically, the preferred keyboard shown in this embodiment contains ten data keys numbered 1 through 0 arranged in a 3-by-4 array, together with a Select key 60, and a Convert key 62. Optionally, the keyboard may also include a Clear key 64 to delete previous keystrokes; a Mode key 67 for entering modes to type unambiguous characters, numbers, and symbols; and a Diacritic key 68 to add dakuten and handakuten to previously entered kana.

Data are input into the disambiguation system via keystrokes on the reduced keyboard 54. In a first preferred embodiment, as a user enters a keystroke sequence using the keyboard, text is displayed on the telephone display 53. When the system is implemented on a device with limited display space, such as the cellular telephones depicted in FIGS. 1*a–d*, only the currently selected or most likely word object is displayed at the insertion point 88 in the text being generated. As keys are pressed in sequence to enter a desired word, the most likely word corresponding to the input sequence is displayed in some distinguishing format. In the preferred embodiment depicted in FIG. 1*a*, the current word is displayed with a dotted underline. As explained in more detail below, after the Select key 60 or Convert key 62 is pressed, the dotted underline is changed to a solid underline.

Figure 2A:
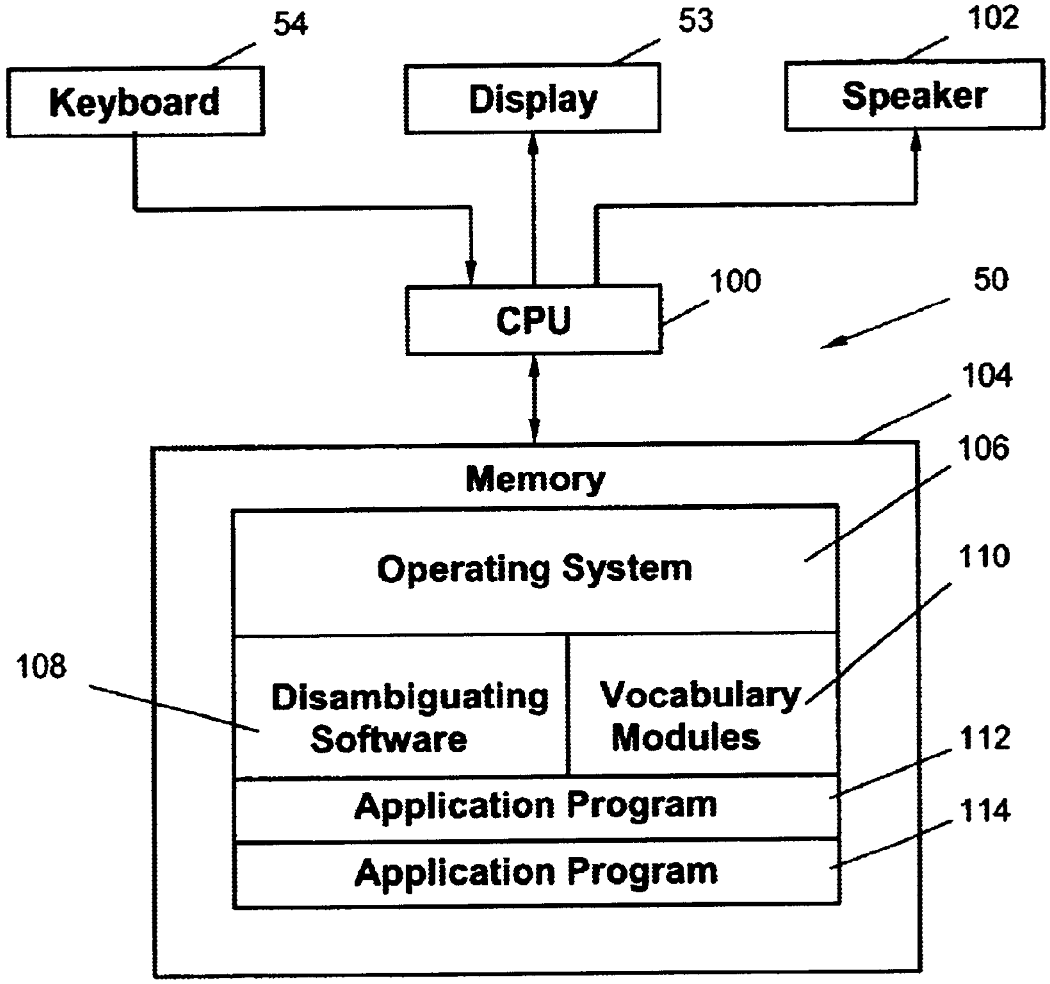
FIG. 2*a* is a hardware block diagram of the reduced keyboard disambiguating system of FIG. 1*a;*
Figure 2B:
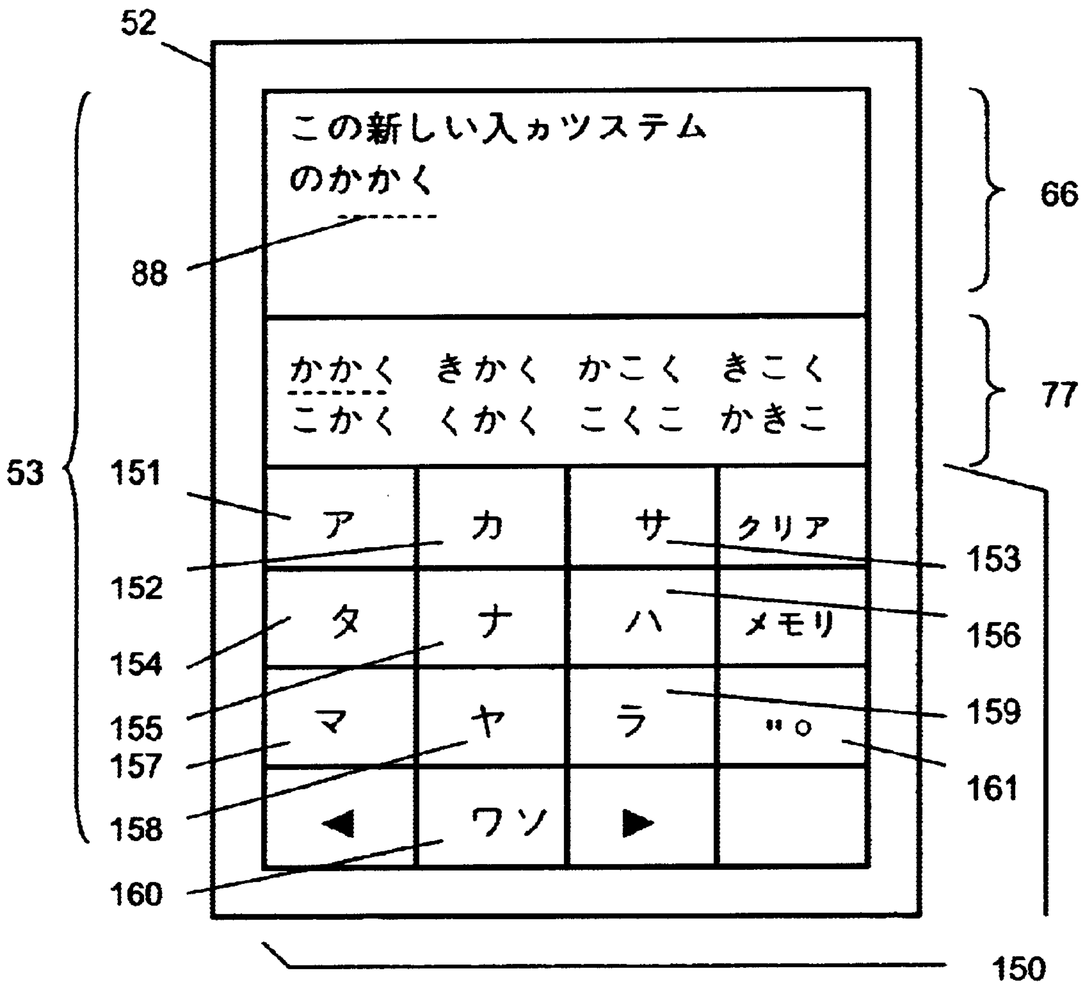
FIG. 2*b* is a schematic view of an embodiment of a portable computer touchscreen incorporating a reduced keyboard system of the present invention, showing the keypad displayed prior to the first keystroke of an ordered pair of keystrokes in the unambiguous two-stroke method.
Figure 2C:
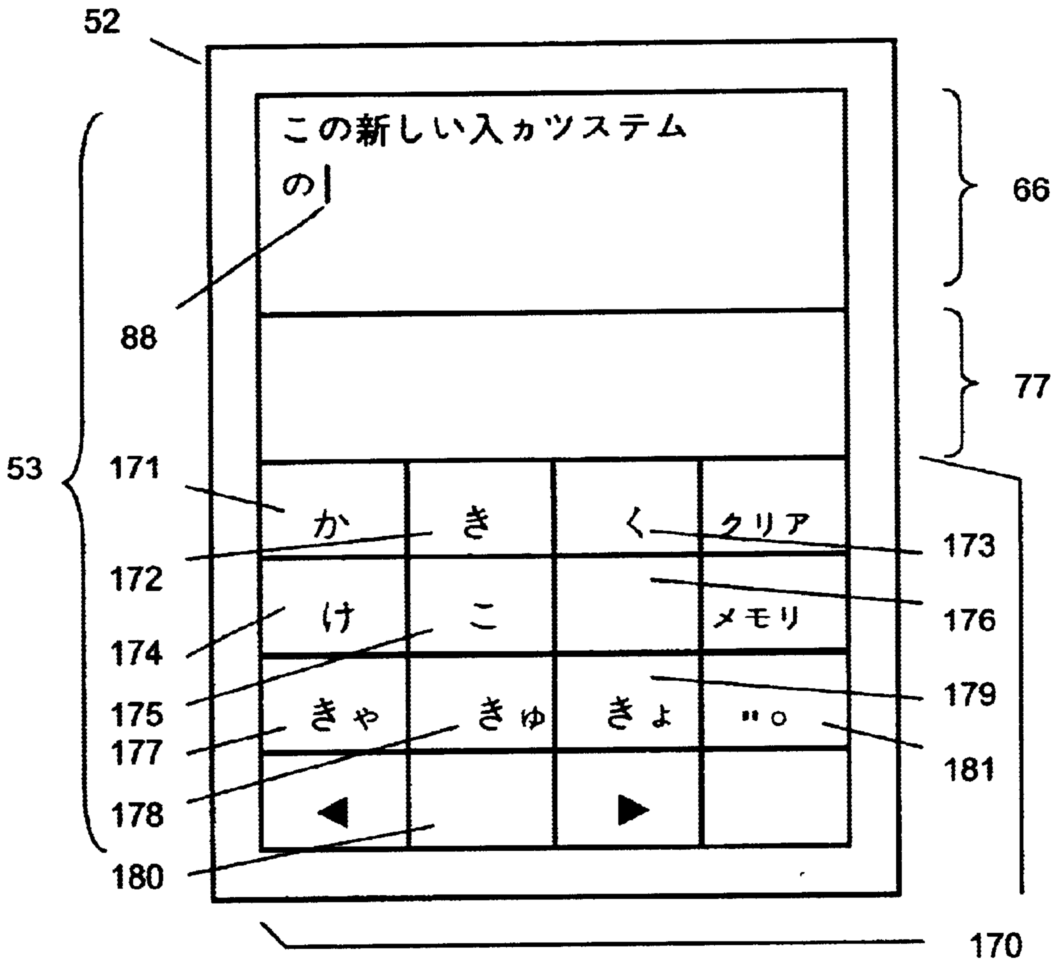
FIG. 2*c* is a schematic view of the touchscreen of FIG. 2*b*, showing the keypad displayed following an activation of the key associated with the syllables か, き, く, け, and こ as the first of an ordered pair of keystrokes.

In a second preferred embodiment illustrated in FIGS. 2*b* and 2*c*, two regions are defined on the display 53 to display information to the user. A text region 66 displays the text entered by the user just as described for the first embodiment described above, serving as a buffer for text input and editing. As shown in FIGS. 2*b* and 2*c*, a selection list region 77, typically located below the text region 66, shows a list of words and other interpretations corresponding to the keystroke sequence entered by a user. The selection list region aids the user in resolving the ambiguity in the entered keystrokes by simultaneously showing both the most frequently occurring interpretation of the input keystroke sequence, and other less frequently occurring alternate interpretations displayed in descending order of frequency.

A block diagram of the reduced keyboard disambiguating system hardware is provided in FIG. 2*a*. The keyboard 54 and the display 53 are coupled to a processor 100 through appropriate interfacing circuitry. Optionally, a speaker 102 is also coupled to the processor. The processor 100 receives input from the keyboard, and manages all output to the display and speaker. Processor 100 is coupled to a memory 104. The memory includes a combination of temporary storage media, such as random access memory (RAM), and permanent storage media, such as read-only memory (ROM), floppy disks, hard disks, or CD-ROMs. Memory 104 contains all software routines to govern system operation. Preferably, the memory contains an operating system 106, disambiguating software 108, and associated vocabulary modules 110 that are discussed in additional detail below. Optionally, the memory may contain one or more application programs 112, 114. Examples of application programs include word processors, software dictionaries, and foreign language translators. Speech synthesis software may also be provided as an application program, allowing the reduced keyboard disambiguating system to function as a communication aid.

Returning to FIG. 1*a*, the reduced keyboard disambiguating system allows a user to quickly enter text or other data using only a single hand. Data are entered using the reduced keyboard 54. Each of the data keys 1 through 0 has multiple meanings, represented on the top of the key by characters, numbers, and other symbols. (For the purposes of this disclosure, each data key will be identified by the number and character(s) appearing on the data key, e.g., 3こ to identify the upper right data key.) Since individual keys have multiple meanings, keystroke sequences are ambiguous as to their meaning. As the user enters data, the various keystroke interpretations are therefore displayed in multiple regions on the display to aid the user in resolving any ambiguity. On large-screen devices, a selection list of possible interpretations of the entered keystrokes is also displayed to the user in the selection list region. The first entry in the selection list is selected as a default interpretation and displayed in the text region 66 at an insertion point 88. In the preferred embodiment, this entry is displayed with a dotted underline drawn beneath it at the insertion point 88 (and in the selection list region on large-screen devices). The formatting signifies that this object is implicitly selected by virtue of being the most frequently occurring object in the current selection list. If the display includes a selection list region as in FIG. 2*b,* this formatting also establishes a visual relationship between object at the insertion point 88 and the same object displayed in the selection list region 77. In FIG. 1*a,* no selection list is displayed, and only the default object (the object that would be displayed first in the selection list prior to any activation of the Select key), or the currently selected object if one has been explicitly selected, is displayed at the insertion point 88.

The selection list of the possible interpretations of the entered keystrokes may be ordered in a number of ways. In a normal mode of operation, the keystrokes are initially interpreted as the entry of kana to spell a Yomikata corresponding to the desired word (hereinafter the "word interpretation"). For example, as shown in FIG. 2*b,* a keystroke sequences ｶ, ｶ, and ｶ has been entered by a user. As keys are entered, a vocabulary module look-up is simultaneously performed to locate Yomikata that match the keystroke sequence. The Yomikata are returned from the vocabulary module according to frequency of use, with the most commonly used Yomikata listed first. Using the example keystroke sequence, the Yomikata "かかく", "きかく", and "きこく" are identified from the vocabulary module as being the three most probable Yomikata corresponding to the keystroke sequence. Of the eight identified Yomikata in this selection list, "かかく" is the most frequently used, so it is taken as the default interpretation and provisionally posted as hiragana text at the insertion point 88. As shown in FIG. 1*a,* prior to pressing the Select key 60, this first Yomikata is taken as the default interpretation and is posted at the insertion point 88 using a distinctive format. This format indicates that a subsequent keystroke on one of the data keys will be appended to the current key sequence rather than start a new sequence. For example, as in FIG. 1*a,* the distinctive formatting consists of displaying the Yomikata as hiragana text with a dotted underline. The list of other potential matching Yomikata is kept in memory, sorted according to their relative frequency.

In the preferred embodiment, following entry of the keystroke sequence corresponding to the desired Yomikata, the user simply presses the Select key 60. The dotted underline beneath the default Yomikata "かかく" displayed at the insertion point 88 is replaced with a solid underline. If the default Yomikata displayed is not the desired Yomikata, the Select key 60 is pressed repeatedly until the desired Yomikata appears. In one preferred embodiment, after all of the Yomikata in memory that match the key sequence have been displayed through repeated activation of the Select key 60, the key sequence is interpreted as a number, where each keystroke generates the digit appearing on the label of the key. This allows numbers to be generated without a separate numeric mode, and also serves as an easily recognizable indicator of the end of the selection list of Yomikata interpretations. The next press of the Select key 60 cycles back to the first Yomikata in the selection list.

Once the desired Yomikata is displayed, if the desired Midashigo (textual interpretation) is in fact identical to the Yomikata that is already displayed in hiragana text, the user proceeds to press the data key corresponding to the first kana of the next Yomikata to be entered. On the other hand, if the desired Midashigo consists of kanji, kanji plus hiragana, katakana, or some combination thereof, the user presses the Convert key 62. This causes the displayed Yomikata to be replaced with the most frequently occurring Midashigo that is associated with that Yomikata in the vocabulary module. Repeated presses of the Convert key 62 replace the displayed Midashigo with other associated Midashigo in descending order of frequency. In one preferred embodiment, after all of the Midashigo in memory that are associated with the selected Yomikata have been displayed through repeated activation of the Convert key 62, the selected Yomikata is displayed as katakana. This allows katakana words to be generated without a separate mode, and also serves as an easily recognizable indicator of the end of the selection list of Midashigo interpretations. In another preferred embodiment, if the user wishes to choose a Midashigo that is associated with the first (default) Yomikata associated with the input key sequence, the Convert key 62 can be pressed immediately to obtain the desired Midashigo without first pressing the Select key 60.

After one or more presses of either or both the Select key 60 and the Convert key 62, any data key that is pressed removes the special formatting (solid underline in the preferred embodiment) of the displayed Yomikata or Midashigo, and becomes the first keystroke of a new key sequence to be interpreted by the system. No special keystroke is required to confirm the interpretation of the preceding keystroke sequence.

In the preferred embodiment described above, pressing the Select key 60 cycles forward through the Yomikata in memory that are associated with the current key sequence (in descending order of frequency). In another preferred embodiment, pressing-and-holding the Select key 60 past a predetermined time threshold cycles backward through the Yomikata in memory in ascending order of frequency. Thus, when the numeric interpretation is included at the end of the sequence of associated Yomikata in memory as described above, a press-and-hold of the Select key 60 prior to any regular press of the Select key 60 cycles backward immediately to the numeric interpretation. Repeatedly pressing-and-holding the Select key 60 then cycles back up through the associated Yomikata in ascending order of frequency. Likewise, pressing-and-holding the Convert key 62 cycles backward through the Midashigo associated with the currently selected Yomikata in ascending order of frequency. Similarly, a first press-and-hold of the Convert key 62 prior to any regular press of the Convert key 62 cycles backward immediately to the katakana interpretation.

Still referring to FIG. 1*a,* in another preferred embodiment, when entering data keys, the Clear key 64 can be pressed to delete the previously entered data key. If all data keys in the current key sequence are thus deleted, pressing the Clear key 64 deletes the character on the text display 53 to the left of the insertion point 88, where a standard text cursor is displayed when the current selection list is empty. After one or more presses of either or both the Select key 60 and the Convert key 62, pressing the Clear key 64 replaces the currently selected textual interpretation at the insertion point 88 with the default Yomikata interpretation of the current key sequence, but does not delete any of the data keys from the key sequence. In other words, the first press of the Clear key 64 after any number of presses of the Select key 60 and/or the Convert key 62 effectively "deletes" all of the activations of the Select key 60 and the Convert key 62, returning the system to the state immediately prior to the first press of either the Select key 60 or the Convert key 62. In another preferred embodiment, after one or more presses of the Convert key 62, pressing the Select key 60 replaces the currently selected Midashigo at the insertion point 88 with the Yomikata with which the Midashigo is associated. Further presses of the Select key 60 continue to cycle forward from that point through the other Yomikata in memory that are associated with the current key sequence (in descending order of frequency).

In another preferred embodiment, activation of any other means which explicitly generates an unambiguous character (such as entering a special Symbols mode and pressing a key that is unambiguously associated with a single specific character) serves to terminate the current key sequence. As a result, any special formatting (dotted or solid underline in the preferred embodiment) of the displayed Yomikata or Midashigo at the insertion point 88 is removed, and the specific unambiguous character is appended to the output word at a new insertion point 88.

Provisionally posting the selected Yomikata or Midashigo to the text region at the insertion point 88 allows the user to maintain their attention on the text region without having to refer to the selection list. At the user's option, the system can also be configured such that, upon receipt of the first press of the Select key 60 (or Convert key 62), the Yomikata (or Midashigo) provisionally posted at the insertion point 88 can expand (vertically or horizontally) to display a copy of the current selection list. The user may select the maximum number of words to be displayed in this copy of the selection list. Alternatively, the user may elect to have the selection list always displayed at the insertion point 88, even prior to the first activation of the Select key. The disambiguating system interprets the start of the next word (signaled by the activation of an ambiguous data key or the generation of an explicit unambiguous character) as an affirmation that the currently selected entry is the desired entry. The selected word therefore remains at the insertion point 88 as the choice of the user, the underline disappears completely and the word is redisplayed in normal text without special formatting.

In the majority of text entry, keystroke sequences are intended by the user as kana forming a Yomikata. It will be appreciated, however, that the multiple characters and symbols associated with each key allow the individual keystrokes and keystroke sequences to have several interpretations. In the preferred reduced keyboard disambiguating system, various different interpretations are automatically determined and displayed to the user at the same time as the keystroke sequence is interpreted and displayed to the user as a list of words.

For example, the keystroke sequence is interpreted in terms of the word stems corresponding to possible valid sequences of kana that a user may be entering (hereinafter the "stem interpretation"). Unlike word interpretations, word stems are incomplete words. By indicating the possible interpretations of the last keystrokes, the word stems allow the user to easily confirm that the correct keystrokes have been entered, or to resume typing when his or her attention has been diverted in the middle of the word. There are key sequences which correspond to the partial entry of a long word or phrase, but which do not correspond to any completed word or phrase. In such cases, the most useful feedback that can be provided to the user is to show the kana that correspond to the stem of the word that has been entered up to that point. In the example shown in FIG. 2*b*, the keystroke sequence カ, カ, カ can be interpreted as forming the valid stem "かけき" (leading to the word "かけきん"). The stem interpretations are therefore provided as entries in the selection list. Preferably, the stem interpretations are sorted according to the composite frequency of the set of all possible words that can be generated from each stem by additional keystrokes on the data keys. The maximum number and the minimum composite frequency of such entries to be displayed may be selected by the user or configured in the system, so that some stem interpretations may not be displayed. When listing a stem interpretation in the selection list, the stem is omitted if a stem interpretation duplicates a word that appears in the selection list. When the stem is omitted, however, the word corresponding to the omitted stem may be marked with a symbol to show that there are also longer words which have this word as their stem. Stem interpretations provide feedback to the user by confirming that the correct keystrokes have been entered to lead to the entry of a desired word.

Figure 3A:
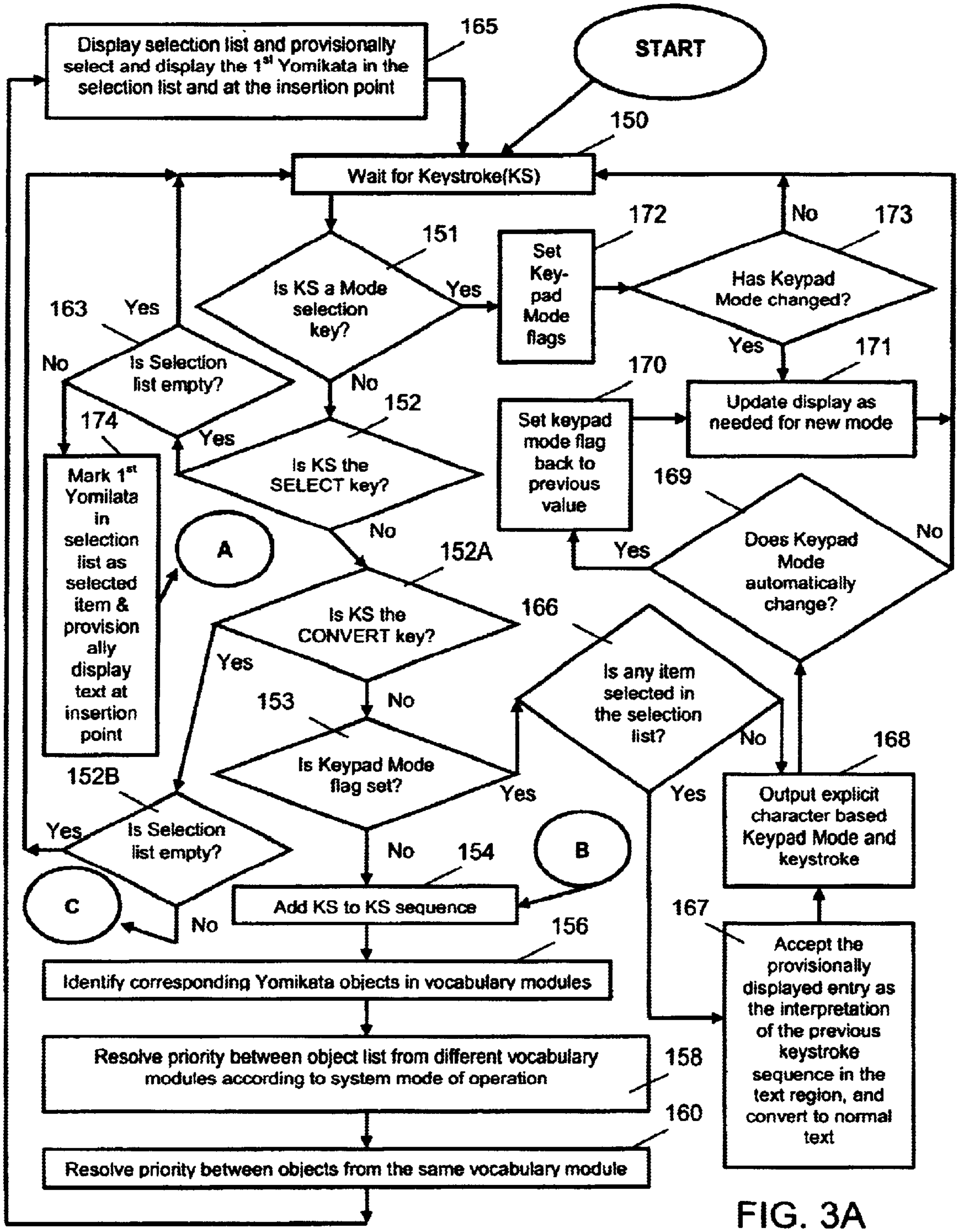
FIG. 3 is a flow chart of an embodiment of word-level disambiguating software for a reduced keyboard disambiguating system for the Japanese language.
Figure 3A:
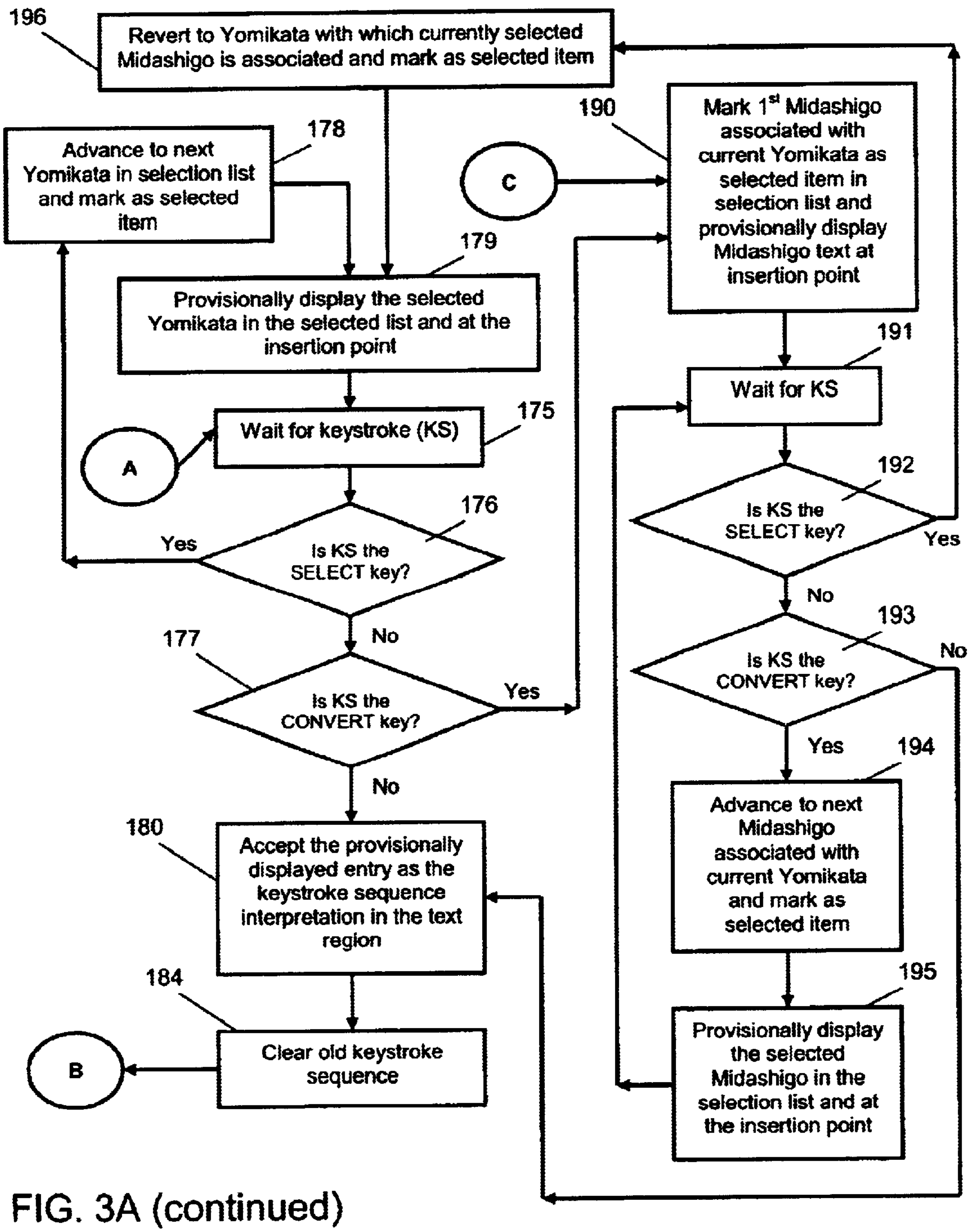
Figure 3B:
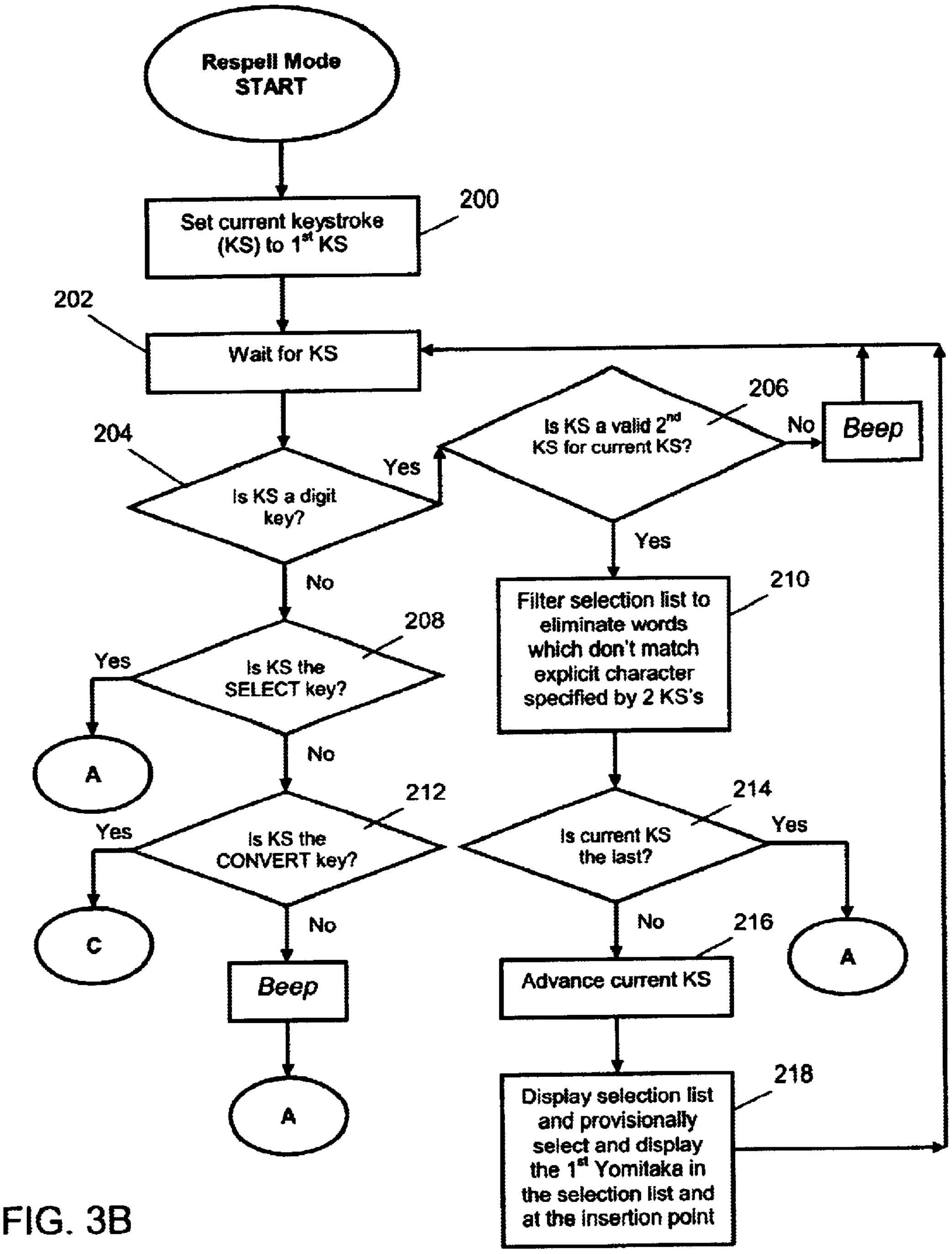

FIG. 3 is a flow chart of a main routine of the disambiguation software that processes a selection list and determines what is to be displayed at the insertion point 88 to aid the user in disambiguating ambiguous keystroke sequences. At a block 150, the system waits to receive a keystroke from the keyboard 54. Upon receipt of a keystroke, at a decision block 151, a test is made to determine if the received keystroke is a mode selection key. If so, at a block 172 the system sets a flag to indicate the current system mode. At a decision block 173, a test is made to determine if the system mode has changed. If so, at a block 171 the display is updated as needed to reflect the current system mode. If block 151 determines the keystroke is not a mode selection key, then at a decision block 152, a test is made to determine if the received keystroke is the Select key. If the keystroke is not the Select key, then at decision block 152A, a test is made to determine if the received keystroke is the Convert key. If the keystroke is not the Convert key, then at decision block 153, a test is made to determine if the system is in a special explicit character mode such as the explicit Symbols mode. If so, at decision block 166 a test is performed to determine if any provisionally selected item is present in the selection list. If so, at a block 167 the item is accepted and is output as normal text. Then, at a block 168, the explicit character corresponding to the keystroke is output to the text area. Then, at decision block 169, a test is made to determine if the system mode should be automatically changed, as in the case of Symbols mode. If so, execution proceeds to block 170 and the system mode is returned to the previously active mode, otherwise execution returns to block 150.

If at block 153 no explicit character mode is active, at a block 154 the keystroke is added to a stored keystroke sequence. At block 156, objects corresponding to the keystroke sequence are identified from the vocabulary modules in the system. Vocabulary modules are libraries of objects that are associated with keystroke sequences. An object is any piece of stored data that is to be retrieved based on the received keystroke sequence. For example, objects within the vocabulary modules may include numbers, characters, words, components of words, stems, phrases, or system functions and macros. Each of these objects is briefly described in the following table:

| Object | Corresponding data |
|---|---|
| Numbers | A number, each digit of which corresponds to a single keystroke, e.g., the two-digit sequence "42". |
| Characters | A character or sequence of characters corresponding to pairs of keystrokes, e.g., the three character sequence "きかく". Each pair of keystrokes is used to disambiguate using the two-stroke specification method of inputting characters unambiguously. |
| Word | A Yomikata or Midashigo corresponding to single or multiple keystrokes, e.g., the four character word "かけきん". |
| Stem | A sequence of kana representing a valid portion of a longer sequence of kana forming a word, e.g., "かけき" as a stem of the word "かけきん." |
| Phrase | A user-defined or system-defined phrase corresponding to single or multiple keystrokes, e.g., "おねがいします". |
| System Macro | A word and associated code describing a system or user-defined function, e.g., "<clear>" to clear the current text region. In addition to the descriptive word, in the vocabulary module the system macro object is associated with the executable code necessary for performing the specified function. |

While the preferred vocabulary objects are discussed above, it will be appreciated that other objects may be contemplated. For example, a graphic object may be associated with a stored graphic image, or a speech object may be associated with a stored segment of speech. A spelling object may also be envisioned that would link the keystroke sequence of commonly misspelled words and typing errors with the correct spelling of the word. To simplify processing, each vocabulary module preferably contains similar objects. It will be appreciated, however, that various objects may be mixed within a vocabulary module.

Returning to FIG. 3, at block 156 those objects that correspond to the received keystroke sequence are identified in each vocabulary module. At blocks 158–165 the objects found by looking up the keystroke sequence in the vocabulary modules are prioritized to determine the order in which objects are displayed to the user. To determine the sequence of objects displayed in the selection list, priorities are established between each vocabulary module and also between the returned objects from each vocabulary module.

To prioritize the object lists identified from the various vocabulary modules, at block 158 the mode of operation of the reduced keyboard disambiguating system is examined. As discussed above, in a normal mode of operation the word interpretations (Yomikata and Midashigo) are displayed first in the selection list. The object list from a word vocabulary module would therefore be assigned a higher priority than the object list from the other vocabulary modules. Conversely, if the disambiguating system were in the numeric mode of operation, the numeric interpretations would be assigned a higher priority than the other vocabulary modules. The mode of the disambiguating system therefore dictates the priority between vocabulary module object lists. It will be appreciated that in certain modes, the object lists from certain vocabulary modules may be omitted from the selection list entirely.

Object lists generated from vocabulary modules may contain only a single entry, or they may contain multiple entries. At block 160, the priority between the objects from the same vocabulary module is therefore resolved if the object list contains multiple entries. The objects that match a particular keystroke sequence that are looked-up in a given vocabulary module are also given a priority that determines their relative presentation with respect to each other. As noted above, preferably the default presentation order is by decreasing frequency of use in a representative corpus of usage. The priority data associated with each object is therefore used to order the objects in the selection list.

Many of the properties associated with the presentation of the objects looked-up in a vocabulary module are user-programmable by accessing appropriate system menus. For example, the user can specify the order of individual objects or classes of objects in the selection list. The user may also set the priority level that determines the priority between vocabulary modules and between the objects identified from each vocabulary module.

After the priorities between the objects have been resolved, at a block 165 a selection list is constructed from the identified objects and presented to the user. As a default interpretation of the ambiguous keystroke sequence entered by the user, the first entry in the selection list is provisionally posted and highlighted at the insertion point 88 in the text region 53 as illustrated in FIGS. 1*a* and 1*c*. The disambiguating software routine then returns to block 150 to wait for the next keystroke.

If the detected keystroke is the Select key 60, the "yes" branch is taken from decision block 152 to decision block 163, where a test determines if the current selection list is empty. If so, then execution returns to block 150. If at decision block 163 the selection list is not empty, the "no" branch is taken to a block 174. At block 174, the dotted-underline under the default Yomikata displayed at the insertion point 88 where it has been provisionally posted is changed to a solid-underline. At a block 175, the system then waits to detect the next keystroke entered by the user. Upon receipt of a keystroke, at a decision block 176, a test is made to determine if the next keystroke is the Select key. If the next keystroke is the Select key, at a block 178 the system advances to the next Yomikata in the selection list and marks it as the currently selected item. At block 179, the currently selected entry is provisionally displayed at the insertion point with a solid-underline. The routine then returns to block 175 to detect the next keystroke entered by the user. It will be appreciated that the loop formed by blocks 175–179 allows the user to select various Yomikata interpretations of the entered ambiguous keystroke sequence having a lesser frequency of use by depressing the Select key multiple times.

If the next keystroke is not the Select key, at a decision, block 177, a test is made to determine if the next keystroke is the Convert key. If the detected keystroke is the Convert key, the "yes" branch is taken from decision block 177 to block 190 where the first Midashigo associated with the current Yomikata is marked as the selected item and the Midashigo text is provisionally displayed at insertion point 88 with a solid-underline. At a block 191, the system then waits to detect the next keystroke entered by the user. Upon receipt of a keystroke, at a decision block 192, a test is made to determine if the next keystroke is the Select key. If the next keystroke is the Select key, at a block 196 the system changes the currently selected item back to the Yomikata with which the currently selected Midashigo is associated, and marks it as the currently selected item, and then proceeds at block 179 as before. If at decision block 192 the next keystroke is not the Select key, at a decision block 193, a test is made to determine if the next keystroke is the Convert key. If it is the Convert key, then at a block 194 the currently selected object is advanced to the next Midashigo associated with current Yomikata, and marked as the selected item. At block 195, the now selected Midashigo is provisionally displayed at the insertion point 88 with a solid-underline. The system then returns to block 191 to wait to detect the next keystroke entered by the user.

If at decision blocks 177 or 193 the next keystroke is not the Convert key, the routine continues to a block 180 where the provisionally displayed entry is selected as the keystroke sequence interpretation and is converted to normal text formatting in the text region. At a block 184, the old keystroke sequence is cleared from the system memory, since the receipt of an ambiguous keystroke following the Select key or the Convert key indicates to the system the start of a new ambiguous sequence. The newly received keystroke is then used to start the new keystroke sequence at block 154. Because the Yomikata interpretation having the highest frequency of use is presented as the default choice, the main routine of the disambiguation software allows a user to continuously enter text with a minimum number of instances which require additional activations of the Select key.

Figure 1B:
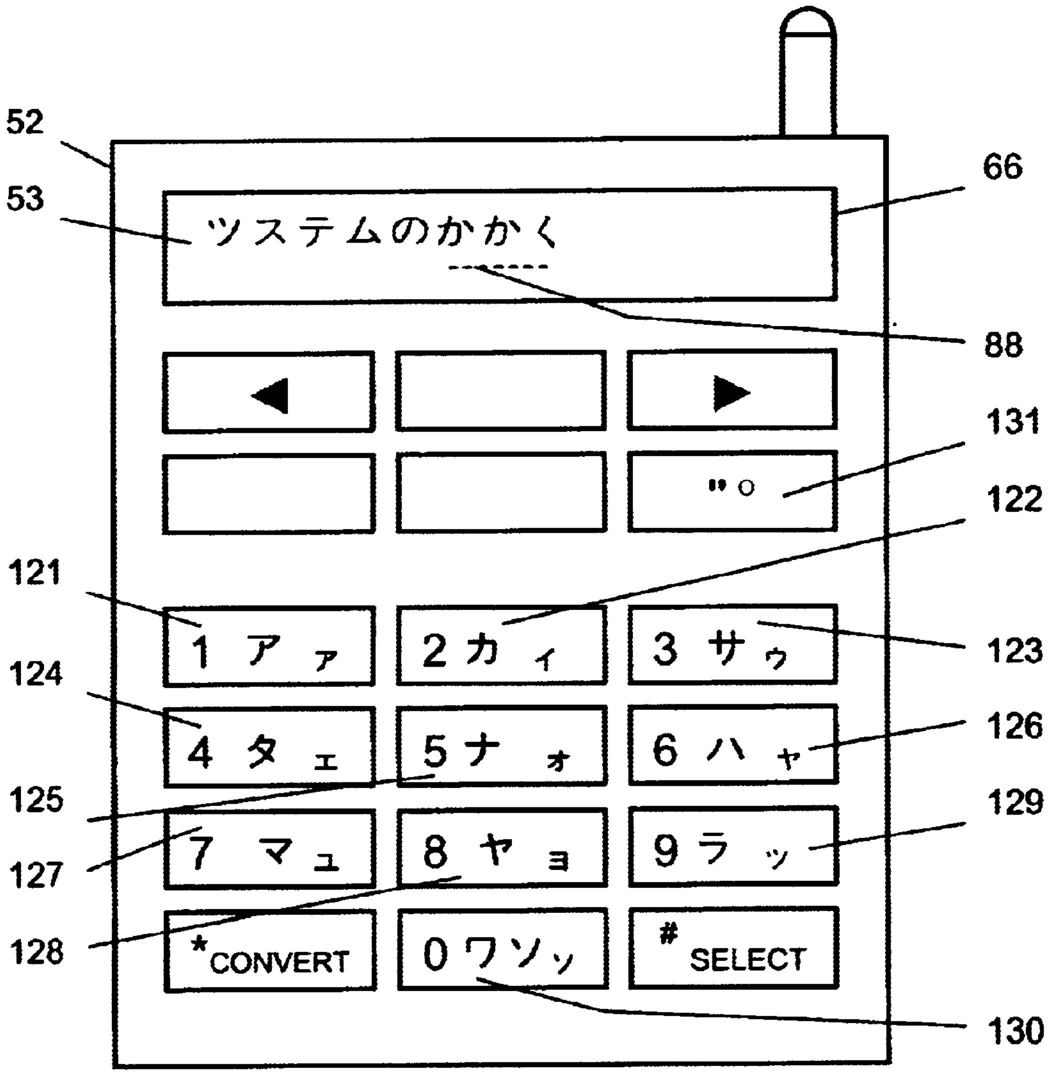
FIG. 1*b* is a schematic view of a cellular telephone keypad, similar to FIG. 1*a*, but wherein each of a plurality of keys is associated with one or more romaji characters.
Figure 1C:
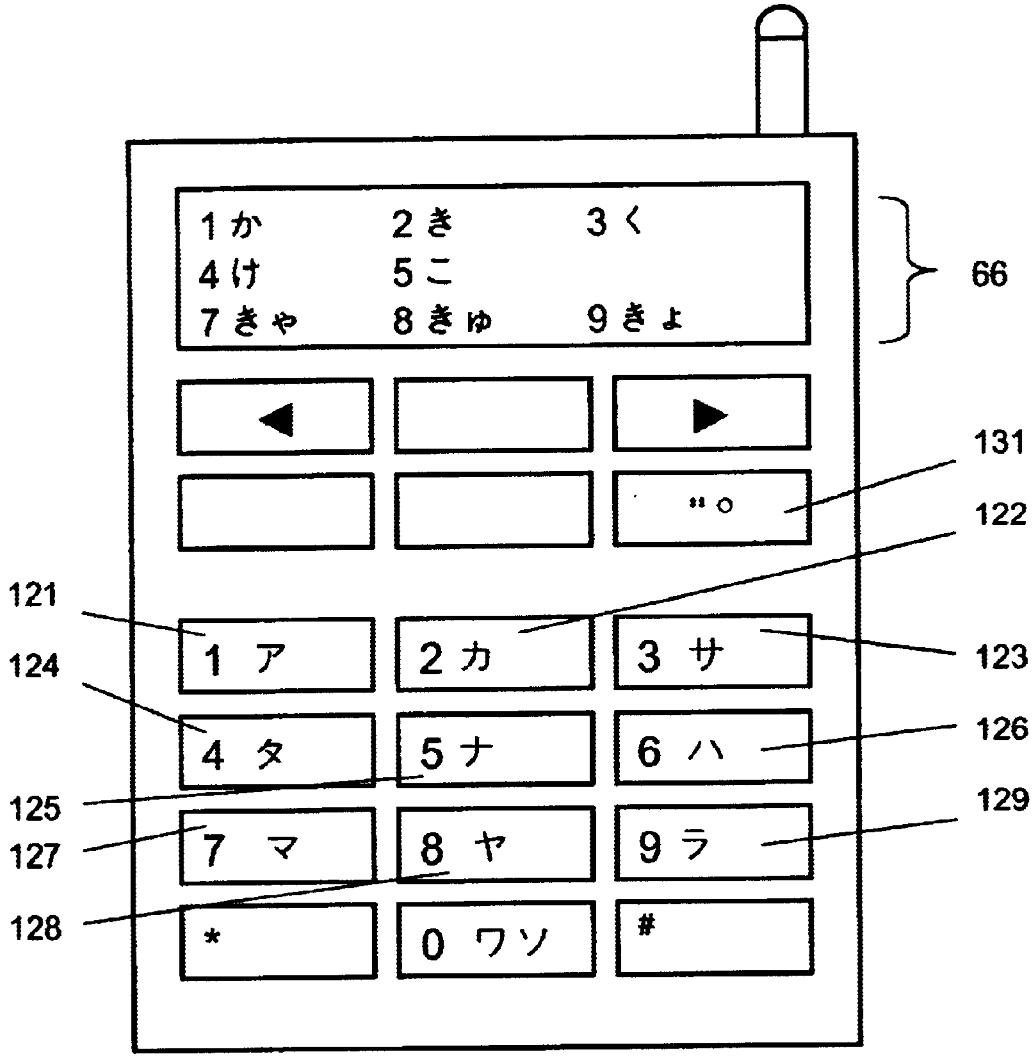
FIG. 1*c* is a schematic view of a cellular telephone keypad incorporating an embodiment of the reduced keyboard system of the present invention with limited or no display capabilities.

FIG. 1*b* is a schematic view of a cellular telephone keypad, similar to FIG. 1*a*. A reduced keyboard 54' includes a plurality of data entry keys 21'–30'. One or more of the data entry keys are associated with a plurality of romaji characters (Latin letters used to phonetically spell the pronunciations of Japanese kana characters), and are labeled with each of the romaji characters associated with the key. An input sequence is generated each time an input is selected by user manipulation of the input device. The generated input sequence has a textual interpretation that is ambiguous due to the plurality of romaji characters associated with one or more of the data entry keys. This embodiment of the system is conceptually very similar to that shown in FIG. 1*a,* but does not require a diacritic key 68 since the kana with diacritic marks are specified in romaji through the use of different Latin letters. For example the kana か is specified in romaji as "KA," while the same kana with the diacritic dakuten attached (が) is specified in romaji as "GA."

In a normal mode of operation, the keystrokes are initially interpreted as the entry of a sequence of romaji corresponding to the kana to spell a Yomikata which corresponds to the desired word interpretation. For example, as shown in FIG. 1*b,* a keystroke sequence 5 KLM, 4 HIJ, 5 KLM, 1 ABC, 5 KLM and 9 TUV has been entered by a user. As keys are entered, a vocabulary module look-up is simultaneously performed to locate Yomikata that match the keystroke sequence. The Yomikata are returned from the vocabulary module according to frequency of use, with the most commonly used Yomikata listed first. Using the example keystroke sequence, the Yomikata KIKAKU ("きかく") and MIKAKU ("みかく") are identified from the vocabulary module as being the two most probable Yomikata corresponding to the keystroke sequence. Of the two identified Yomikata in this selection list, KIKAKU "きかく" is the most frequently used, so it is taken as the default interpretation and provisionally posted as hiragana text at the insertion point 88'. As shown in FIG. 1*b,* prior to pressing the Select key 60', this first Yomikata is taken as the default interpretation and is posted at the insertion point 88' using a distinctive format. Specifying a Yomikata in romaji requires on average approximately twice as many characters (and consequently twice as many key selections) as the corresponding specification in kana. Consequently, the system shown in FIG. 1*b* will generally result in fewer ambiguous choices than that shown in FIG. 1*a,* since statistically more information is specified when twice as many keystrokes are entered that are distributed among the same number of inputs keys (ten).

II. Unambiguous Text Entry Method

The present invention also provides a method for a reduced keyboard for the Japanese language which allows the user to unambiguously specify each desired kana as an ordered pair of keystrokes. The Japanese syllabary includes 108 syllables (counting the "small" っ, ゃ, ゅ, and ょ as separate syllables from the full-size つ, や, ゆ, and よ since they are written and pronounced in a distinct fashion). There are some additional seldom used syllables, such as the "small" versions of the vowel syllables ぁ, ぃ, ぅ, ぇ, and ぉ that are primarily used only in katakana. These seldom used syllables may also be easily generated by the system when used in conjunction with a display as discussed below. Of the 108 standard syllables, 37 are generated by simply adding one of the diacritic marks ″ or ° to one of the other 71 syllables. These 71 syllables without diacritic marks can be logically organized into a single matrix of nine or ten rows and eight to ten columns, as explained in detail below. A plurality of the keys on the keyboard of the present invention are labeled with two kana, one representing the consonant associated with a given row of the matrix, and second kana representing the vowel associated with a given column of the matrix.

The organization is logical and intuitive for a native speaker of Japanese for 106 of the 108 syllables, and the method for generating the remaining two syllables (small っ, and ん) is simple and easily learned. Every syllable is generated by a single pair of keystrokes, including syllables with palatalized vowels that are represented by two separate kana (for example, KYA, KYU, and KYO). This results in significantly fewer keystrokes than is required by the currently used multiple-stroke method for entering kana on a reduced keyboard. Thus, the present invention provides a reduced keyboard that is easily understood and quickly learned by native speakers of Japanese, and that is efficient in terms of reducing the length of input keystroke sequences.

In the preferred embodiment, 71 syllables of the Japanese syllabary are organized in the matrix shown in Table 4a. In the general case which includes all 69 syllables appearing in the first eight columns of Table 4a, the first keystroke of the corresponding ordered pair determines the consonant of the syllable to be output, and the second keystroke determines the vowel. The two remaining syllables ("small" っ and ん) are exceptional cases discussed below. The remaining 37 syllables not shown in Table 4a are output by generating the corresponding base syllable appearing in the matrix of Table 4a, then adding a diacritic mark using a separate key. FIG. 1*c* shows a schematic view of a cellular telephone with limited or no display capabilities which has a keypad incorporating an embodiment of the reduced keyboard system of the present invention for the Japanese language. Each of the ten keys 121 through 130 is labeled with one of the kana labels from the row headers in the column labeled "Key 1" in Table 4a (hereinafter a "row label kana") in the upper left region of the key, and with one of the kana labels from the column headers in the row labeled "Key 2" in Table 4a (hereinafter a "column label kana") in the lower right region of the key. In the preferred embodiment, a syllable appearing in Table 4a is generated when the two key sequence is entered wherein the first key is the key labeled at the upper left with the row label kana corresponding to the row in which the syllable appears, and the second key is the key labeled at the lower right with the column label kana corresponding to the column in which the syllable appears. The ten row label kana appear in their standard lexicographic sequence at the upper left of the ten keys 121–130 of the keyboard shown in FIG. 1*c*. The first five column label kana appear in their standard lexicographic sequence at the lower right of the first five keys 121–125 of the keyboard, followed by the "small" ゃ,ゅ, and ょ (also in standard lexicographic sequence) on the next three keys 126–128. Finally, the "small" っ appears on the next key 129 followed by ん on key 130. A diacritic mark may be added to any syllable by activating the Diacritic key 131 once to generate the diacritic " and twice in succession to generate the diacritic °. When a diacritic is added to a syllable with a palatalized vowel (represented by two output kana consisting of a syllable from the "い" column of Table 4 followed by a "small" ゃ, ゅ, or ょ), the diacritic is added to the output at its correct location immediately following the first of the two kana.

Thus, for the 69 syllables appearing in the first eight columns of Table 4a, the first keystroke of the corresponding ordered pair determines the consonant of the syllable to be output, and the second keystroke determines the vowel. In another preferred embodiment, a display is used to provide feedback to the user. Upon receipt of the first keystroke of an ordered pair, the system displays the various syllables that can be generated by each key that is valid as the second keystroke of an ordered pair. The association between which key generates which syllable can be indicated by labeling each syllable with the number (or other identifier) associated with the key that generates the syllable. Alternatively, the syllables can be displayed (with or without a numeric label) in a geometric arrangement that corresponds with the arrangement of the corresponding keys. For example, in the case of a device such as a cellular telephone with a text display, the syllables can be displayed in a three-by-three matrix corresponding to the arrangement of the 1 through 9 keys of the telephone keypad. When a display is used in this fashion, even rarely used syllables such as the "small" versions of the vowel syllables あ,い,う,え, and お can be easily generated. For example, using the matrix shown in Table 4b, upon pressing the first key of an ordered pair wherein the first key corresponds to the vowel-only syllables in the top row of Table 4b, the display shows the normal-sized versions of the vowel syllables あ,い,う,え, and お associated with a second keystroke on keys 1 through 5, and the "small" versions of the vowel syllables あ,い,う,え, and お associated with keys 6 through 0.

FIG. 1*d* shows a schematic view of a cellular telephone that includes text display capabilities, with a keypad incorporating an embodiment of the reduced keyboard system of the present invention for the Japanese language. Each of the ten keys 121 through 130 is labeled only with one of the row label kana from Table 4b in a central region of the key. The ten row label kana appear in their standard lexicographic sequence on the ten keys 121–130 of the keyboard shown in FIG. 1*d*. FIG. 1*d* shows the appearance of the display following the activation of key 122 (ambiguously associated with か, き, く, け, and こ) as the first key of an ordered pair of keystrokes. In the preferred embodiment, the syllables appearing in the corresponding row of Table 4b are displayed when the key labeled with the row label kana is activated. The display shows the association between the kana that will be generated and each key that may be pressed as a second key of an ordered pair of keystrokes to generate the kana. The columns in Table 4b are labeled with the numbers which also appear on each key of the cellular telephone shown in FIG. 1*d*. Note that in this preferred embodiment, the three syllables with palatalized vowels (きゃ, きゅ, and きょ) are associated with keys 127–129 (labeled with the digits 7, 8 and 9) and thus these can be displayed in a single row of the display. This makes it easier for the user to associate these related syllables to the keys that will generate them, since the association can be made not only in terms of the number labels on keys and displayed syllables, but also in terms of the same three-by-three matrix arrangement of syllables on the display and keys in the keypad. As before, a diacritic mark is added to any syllable by activating the Diacritic key 131 once to generate the diacritic " and twice in succession to generate the diacritic °. When a diacritic is added to a syllable with a palatalized vowel (associated with a second keystroke on keys 127–129 in the example shown in FIG. 1*d*), the diacritic is added to the output at its correct location immediately following the first of the two kana.

FIGS. 2*b* and 2*c* show the preferred embodiment of the present system as it might appear when implemented as a keyboard displayed on a portable computer touchscreen. FIG. 2*b* shows the keyboard 150 as it is displayed prior to the first keystroke of an ordered pair of keystrokes. FIG. 2*c* shows the keyboard 170 as it is displayed following an activation of the key 152 of FIG. 2*b* associated with the syllables か, き, く, け, and こ as the first of an ordered pair of keystrokes. In FIG. 2*c* the keys 171–179 are labeled with the kana that will be generated for output when the keys are activated, respectively. This arrangement of keys and syllables relies on the same three-by-three matrix arrangement as is shown on the display in FIG. 1*d*, associating syllables with keys of the keypad using the same conceptual organization of syllables shown in Table 4b.

In another preferred embodiment, the entry of a two key sequence corresponding to an empty cell in Table 4a or 4b produces no output, and at the user's option, generates an audible error signal. In an alternate embodiment, the cell corresponding to a double hit on key 129 in FIG. 1*c* (labeled with the column label kana "small" っ) also generates a "small" っ. In another alternate embodiment, all of the cells in the column labeled with the column label kana "small" っ also generate a "small" っ. Likewise, in another alternate embodiment, all of the cells in the column labeled with the column label kana ん generate an ん. It will be evident to one of ordinary skill in the art that various modifications can be made to the matrix of Tables 4a and 4b without departing from the scope of the invention. For example, the "small" っ and ん are exceptional cases that may be specified in a wide variety of ways such as by assigning them to a separate key which is activated once to generate "small" っ and twice in succession to generate an ん. The more important aspect of the present invention is the manner of specification of the syllables in the first eight columns of Table 4a (or columns 1–5 and 7–9 of Table 4b).

Figure 4:
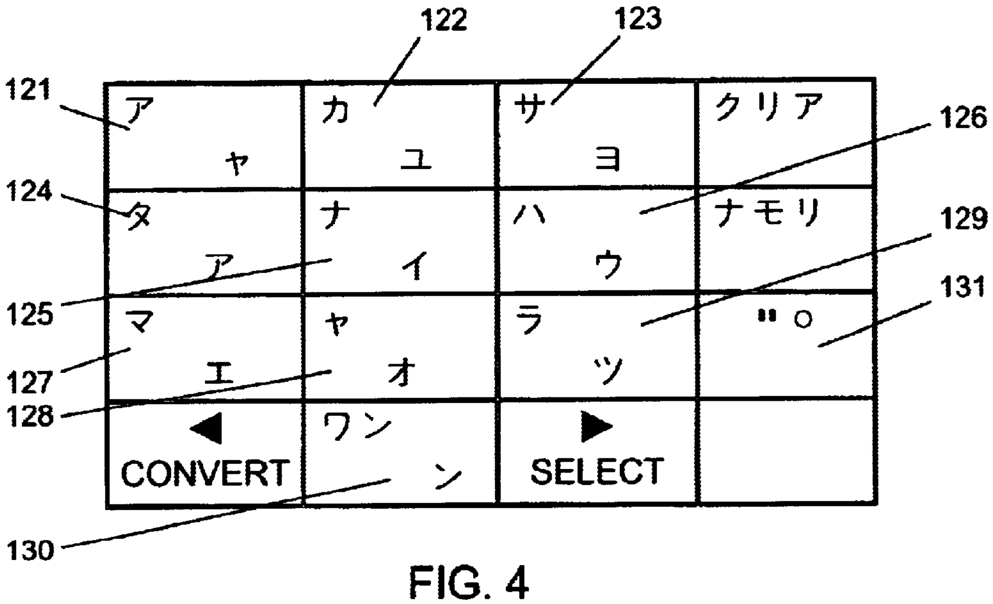
FIG. 4 is a schematic view of an alternate embodiment of a portable computer touchscreen incorporating a reduced keyboard system of the present invention.
Figure 5:
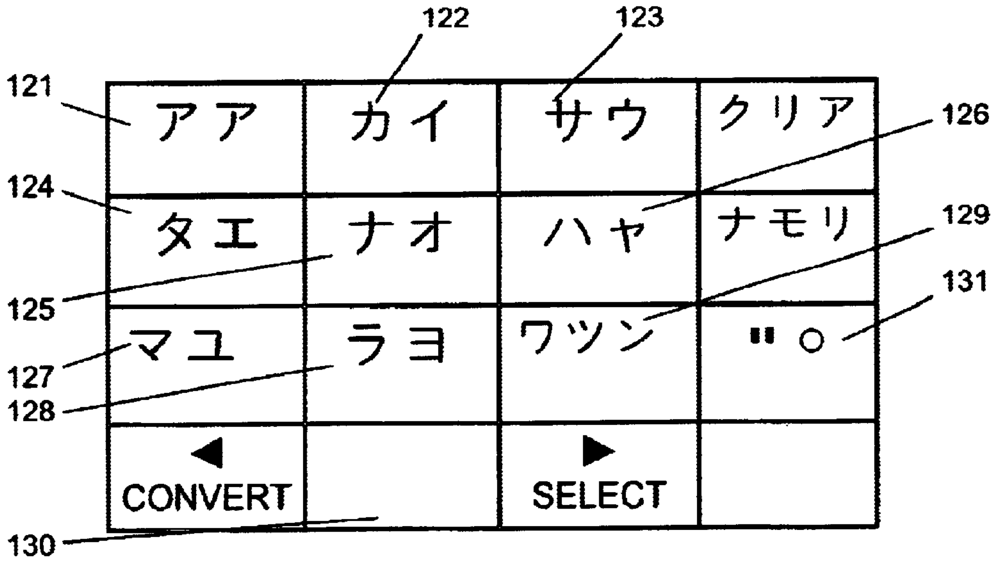
FIG. 5 is a schematic view of yet another alternate embodiment of a portable computer touchscreen incorporating a reduced keyboard system of the present invention having nine keys.

It will be evident to one of ordinary skill in the art that, although the assignment of row label kana and column label kana to the keys in the preferred embodiment shown in FIG. 1*c* is the most natural, alternate embodiments are also possible in which row label kana and column label kana are assigned to keys in other combinations without departing from the scope of the invention. FIGS. 4 and 5 show some of the many possible alternate embodiments in which row label kana and column label kana are assigned to keys in an alternate arrangement.

In an alternate embodiment, the system of the present invention can also be implemented on a keyboard with only nine keys as shown in FIG. 5. Sixty-eight (68) of the 71 distinct syllables of Table 4a can also be organized as shown in Table 5, in which the row corresponding to the row label や has been eliminated. In such a nine key system, the three syllables ゃ, ゅ, and ょ are generated from ordered pair key sequences in which the first key is the row label あ corresponding to cells in the first row of the table. The syllables "small" っ and ん are generated by key sequences corresponding to cells in the last column, which includes the last two columns of Table 4a merged together.

In another aspect of the present invention, the system provides an indication to the user as to whether the next keystroke will be processed as the first keystroke of an ordered pair (determining the consonant of the syllable to be output), or as the second keystroke of an ordered pair (determining the vowel of the syllable to be output). For example, this indication can be implemented as a pair of labeled LEDs that are alternately lit. Alternatively, two distinct icons can be shown alternately on a display. It will be evident to one of ordinary skill in the art that many other alternate embodiments of such an indication are also possible without departing from the scope of the invention.

The combined effects of the assignment of appropriate labels to keys as shown in FIGS. 1c and 2b; the generation of syllables from ordered pairs of keystrokes; the provision of appropriate feedback following a first keystroke of an ordered pair as shown in FIGS. 1d and 2c; the natural correspondence between the organization of key labels and the standard ordering and arrangement of the Japanese syllabary; and the inclusion of an indication to the user as to whether the next keystroke corresponds to row label kana specifying the consonant of a syllable or a column label kana specifying the vowel results in a system which is both efficient for unambiguously inputting text and which is easily understood and quickly learned by native speakers of Japanese. High speed unambiguous entry of text is therefore achieved using a keyboard having a small number of full-size keys that is easy to learn and use.

III. Text Entry Method Combining Ambiguous and Unambiguous Keystrokes

In yet another aspect of the invention, both ambiguous and unambiguous specification of syllables are combined to achieve greater efficiencies in the input method. In one preferred embodiment, at the user's option the first syllable of a word to be entered is unambiguously specified using the two-keystroke method disclosed above. Note that in the case of syllables with palatalized vowels, these first two keystrokes result in the specification of two hiragana characters (including the small ゃ, ゅ, or ょ that indicates the palatalized vowel). The remaining syllables of a word or phrase are specified ambiguously with a single keystroke for each syllable. In the case of words as short as one or two syllables, this combined method can significantly reduce the ambiguity of the input sequence, and consequently reduce the number of candidate readings that the user may need to examine in order to find the desired reading. In another alternate embodiment, the multiple-stroke specification method as known in the art may be used to unambiguously specify only the first syllable of a word or phrase, and the remainder of the syllables are specified ambiguously.

In yet another alternate embodiment using the ambiguous specification method of the present invention, the two-stroke method may be used to specify any desired syllable in a word or phrase (rather than only the first). For example, pressing and holding a key past a certain time threshold can indicate that the immediately following keystroke is the second of two keystrokes to unambiguously specify the desired syllable. This approach has two benefits. One is that any syllable (rather than only the first syllable of a word or phrase) may be unambiguously specified. The second is that the user can choose to unambiguously specify a syllable only when it is thought that this will increase the efficiency of input. For some less common words and phrases (and especially for shorter words), the default presentation of the most commonly used words and phrases may require a number of activations of the Select key to select the desired Yomikata when all syllables are specified ambiguously. In such cases, unambiguously specifying at least one syllable can result in significantly fewer keystrokes being required to generate the desired Yomikata, since the user need only select among those Yomikata which share the same unambiguously specified syllable(s) at the same position(s).

IV. Database Structure to Support Disambiguation of Ambiguous Keystrokes

The database of words and phrases that is used to disambiguate input sequences is stored in a vocabulary module using one or more tree data structures. Words corresponding to a particular keystroke sequence are constructed from data stored in a tree structure in the form of instructions which modify the set of words and word stems associated with the immediately preceding keystroke sequence. Thus, as each new keystroke in a sequence is processed, the set of instructions associated with that keystroke are used to create a new set of words and word stems associated with the keystroke sequence which has the new keystroke appended to it. In this way, words and word stems are not stored explicitly in the database, they are constructed based on the key sequence used to access them.

In the case of the Japanese language, the tree data structure includes two types of instructions. Primary instructions create the Yomikata of the words and phrases stored in a vocabulary module which consist of sequences of kana corresponding to the pronunciation of the words and phrases. Corresponding to each Yomikata is a list of secondary instructions which create the Midashigo associated with each Yomikata. Each Yomikata is created by a primary instruction which modifies one of the Yomikata associated with the immediately preceding keystroke sequence. Likewise, each Midashigo is created by a secondary instruction which modifies one of the Midashigo associated with the Yomikata which was modified by the primary instruction with which the secondary instruction is associated.

Figure 6:
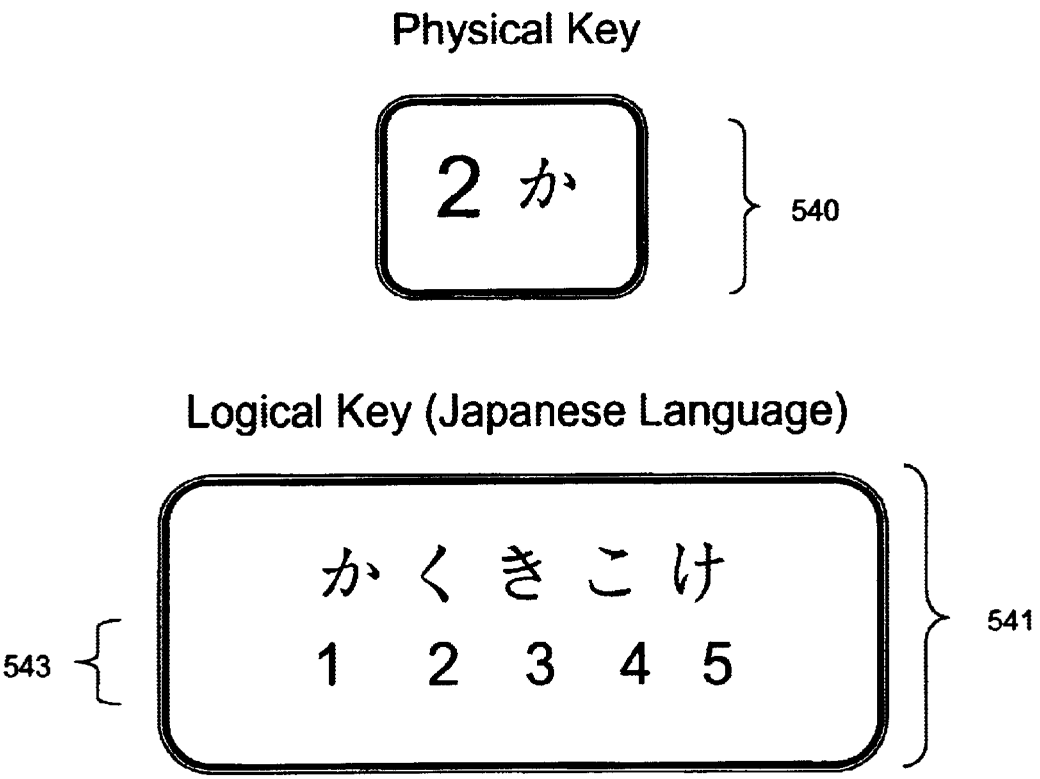
FIG. 6 compares the physical association of symbols to keys with an instance of a logical association including additional accented variations of the characters appearing on the physical key.
Figures 7, 8A:
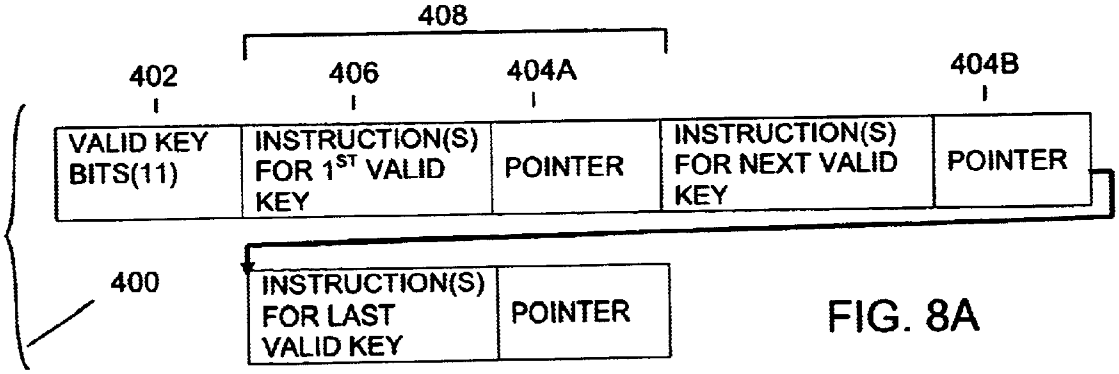
FIG. 7 is an example of a table associating logical symbols to key indices.
FIG. 8A depicts an internal arrangement of data in a node of a tree of a vocabulary module.

Since each primary instruction refers to a known key, the information as to which particular kana is to be appended is preferably stored as a logical index into the set of kana associated with the key. A representative diagram of a single key 540 is depicted in FIG. 6. The internal, logical representation of the keys in the preferred embodiment need not mirror the physical arrangement. For example 541 is a preferred logical description of a key associated with the "2か" key in a Japanese vocabulary module. Four additional symbols 542 (き, く, け, こ) are also associated with the key. Also, the symbols are preferably indexed 543 by order of their decreasing frequency of use in a Japanese lexicon (く, き, こ, け). By extension, FIG. 7 is a preferred table relating the indices of logical symbols to key indices to be used in disambiguation of key presses into Japanese words. FIG. 7 shows a table corresponding to the preferred embodiment illustrated in FIG. 1a, which has a separate Diacritic key 68 that is used to specify when the preceding character is to appear with dakuten or handakuten. Pressing the Diacritic key 68 is ambiguous with respect to whether dakuten or handakuten is to be appended to the preceding kana. In an alternate embodiment, the Diacritic key 68 is unambiguous and is pressed once for dakuten and twice in succession to specify handakuten. In another preferred embodiment, all forms of a given kana (with and without dakuten or handakuten), are associated with the same key, and would also appear in the same row of the Logical Symbol Index Table. This allows the system using the database to be set up so that the use of the Diacritic key 68 is optional. In such a system, if the option to require the use of the Diacritic key 68 is turned off, instructions which specify the addition of a kana with diacritics are skipped over until the Diacritic key 68 has been pressed once (for dakuten) or twice (for handakuten).

Figure 10:
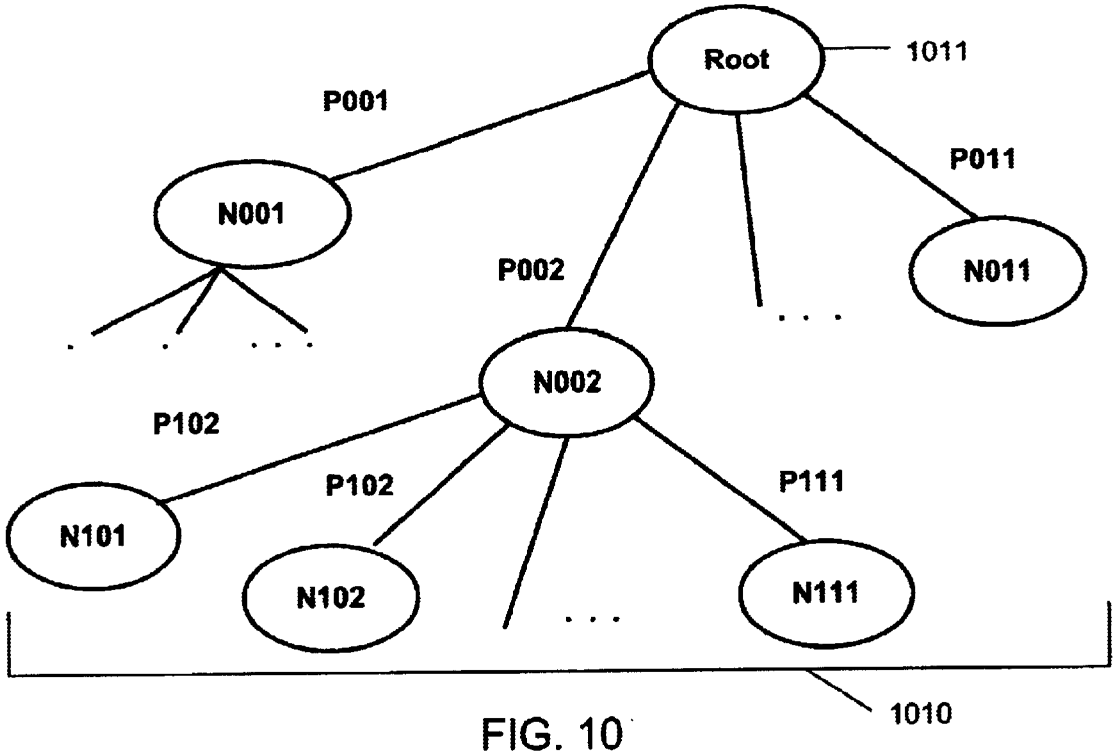
FIG. 10 depicts the preferred tree structure of an uncompressed vocabulary module.

A representative diagram of a tree in a word object vocabulary module 1010 is depicted in FIG. 10. A tree data structure is used to organize the objects in a vocabulary module based on a corresponding keystroke sequence. As shown in FIG. 10, each node N001, N002, . . . N011 in the vocabulary module tree represents a particular keystroke sequence. The nodes in the tree are connected by paths P001, P002, . . . P011. Since there are eleven ambiguous data keys in the preferred embodiment of the disambiguating system, each parent node in the vocabulary module tree may be connected with eleven children nodes. Nodes connected by paths indicate valid keystroke sequences, while the lack of a path from a node indicates an invalid keystroke sequence, i.e., one which does not correspond to any stored word. Note that, in the case of an invalid input keystroke sequence, the system of the preferred embodiment would still be able to construct and display a numeric interpretation of the input key sequence. The appearance of a numeric interpretation at the insertion point (without any press of the Select key) indicates to the user that the vocabulary module contains no word corresponding to the input key sequence.

A vocabulary module tree is traversed based on a received keystroke sequence. For example, pressing the second data key from the root node 1011 causes data associated with the first key to be fetched from inside the root node 1011 and evaluated, then the path P002 to node N002 is traversed. Pressing the second data key a second time causes data associated with the second key to be fetched from node N002 and evaluated, then the path P102 to node N102 is traversed. As will be described in greater detail below, each node is associated with a number of objects corresponding to the keystroke sequence. As each keystroke is received and the corresponding node is processed, an object list is generated of the objects corresponding to the keystroke sequence. The object list from each vocabulary module is used by the main routine of the disambiguating system to generate a selection list.

FIG. 8A is a block diagram of a preferred data structure 400 associated with each node. The data structure contains information that links each parent node to children nodes in the vocabulary module tree. The data structure also contains information (instructions) to identify the objects associated with the particular keystroke sequences represented by the node.

The first field in the node data structure 400 is a valid keys bits field 402 that indicates the number and identity of children nodes that are connected to the parent node and which of the eleven possible keys are associated with information (instructions) to identify (construct) the objects associated with the particular keystroke sequences represented by the node. Since there are eleven data keys in the preferred embodiment, at most eleven children nodes may be connected to any parent node, and eleven valid keys bits are therefore provided in the valid keys bits field to indicate the presence or absence of child nodes. Each valid keys bit is associated with a pointer field 404*a*, 404*b*, . . . 404*n* that contains a pointer to the respective child node data structure in the vocabulary module. Since a child node is only present if the keystroke associated with the child node is a valid continuation of the keystroke sequence associated with the parent node, the number of pointer fields varies for each node. For example, valid keys bits field 402 may indicate that only six of the possible eleven keystrokes lead to a valid child node. Because there are only six valid paths, only six pointer fields are included in the data structure for the parent node. The valid keys bits field 402 is used to ascertain the identity of the pointer fields contained within the node data structure. If a keystroke does not lead to a valid child node, the associated pointer field is omitted from the node data structure in order to conserve the amount of memory space required to store the vocabulary module.

Associated with each node are a number of objects that correspond to the keystroke sequence represented by the node. Each of the objects is described by an instruction in 406 in a packet 408 attached to a particular valid key as indicated by the pattern of bits in the valid keys bits field 402 contained in the node data structure.

Figure 11:
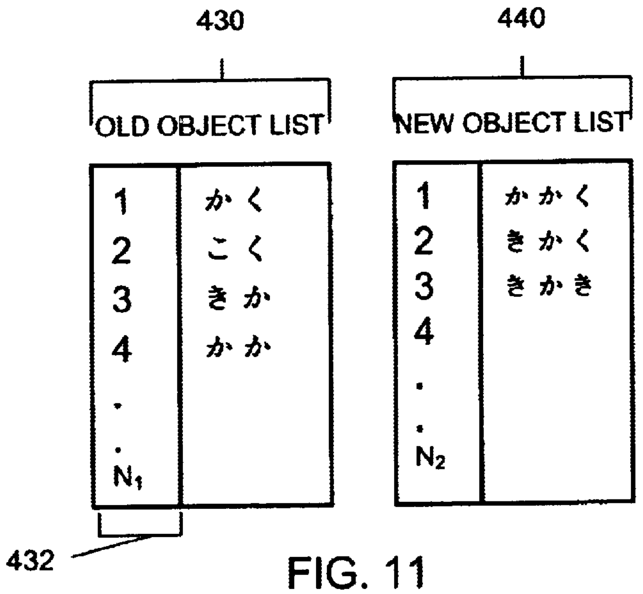
FIG. 11 depicts example states of object lists, which are the preferred embodiment for intermediate storage of objects in the process of being retrieved from the vocabulary modules.
Figure 12A:
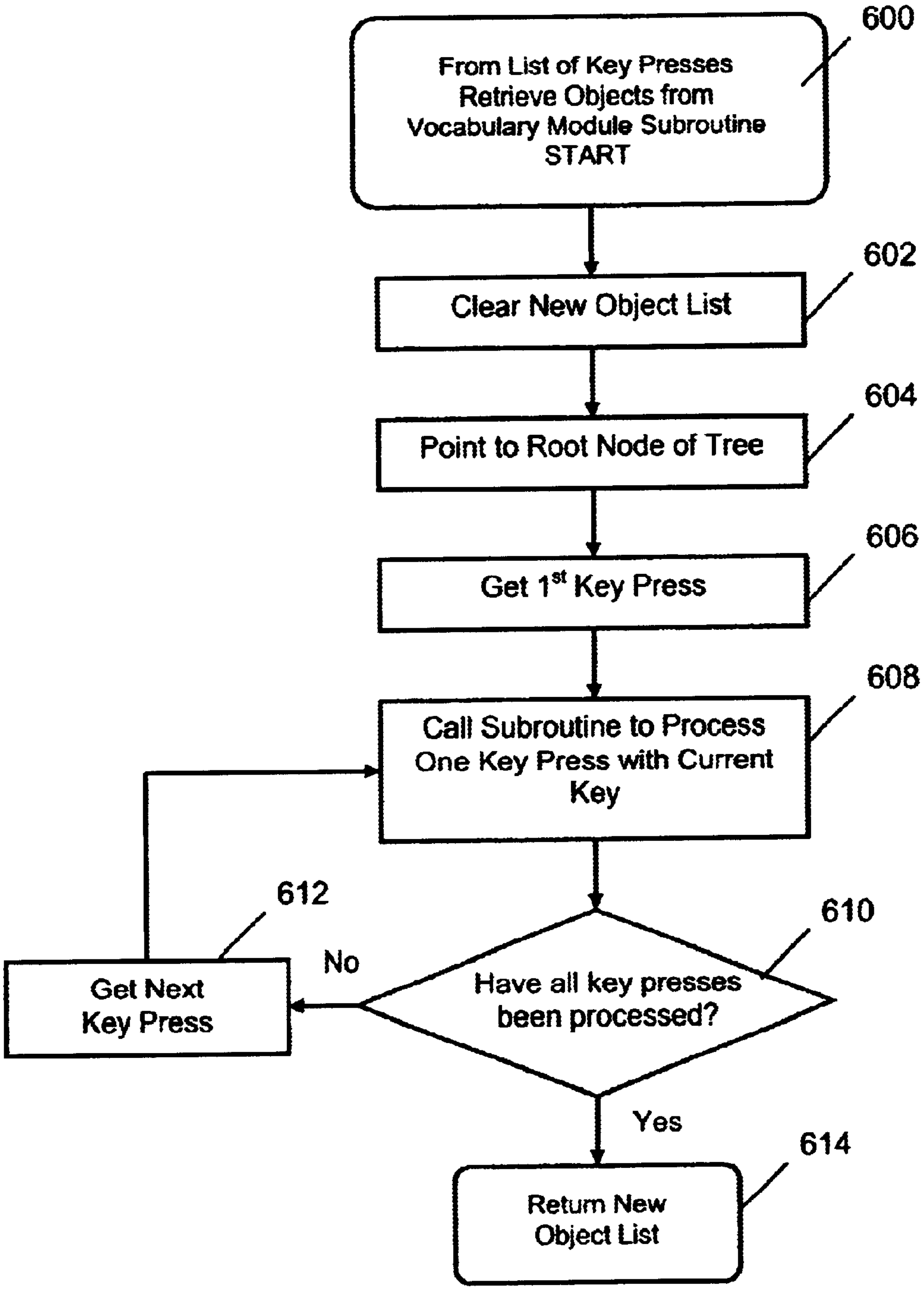
FIG. 12 is a flowchart of a preferred embodiment of a software process for retrieving text objects from a vocabulary module given a list of key presses.
Figure 12B:
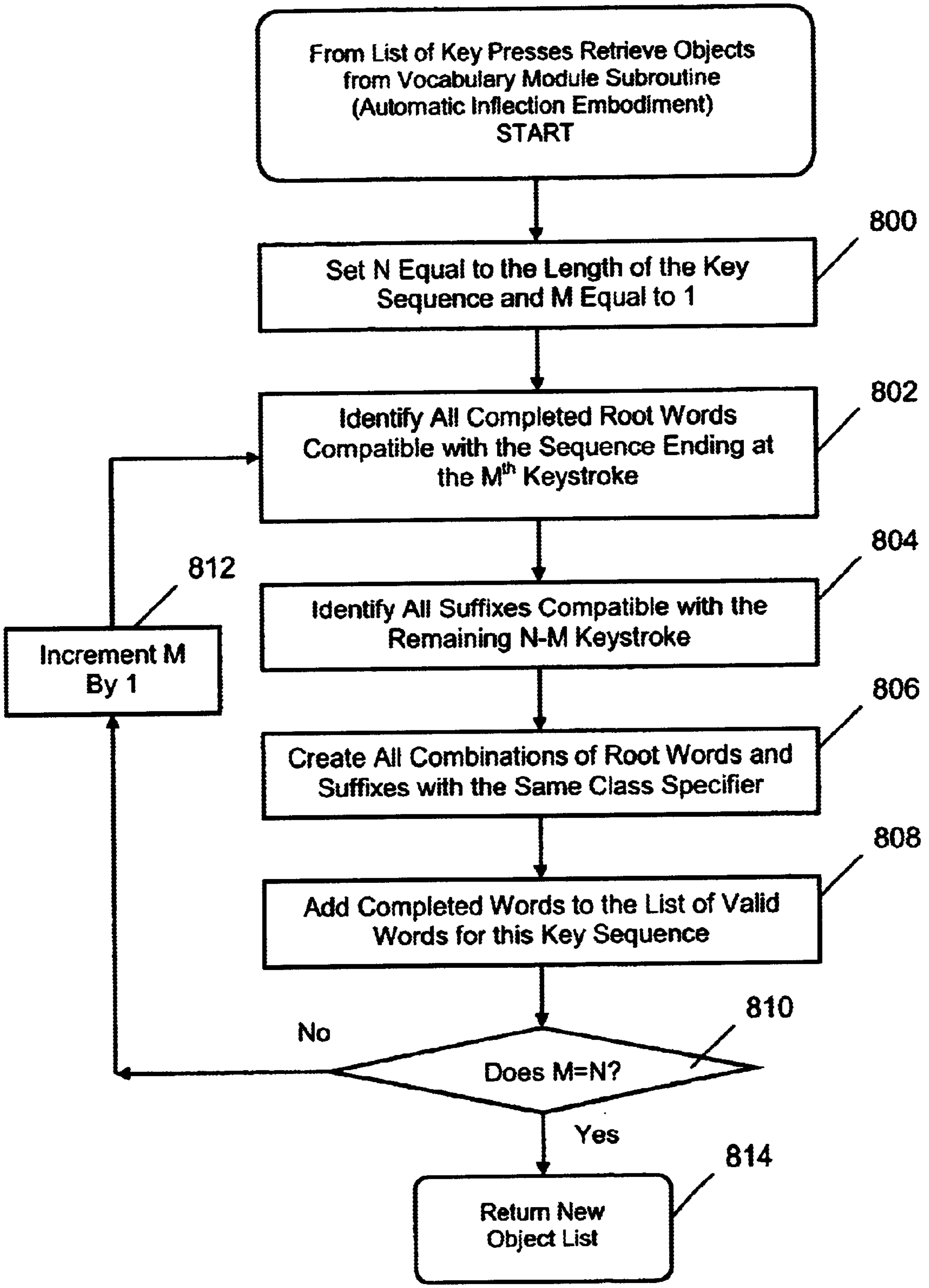
Figure 12C:
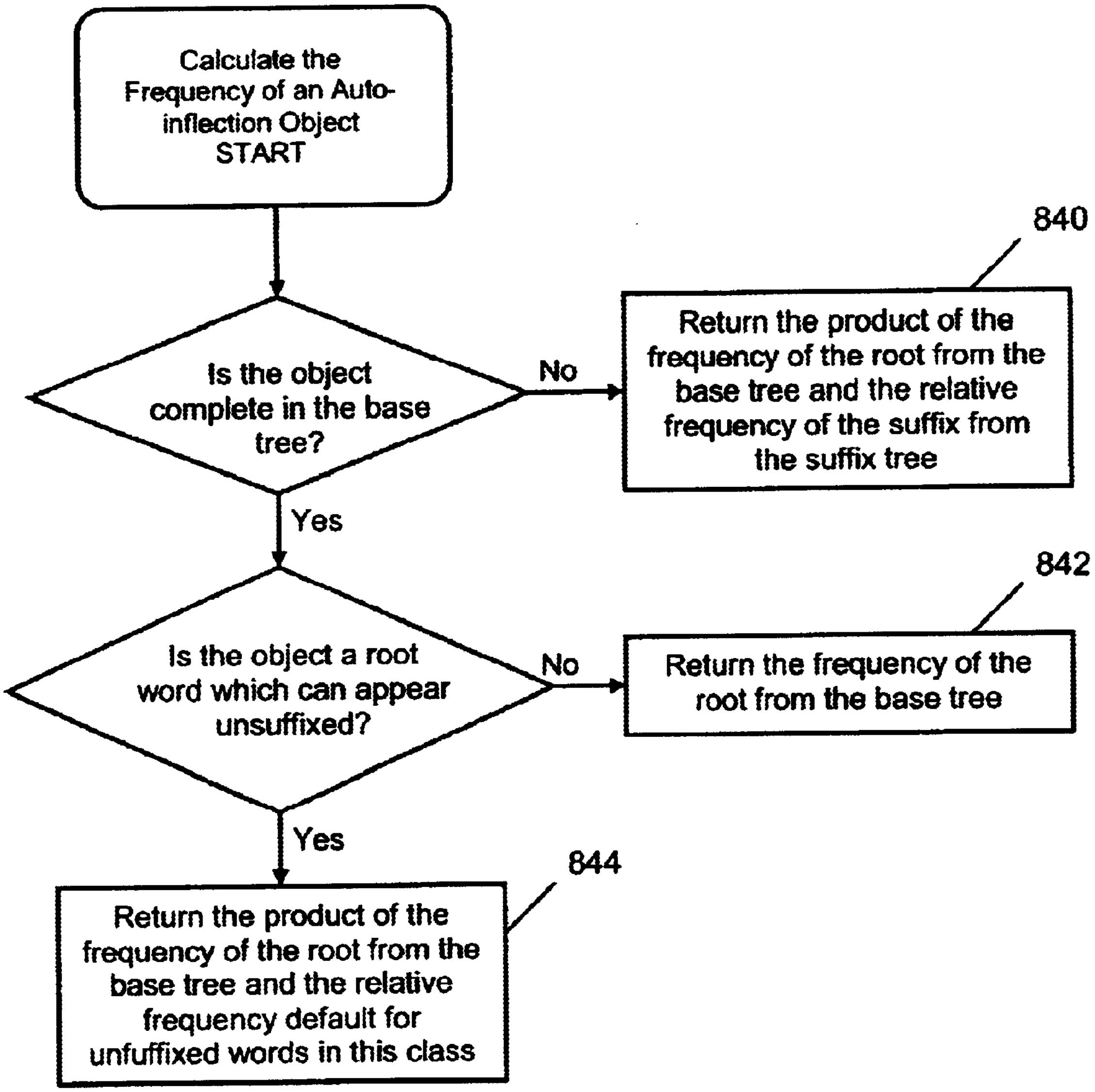
Figure 12D:
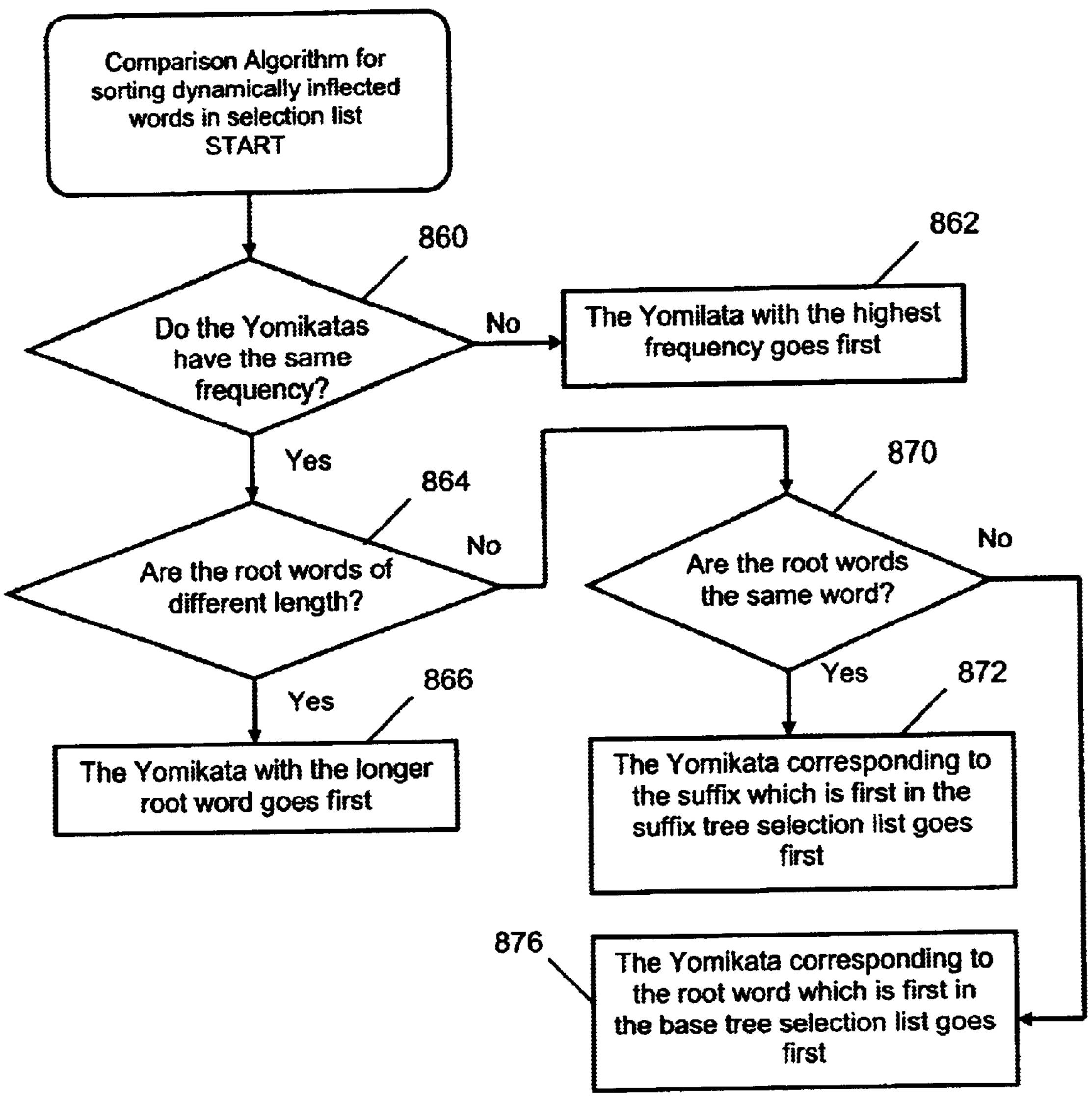
Figure 12E:
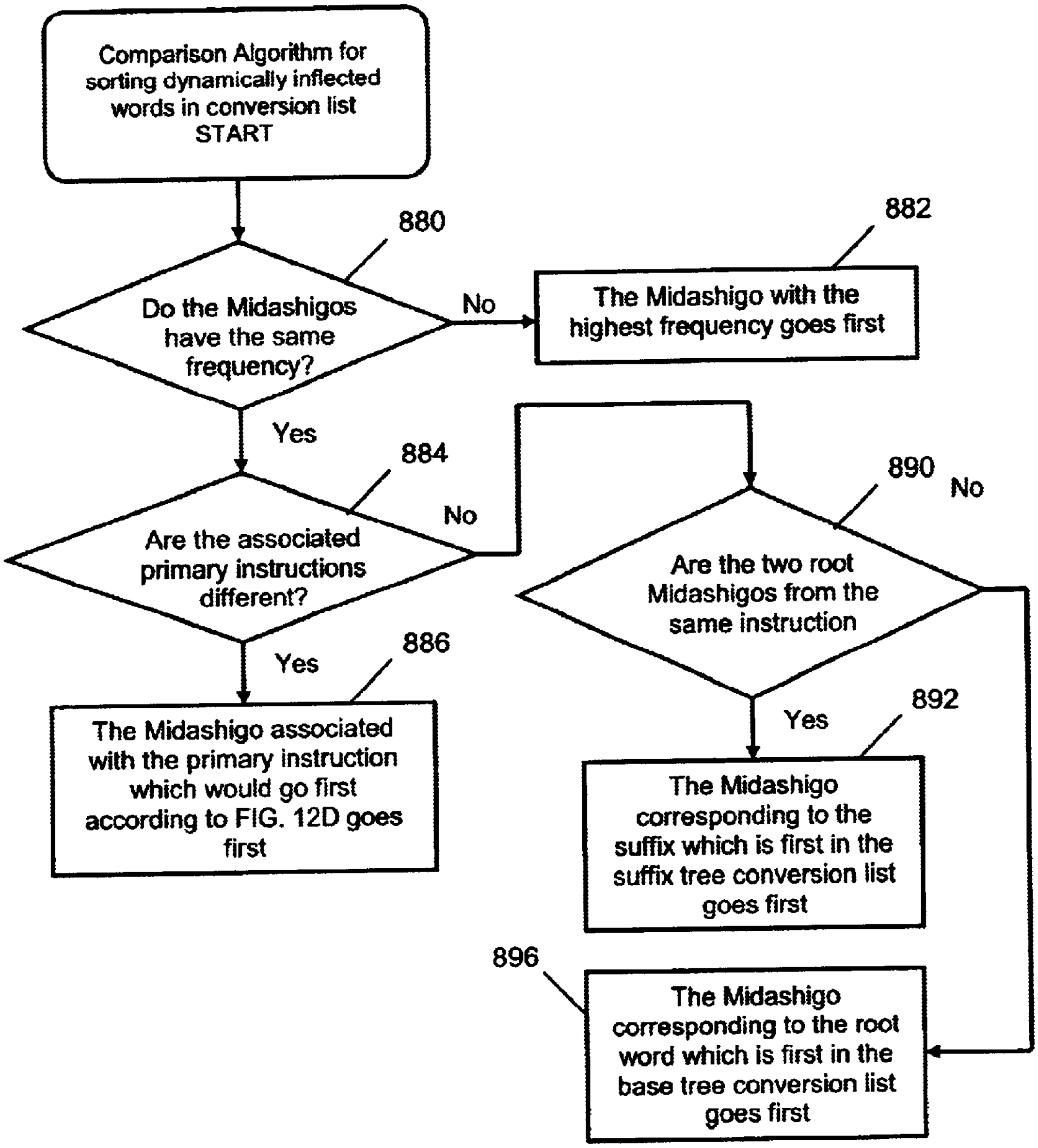

Each instruction in each packet 406 describes one of the objects corresponding to the keystroke sequence represented by each node. Describing an object requires maintaining two object lists. FIG. 11 depicts representative object lists created dynamically by the disambiguating software process from a parent and a child in a vocabulary module tree. Object list 430 is an object list containing objects 1-$N_1$ associated with a node representing two keystrokes. Object list 440 is an object list containing objects 1-$N_2$ associated with a node representing three keystrokes. Each object list contains a list of all objects that are associated with each node. Object list 430 is associated with a parent node representing the keystroke sequence 2か 2か from the keyboard of FIG. 1*a*. Object list 440 is associated with a child node representing the keystroke sequence 2か 2か 2か. It will be appreciated that the size of the object list is varied to account for the actual number of objects associated with each node.

Each Yomikata object associated with a child node is constructed by a primary instruction that adds a kana character onto an object that was constructed by the parent node. Each instruction in the packet of instructions 406 in FIG. 8A therefore contains an OBJECT-LIST-INDEX field 556 shown in FIG. 8B that identifies from a parent node object list an object that is used to construct the child node object. For example, with reference to FIG. 11, the third object "きか" in the old object list 430 is used to construct the second object "きかく" in the new object list 440. The previous object identifier field OBJECT-LIST-INDEX 556 therefore provides a link to the entries in the old object list to identify the old object used to construct the new object.

The instruction 558 contains a LOGICAL-SYMBOL-INDEX field 555 to indicate the symbol to add to the identified object in order to construct the new object. The LOGICAL-SYMBOL-INDEX fields therefore specify the letters from final key in the node's key sequence which will be appended to construct the new objects. The letter is specified by a table such as that depicted in FIG. 7. For example, with reference to FIG. 11, the first object "かかく" in the new object list 440 is constructed by using the fourth object "かか" in the old object list 430 and adding an additional keystroke to specify the く. In the logical symbol index table of FIG. 7, "く" is the second logical letter on the 2か key, therefore the LOGICAL-SYMBOL-INDEX field of the instruction which generated the object "かかく" is set to 2 to indicate the second letter in the table. Encoding the objects in this manner makes use of the known key sequence associated with each node and the known association of letters to keys to greatly reduce the amount of storage space required for each vocabulary module.

The vocabulary encoding technique also allows access to vocabulary module entries without searching. On receipt of each new valid keystroke the system executes the instructions associated with the key at the current node to construct a new object list from the old, then follows a single pointer to the appropriate child node. Also, rather than having to store every object in the vocabulary module, a new object is defined using the logical-symbol-index field to add onto an old interpretation. Thus a word stem that is shared by a plurality of objects in the vocabulary module is only stored once and is used to create all of the objects derived from it. The disclosed storage method requires maintaining an object list from a parent node in the vocabulary module tree in order to construct an object list of the child node.

The entries in the logical symbol index table such as that depicted in FIG. 7 need not be single characters—arbitrary sequences may occupy a single entry. For example, the kana sequence "なかつた" might be added to the third object "きか" from the old object list to form the word "きかなかつた". In this manner, the length of an entered keystroke sequence does not necessarily directly correspond to the length of an associated object. A sequence of characters stored at an entry in the symbol index table would allow a vocabulary object to be identified by an arbitrary key sequence, i.e., stored at an arbitrary location within the vocabulary module tree.

Figure 8B:
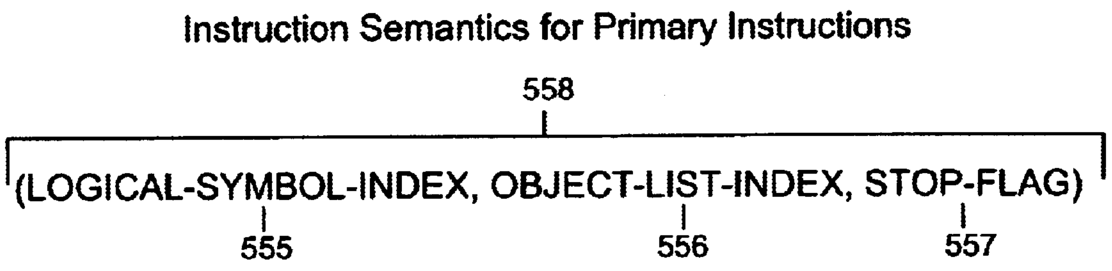
FIG. 8B depicts the semantic components of an embodiment of a primary instruction to build a Yomikata text object.

An object type field may also be included in each instruction 558 of FIG. 8B to specify additional information about the object being constructed. The object type field may contain a code to specify whether the generated object is a word, a word stem, or any other object. The object type field therefore allows different types of objects to be mixed within a given vocabulary module. Moreover, the object type field may also include information regarding the part of speech of the word, or information needed to construct various inflections and endings. A reduced keyboard disambiguating system using a vocabulary module having the part of speech information may use the additional information to implement syntactical analysis to improve the disambiguation process. The object type field may also contain a unique code to allow transmission of text in a compressed form. The unique code would be transmitted to a remote terminal instead of transmitting the entered keystroke sequence or the associated disambiguated characters.

One of the key features of the preferred vocabulary module tree data structure is that the objects associated with each node are stored in the node data structure 400 according to their frequency of use. That is, the object constructed by the first instruction in the packet of instructions 406 has a higher frequency of use than that constructed by the second instruction (if present) in 406, which has a higher frequency of use than the third instruction (if present). In this manner, the objects are automatically placed in the object list so that they are sorted according to decreasing frequency of use. For purposes of this description, frequency of use of a word object refers to the likelihood of using a given word within a representative corpus of use, which is proportional to the number of times that each word occurs in the corpus. In the case of word stem objects, frequency of use is determined by summing the frequencies of all words which share the stem.

Storing frequency of use or other rank information at each node avoids the need to determine and sort on the rank of each object when the system is in use. This has important implications in the word object vocabulary, since the stored objects may include shared stems common to a very large number of longer words. Determining the relative rank of these stems dynamically would require traversing the entire tree of children nodes and accumulate information about each stem, adding significant processing overhead for a portable computing device. Determining this information in advance and storing it in the vocabulary data thus reduces the processing overhead. Moreover, when the frequency of use or rank of the objects that are created by a node is represented implicitly by the ordering of the instructions 406 that create them, no additional storage space is required for this information.

While preferably the objects are stored within the node data structure 400 in order according to their frequency of use, it will be appreciated that a frequency of use field could also be associated with each instruction. The frequency of use field would contain a representative number that corresponds with the frequency of use of the associated object. The frequency of use between different objects would be determined by comparing the frequency of use field of each object. One advantage of using the latter construction that associates a frequency of use field with each object packet is that the frequency of use field could be changed by the disambiguating system. For example, the system could change a frequency of use field to reflect the frequency with which a user used certain objects within the vocabulary module during representative text entry.

FIG. 12 is a flow chart of a subroutine 600 for analyzing the received keystroke sequence to identify corresponding objects in a particular vocabulary module tree. The subroutine 600 constructs an object list for a particular keystroke sequence. Block 602 clears the new object list. Block 604 initiates the traversal of the tree 1010 of FIG. 10 at its root node 1011. Block 606 gets the first key press. Blocks 608 to 612 form a loop to process all available key presses. Block 608 calls subroutine 620 in FIG. 13. Decision block 610 determines whether all available key presses have been processed. If any key presses remain unprocessed, block 612 advances to the next available one. If all key presses have been processed, block 614 returns the completed object list. It will be appreciated that if the main routine calls subroutine 600 repeatedly with new keystroke sequences, each with one more key than the last, and all keys but the last being the same as in the previous invocation, then the initialization blocks 602 and 604 may be bypassed if subroutine 620 is called directly to process only the most recent key press.

Figure 13:
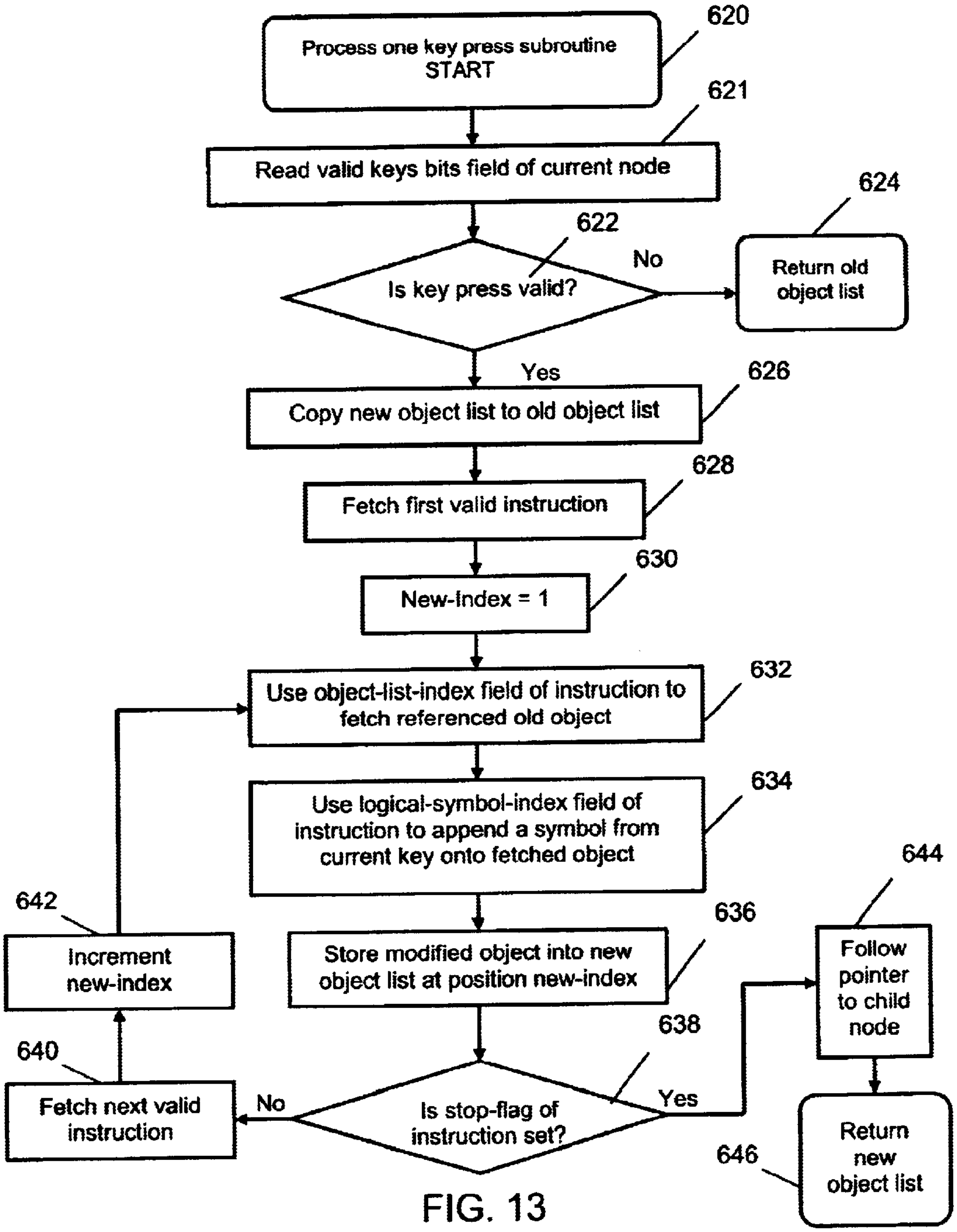
FIG. 13 is a flowchart of an embodiment of a software process for traversing the tree structure of the vocabulary module given a single key press and altering the state of the object lists.

FIG. 13 is a flowchart of a subroutine 620 called from subroutine 600. As noted above, to construct a new object list the disambiguating system starts with a copy of the old object list. At block 626, the object list from the prior node is therefore stored so that it may be used to construct the new object list.

In the main routine shown in FIG. 3, a keystroke was detected by the system at block 150. The receipt of a new keystroke causes a downward traversal in the vocabulary module tree, if a valid path exists to a child corresponding to the keystroke. At a block 621 in FIG. 13, the valid keys bits field of the node 400 data structure is therefore examined to determine if valid instructions and a pointer correspond to the received keystroke. At a decision block 622, a test is made of the valid keys bits field to determine if a valid packet 408 consisting of instructions 406 and a pointer field such as 404a exists corresponding to the entered keystroke. If no valid packet corresponds to the keystroke, at a block 624 the old object list is returned to the main routine to generate the selection list. Since the received keystroke is part of an invalid keystroke sequence that does not correspond to any object within the vocabulary module, the keystroke is ignored and the current object list is returned to the main routine as being the object list from the vocabulary module. The branch of the subroutine 620 that comprises blocks 622 and 624 therefore ignores any invalid keystroke sequences and returns the object list generated at the parent node for possible inclusion in the selection list generated by the disambiguating system.

If a valid packet exists corresponding to the received keystroke at decision block 622, the subroutine proceeds to a block 626 where the new object list is copied to the old object list. Block 628 fetches the first valid instruction associated with the given key. Block 630 initializes the iterator NEW-INDEX to 1 so that the first instruction will generate the first item in the new object list. The subroutine then enters the loop comprised of blocks 632 through 642 to construct the object list associated with the valid instructions. At block 632 the OBJECT-LIST-INDEX field 556 is examined and the corresponding object loaded from the old object list. At block 634, the LOGICAL-SYMBOL-INDEX field 555 is examined and the appropriate symbol (associated with the received keystroke through a logical symbol index table like 550 of FIG. 7) is appended to the end of the identified object. It will be appreciated that more than one character may be appended to the identified object at block 634 if the entry in the symbol table 550 at the given key 551 and logical symbol index 552 holds a character sequence. At a block 636, the combined object and symbol are stored as a new object in the new object list. At a block 638, a test is made to determine if the subroutine has processed the last valid instruction associated with the given key at the given node. If the last valid instruction has not been processed, at block 640 the next valid instruction is fetched. At block 642 NEW-INDEX is incremented.

If the test at decision block 638 indicates that all of the objects have been constructed for the node, the subroutine proceeds to a block 644 and follows the associated pointer to a child node. At block 646 the new object list is returned to the main routine in order to generate the selection list. It will be appreciated that the subroutine 600 in FIG. 12 for generating the object list associated with each node is performed for each keystroke received from the user. No "searching" of the vocabulary modules is performed as the user enters a new keystroke sequence, since each keystroke merely advances the subroutine one additional level within the vocabulary module tree. Since a search is not performed for each keystroke, the vocabulary module returns the list of objects associated with each node with minimal processing overhead.

Inherent in the combination of the keystroke to object identification software process of subroutine 620, depicted in FIG. 13 operating on the tree data structure 1010 depicted in FIG. 10, lie several novel means to retrieve a larger vocabulary of objects while using less storage for the vocabulary module without increasing the processing time of subroutine 620.

By ordering the symbols in each row of the logical symbol index table 550 (FIG. 7) of a given vocabulary module according to their frequency of use in the input lexicon, a large majority of the instructions 558 (FIG. 8B) of all nodes 400 in the tree data structure 1010 can be made to have their LOGICAL-SYMBOL-INDEX fields 555 equal to one. Similarly, by ordering the instructions 558 of all instruction packets 406 in all nodes 400 so that the stem and word objects are generated in the object list 440 (FIG. 11) in decreasing order of their use in the language, a large majority of the instructions 558 of all nodes 400 in the tree structure 1010 can be made to have their OBJECT-LIST-INDEX fields 556 equal to one. Thus, much of the data in the tree 1010 are redundant. Systematically identifying the redundancies and eliminating them by redirecting the paths linking parent nodes to child nodes and deleting child nodes no longer referenced, leads to a highly folded or wrapped data structure containing far fewer nodes, far fewer instructions, and far fewer links than the original tree, yet which still retrieves every object retrievable from the original tree. Furthermore, distinct instances of paths through the original tree whose instructions generate similar objects in the object list 440 are merged into common paths in the folded tree which hence forth function as generalized (as opposed to specific) object constructing rules, enabling the reduced structure to generate far more objects than were originally used to define the tree 1010 of a given vocabulary module. For example, an unfolded vocabulary tree generated from a list of 30,000 English words might contain over 78,000 instructions in a preferred embodiment. After folding by a preferred embodiment of the folding process as described above, the modified tree might contain fewer than 29,000 instructions, a number less than the number of word objects the structure is capable of retrieving, given the ambiguous keystroke sequences and the retrieval process embodied in a preferred manner in the flow chart of FIG. 12. A remarkable and novel result, since each instruction only alters one object in the object list 430 of FIG. 11 by appending a single symbol in response to a key press. This is a consequence of the folded tree and software retrieval process re-using common sequences of instructions as general object construction rules. A further aspect of the modified tree structure is the automatic identification of generalized rules for associating objects with keystroke sequences. Using such rules, the vocabulary module can, with a high probability of success, associate keystroke sequences with word and word stem objects which were not initially used in creating it. For example, an input word list to build a vocabulary module might include the words "sun", "run", and "running", but not the word "sunning", but the folded tree structure created by the algorithm would still create the word "sunning" as one of the objects in the selection list for the corresponding key sequence.

Figure 9:
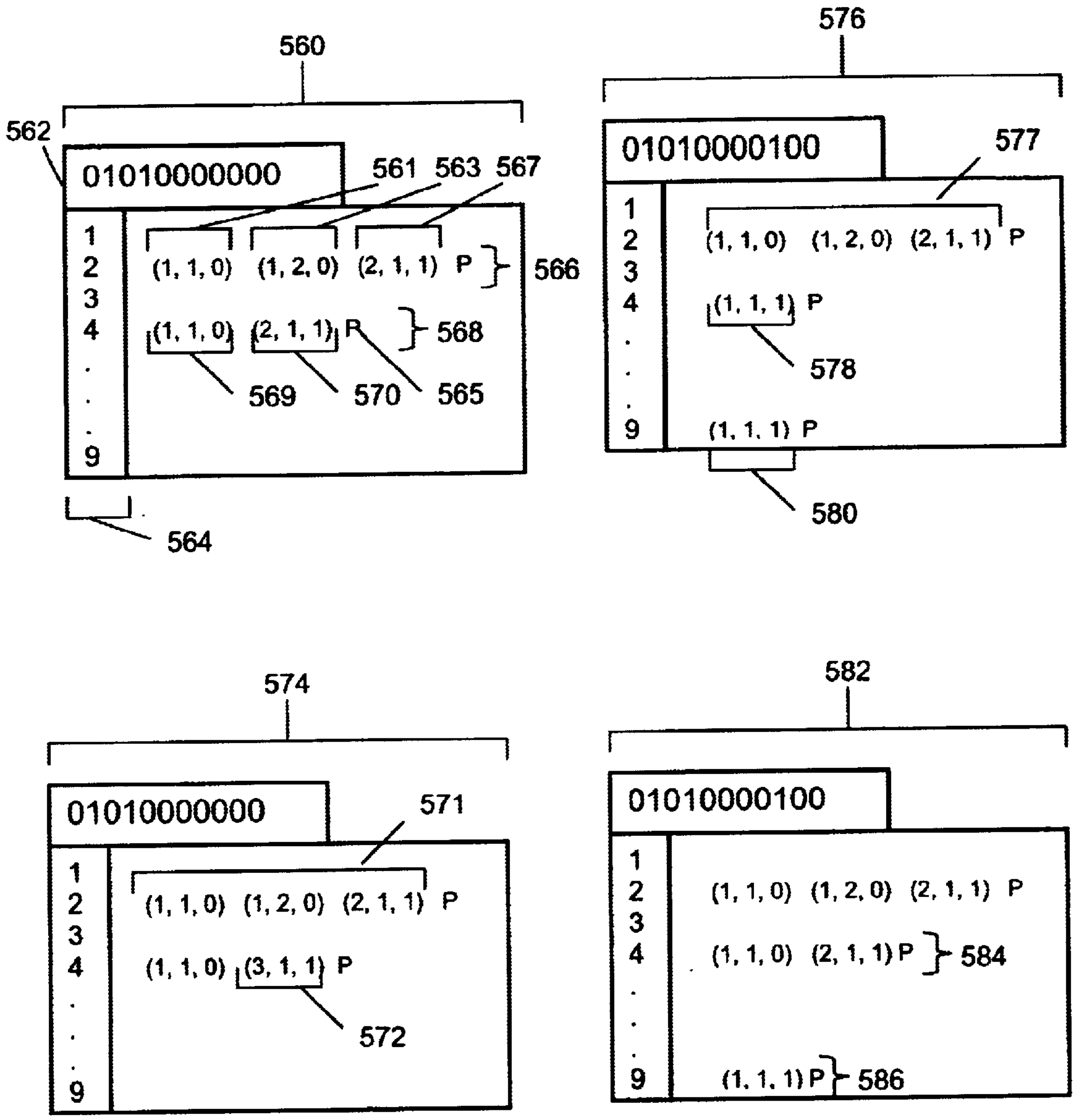
FIG. 9 depicts four examples of possible internal data items in the structure of nodes in an embodiment.

The nodes depicted in FIG. 9 are examples. Node 560 has two valid keys as indicated by the "1"s in its valid keys field 562 "01010000000". In a preferred embodiment the positions of the "1"s indicate that the $2^{nd}$ and $4^{th}$ keys are valid paths and have packets of instructions and pointers to child nodes associated with them 566 and 568, respectively. Packet 566 contains three instructions "(1,1,0)", "(1,2,0)", and "(2,1,1)" followed by a pointer "P" linking 560 to a child node. If subroutine 600 of FIG. 12 has processed a list of key strokes leading to node 560, then subroutine 620 of FIG. 13 were called to process a "2" key, which is the 2か key in a preferred embodiment, the following would happen. Instruction 561 would append the $1^{st}$ logical symbol of key 2か ("か") to the old object at index 1 to build the new object at index 1. The third field of 561, "0", is the false value of the STOP-FLAG 557 (FIG. 8B), indicating that this is not the last instruction of the current packet, so the next instruction 563 is interpreted. Instruction 563 would append the $1^{st}$ logical symbol of key 2か ("か" in FIG. 7) to the old object at index 2 to build the new object at index 2. The index of the new object will be 2 because the indices of the new objects being built are implicit in the order of the instructions themselves, e.g. the $2^{nd}$ instruction always builds the $2^{nd}$ object. The third field of instruction 563, “0”, is the false value of the STOP-FLAG 557, so the next instruction 567 is interpreted. Instruction 567 would append the $2^{nd}$ logical symbol of key 2か (“く” in FIG. 7) to the old object at index 1 to build the new object at index 3. The third field of instruction 567, “1”, is the true value of the STOP-FLAG 557, indicating that this is the last instruction of the current packet, so execution of subroutine 620 (FIG. 13) would pass from block 638 to block 644.

It is possible to combine two or more nodes containing different instruction packets 408 into a single node which can serve the same purpose as the multiple nodes separately, which means that certain nodes in a vocabulary tree 1010 are redundant in a novel sense. For the purpose of this invention the word “redundant” is used with respect to two nodes in the sense that one node can be dispensed with by the operations of the software processes which will be described below in reference to a preferred embodiment depicted in FIGS. 14–17.

For example, compare node 560 to node 574 in FIG. 9. The instruction packets 566 and 571 on key 2か agree exactly, but instruction 570 on key 4た of node 560 conflicts with instruction 572 on key 4た of node 574, so neither can do the work of the other, nor can the two nodes be combined into one which would do the work of both. Compare node 560 to node 576. The instruction packets 566 and 577 associated with key 2か on each node agree exactly. Instructions 569 and 578 are different in the settings of their STOP-FLAG fields 557, but that difference does not cause them to conflict. The essential result of the object retrieval process of subroutine 620 in FIG. 13 is the new object list created by executing the set of instructions at a node for a given key. Additional objects can be appended to the end of an object list without detriment to the correct processing of any of that node’s children. Thus, no errors would be caused in the processing of the children of node 576 by the execution of an additional instruction after 578. The essence of the process would be disturbed only if the wrong instruction were to execute or if too few instructions were to execute. Similarly, the presence of a valid key on key 9ら of node 576 does not conflict with the absence of a valid 9ら key in node 560. Therefore, nodes 560 and 576 are redundant and can be merged into a new node 582 which achieves the net effect of both, and functions correctly as a parent node of the children of both. It will be appreciated that the pointers also play a role in defining redundancy. At the last keystroke of sequences in the tree associated with words which do not continue to form the stems of longer words, the pointers in the valid key packets 408 have a special value, NULL, in a preferred embodiment to indicate that there are no further children. Such nodes are called “terminal nodes.” For two nodes with child nodes on valid keys in common to both nodes, the respective child nodes must be redundant for their parent nodes to be redundant, and so on to the nodes descending from the children, until terminal nodes are reached, or until there are no more descendants on valid keys sequences common to the nodes being compared.

Figure 14:
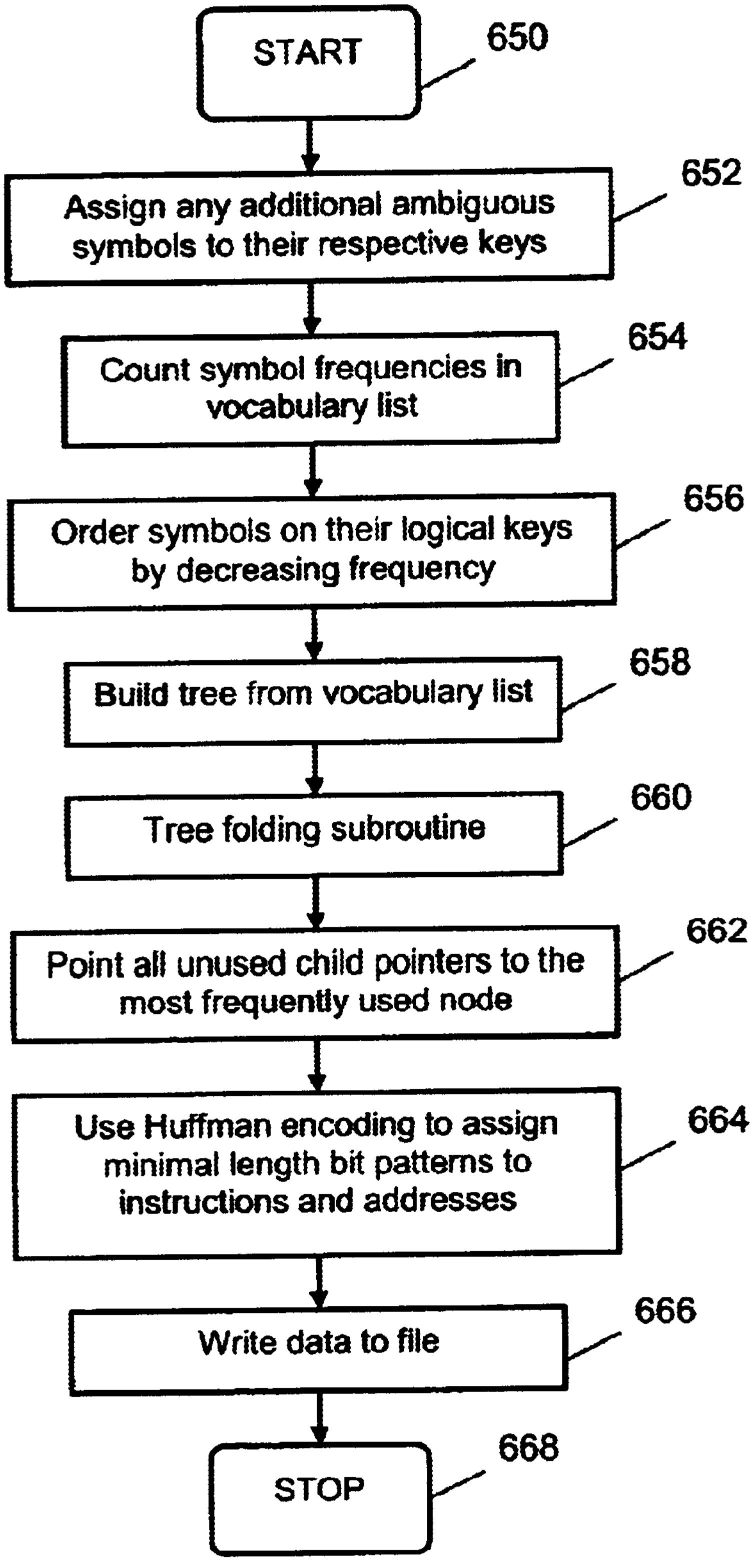
FIG. 14 is a flowchart of an embodiment of a software process for building a folded, compressed vocabulary module.

FIGS. 14 to 17 depict flow charts of preferred embodiments of software processes for the compression and folding of vocabulary module trees similar to 1010. FIG. 14 is a flowchart of preferred embodiment of a software process to build a compressed vocabulary module. In block 652 a lexicon is scanned to identify any necessary additional ambiguous symbols other than those appearing on the physical keys, such as in FIG. 6 for a Japanese vocabulary module. In blocks 654–656 the symbols are assigned their logical indices on their respective keys in decreasing order of their frequency of use in the input lexicon, as in the example of FIG. 7. Given a lexicon of objects with frequencies, it will be obvious to someone skilled in the art how block 658 builds a vocabulary tree of the form 1010. In block 660, redundant nodes are identified and merged together to minimize duplication of data and, hence, turn isolated instruction sequences associated with single objects into generalized rules for retrieving multiple objects. This process is shown in detail in FIG. 15. Block 662 identifies all the remaining NULL pointers from terminal nodes and changes them to point to the node with the largest number of parents, thus increasing the number of rules in the module. It will be appreciated that other rules could apply to assigning child nodes to the NULL pointers, and that such rules could be applied dynamically at the time of object retrieval, based on factors related to the keystrokes being processed. In block 664, the remaining instances of each unique instruction 558 (FIG. 8B) and pointer 404*a* (FIG. 8A) are counted so that they may be encoded as unique patterns of bits with shorter bit patterns being assigned to higher frequency instructions and addresses to conserve space. A preferred embodiment is Huffman coding as known in the art. Furthermore, nodes which are child nodes of multiple parent nodes may be stored in special orderings to facilitate their rapid retrieval and minimize the number of bits required to address them.

In choosing instructions 558 to describe objects to be stored while building the tree at block 658, it will be appreciated that when objects are words or stems of words, their character sequences contain additional data which may be used advantageously to increase the redundancy of the nodes in tree 1010. For example, not all pairs of kana in the Japanese language are equally common, e.g. “ま” is commonly followed by “す”. The statistics of kana pairs, or bigrams, can be used to predict the most likely next kana in an object from the preceding kana. With such predictions the logical ordering of the ambiguous symbols in the logical symbol index table 550 of FIG. 7 can be dynamically altered to further optimize the use of the first position. The predictions can be extended to kana triplets, trigrams, and generally to n-grams.

Figure 15:
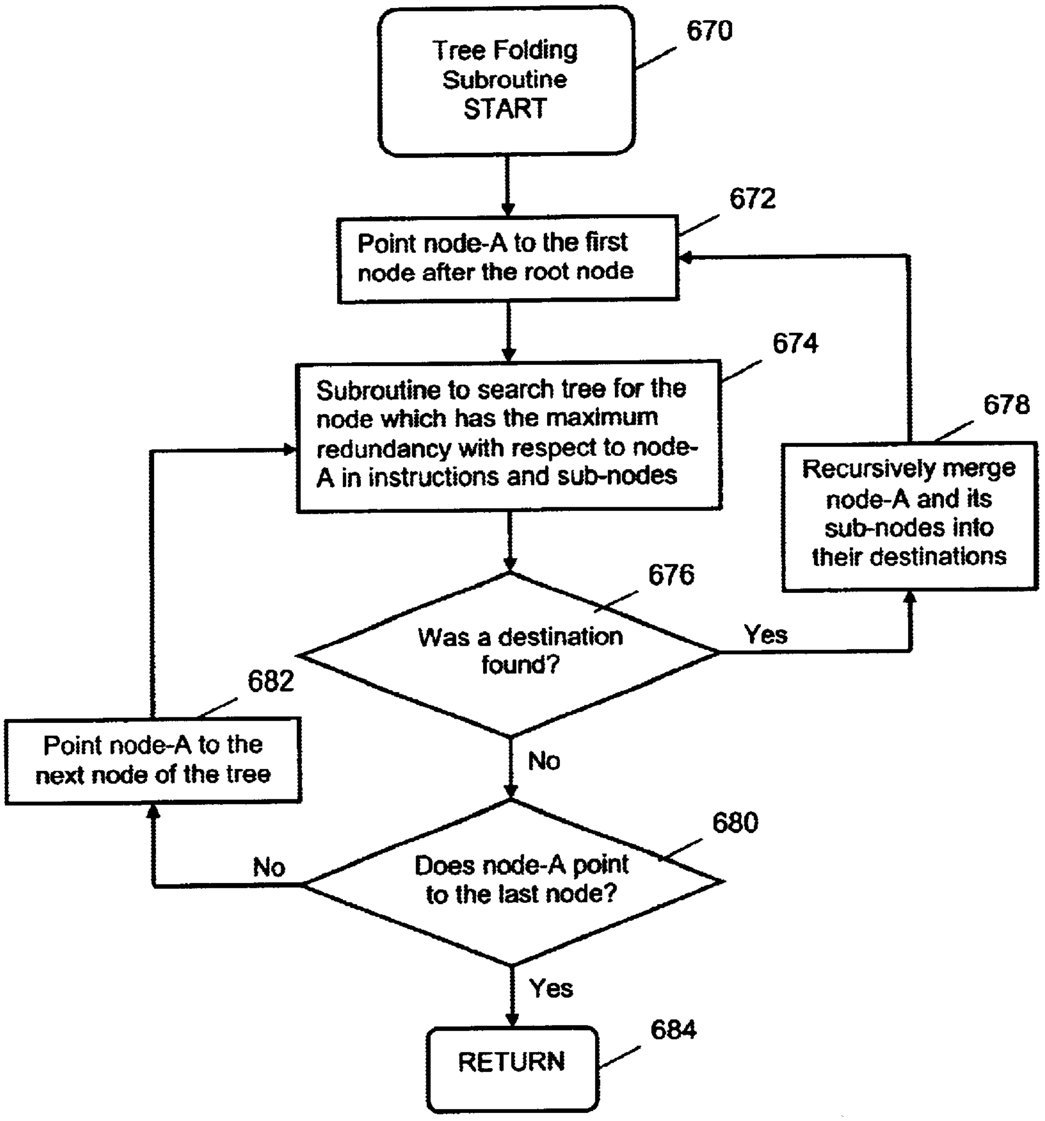
FIG. 15 is a flowchart of an embodiment of a software process for folding the tree data structure of a vocabulary module.

FIG. 15 is a flowchart of a preferred embodiment of a software process to fold the tree 1010 of a vocabulary module. Block 670 is entered from block 660 of the flowchart of FIG. 14. Block 672 initializes the process to begin with the first node of 1010 of FIG. 10 after the root node 1011. Block 674 calls subroutine 690 depicted in a preferred embodiment in the flowchart of FIG. 16 to locate a node, if any, which is maximally redundant with the current node. If a destination node is found, decision block 676 directs the process to block 678 where the redundant node(s) are merged together, eliminating duplicate data from the tree subsuming multiple, individual instances of instructions into shared sequences, which are general rules for associating keystroke sequences to objects. If decision block 676 fails, then decision block 680 tests whether the process is done. If there are more nodes to process, the flow advances to block 682 to identify another node.

Figure 16:
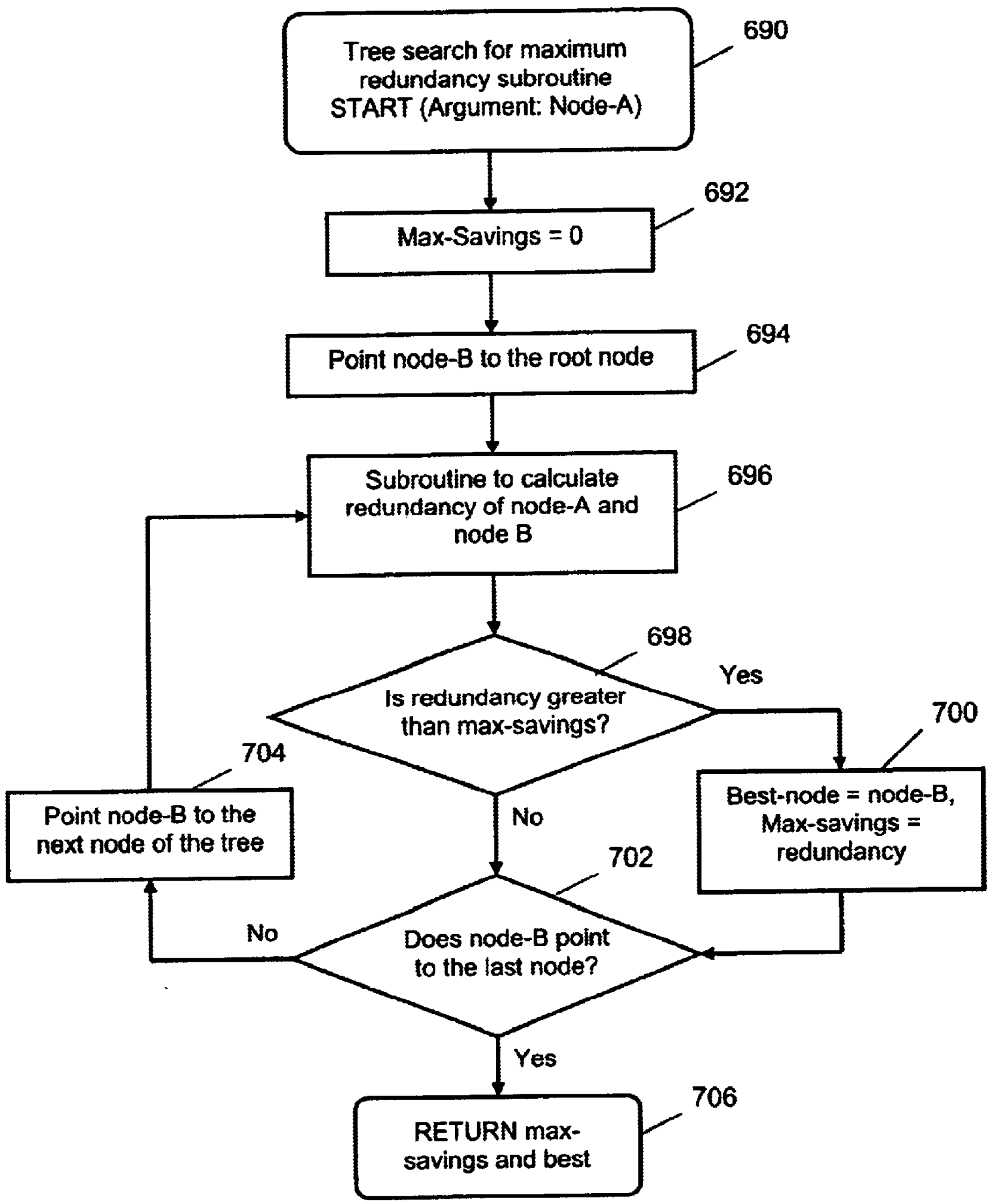
FIG. 16 is a flowchart of an embodiment of a software process for locating a second node in a tree of a vocabulary module which has the greatest redundancy in comparison to a given node.

FIG. 16 is a flowchart of a preferred embodiment of a software process to find in a tree 1010 a node with the highest degree of redundancy with respect to a given node. Block 690 is entered from block 674 of the flowchart of FIG. 15. Block 692 initializes a placeholder MAX-SAVINGS for the measured redundancy. Block 694 initializes the process to start at the root node 1011 of tree 1010 of FIG. 10. Block 696 calls subroutine 710 depicted in a flow chart of a preferred embodiment in FIG. 17 to compute the redundancy of the given node with respect to the current node. Decision block 698 tests whether a degree of redundancy greater than MAX-SAVINGS was reported. If so, block 700 records the identity BEST-NODE of the node provisionally found to be most redundant with respect to the given node and the reported measure of redundancy as MAX-SAVINGS. Decision block 702 tests whether all nodes have been evaluated. If not, flow continues to block 704, which advances from the current node to the next node. From block 704, flow returns to block 696. If the result of the test at decision block 702 is that the last node has been evaluated, then block 706 returns the identity of the node most redundant, if at all, to the given node to block 674 of subroutine 670 of FIG. 15.

Figure 17:
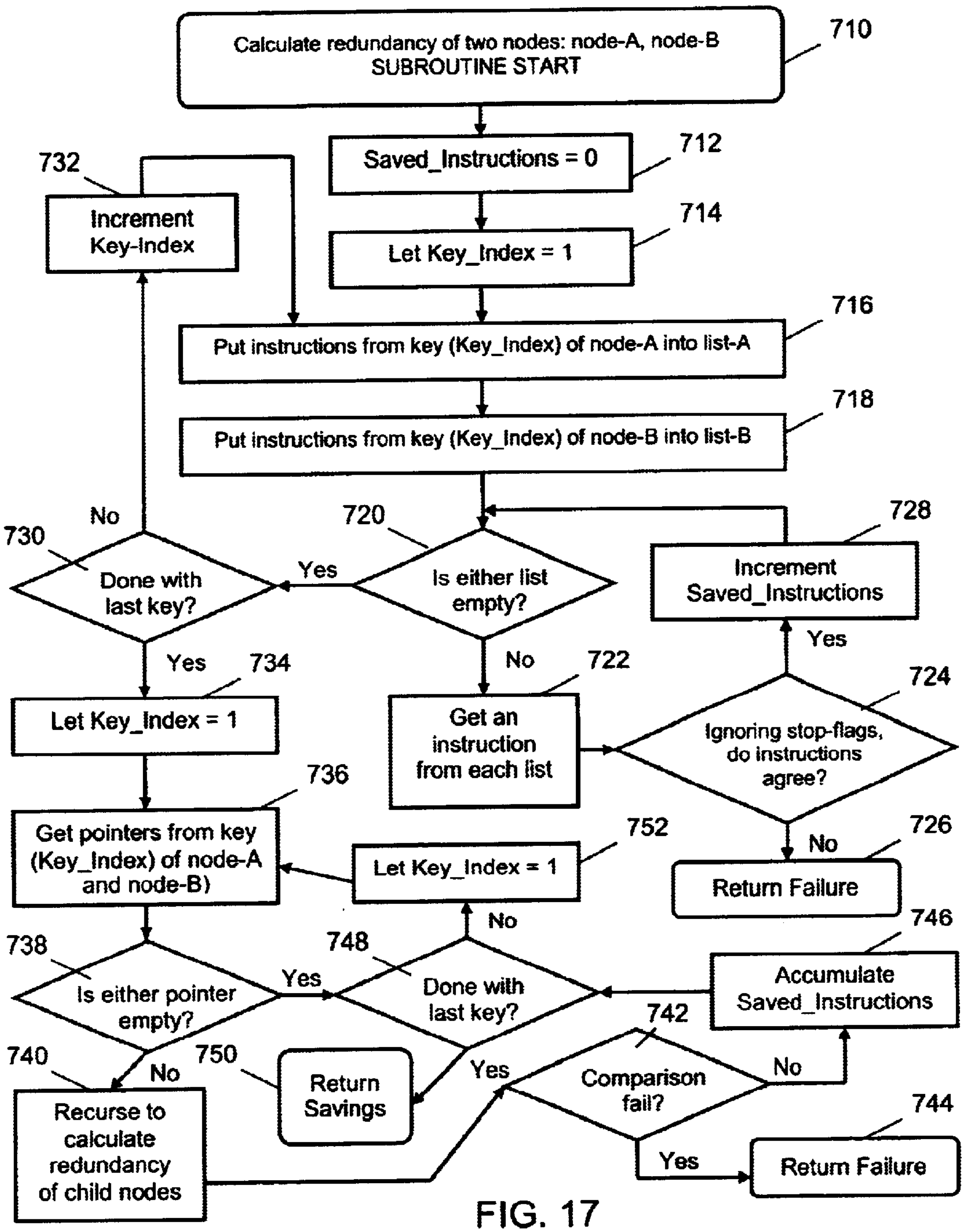
FIG. 17 is a flowchart of an embodiment of a software process for computing the redundancy between two nodes of a tree in a vocabulary module.

FIG. 17 is a flowchart of a preferred embodiment of a software process to compute the numerical redundancy between two specified nodes. Block 710 is entered from block 696 of the flowchart of subroutine 690 of FIG. 16. Block 712 initializes a count of duplicate instructions. Block 714 initializes KEY-INDEX to 1. Block 716 reads the instruction packets 406 associated with key KEY-INDEX from the first of two nodes 400 specified as parameters to the subroutine and puts them in a temporary list, LIST-A. If key KEY-INDEX is not a valid key, no instructions are read. Block 718 reads the instruction packets 406 associated with key KEY-INDEX from the second of two nodes 400 specified as parameters to the subroutine and puts them in a temporary list, LIST-B. If key KEY-INDEX is not a valid key, no instructions are read. Decision block 720 determines whether either LIST-A or LIST-B is empty. If not, block 722 fetches one instruction from both LIST-A and LIST-B, reducing the number of instructions remaining in each by one. Decision block 724 tests whether the instructions are the same in their LOGICAL-SYMBOL-INDEX and OBJECT-LIST-INDEX fields. If not, a failure code for no redundancy is returned to block 696 of subroutine 690 in FIG. 16. If the decision of block 724 is yes, then block 728 increments the count SAVED INSTRUCTIONS. Control passes again to block 720. If the decision block 720 tests TRUE, control passes to decision block 730, which tests whether the two nodes have been compared with respect to all possible keys. If not, block 732 increments KEY-INDEX, and control passes to block 716. If the decision at block 730 is yes, control passes to block 734 to reset KEY-INDEX to 1. Block 736 examines the pointers associated with key KEY-INDEX of the two nodes. Decision block 738 tests whether either pointer is empty (NULL), which would be the case for a pointer in a terminal node or for any key which is not valid. If neither pointer is empty, control passes to block 740, which uses subroutine 710 recursively to test whether the child nodes pointed to by the two non-empty pointers are redundant. The result of block 740 is tested at decision block 742. If the two child nodes were found not to be redundant, a failure code is returned. Otherwise, the two children are found to be redundant with a certain numerical score which is accumulated by block 746. Decision block 748 tests whether the pointers associated with the last key (key 9 in the preferred embodiment) have been tested. If not, block 752 increments KEY-INDEX and passes control to block 736. If the test at block 748 determines that all pointers have been checked, then the accumulated numerical measure of redundancy of the two nodes originally identified when the subroutine was entered at block 710 is returned.

It will be appreciated that the calculation of numerical values of redundancy may be weighted to take into account additional factors such as the number of branches present at each node and the number of parents which point to a node as a child. It will be appreciated that if two nodes are not redundant because of the ordering of instructions associated with a certain key, the order of instructions associated with low frequency words in the input lexicon could be reordered without impacting the priority of instructions associated with higher frequency objects, thus increasing the redundancy of the tree.

The method disclosed above for reducing the size of the tree by eliminating redundant nodes has been described with respect to a tree composed of primary instructions. Associating each primary instruction with a list of zero or more secondary instructions increases the complexity of the objects to be merged, but the procedure disclosed can still be used to identify and eliminate redundancy in a tree including both primary and secondary instructions. Furthermore, it is not necessary that both the primary and secondary instructions are stored in the same physical tree in memory. The two sets of instructions can be primary and secondary instructions are stored in the same physical tree in memory. The two sets of instructions are preferably stored in separate trees as long as the sequence of primary instructions in a node of the primary instruction tree corresponds to the sequence of sets of secondary instructions in the corresponding node of the secondary instruction tree. Similarly, when the primary and secondary instructions are stored in the same physical tree in memory, they may be intermingled such that each primary instruction is immediately followed by a sequence of the (zero or more) associated secondary instructions. Alternatively, all of the primary instructions in a node may be stored in sequence in a contiguous block, followed by a second sequence of contiguous blocks in the same order as the primary instructions, each block containing the (zero or more) associated secondary instructions. In this alternative format, nodes which are redundant in terms of their primary instructions may be merged, and two or more separate sets of associated secondary instructions may be merged. Then at each parent node which jumps to the merged node, it is only necessary to add a small amount of additional information to specify which of the alternate sets of secondary instructions is to be executed.

Furthermore, in yet another aspect of the invention, greater efficiencies in database compression are achieved by storing each kanji character only once in the database structure for any particular associated reading. In general, a database may include a umber of different instances of the same kanji with the same reading, e.g. the kanji 物 (read as ぶつ) in 動物 (どうぶつ) and 植物 (しょくぶつ). To facilitate the entry of various unusual combinations of kanji characters, such as in unusual names or words not explicitly included in the database, e.g. 官物 (かんぶつ), each kanji should be able to be specified by entering only the desired associated reading. Thus, in one preferred embodiment, starting immediately from the root of the tree structure, each reading of a given kanji is included in the database, with a secondary instruction which includes a specification of the code for the associated kanji. This instruction is stored in the secondary instruction list in an order determined by relative frequency of occurrence of that particular kanji with respect to the other text objects associated with the same reading and specified by other instructions in the same secondary instruction list. In all such cases, the corresponding secondary instruction appends the kanji to a null text object, since the node sequence that builds the associated reading starts at the root of the database tree. Thus, all secondary instructions which append a kanji to a null text object can have a distinctive format, wherein no index is required to specify an index of a previous Midashigo, and the number of bits used to specify the kanji character code can be sufficient to encompass and distinguish between the large number of valid kanji characters represented in the database.

Correspondingly, when a kanji character appears in a word or phrase of the database anywhere other than as the first character of the word or phrase, the associated secondary instruction is appending the kanji to an existing Midashigo text object that has previously been added to the secondary object list for the corresponding Yomikata in the primary object list of the immediately preceding node. Thus, in this case, the instruction format must include a field in which the secondary object index of the Midashigo text object is specified. Likewise, when an existing Midashigo must be "preserved" so that a kanji can be appended in a later node, or when the kana (specified in the primary instruction) must be appended, a secondary object index field must be included in the instruction. Thus, to minimize the size of the database, the formats of these two types of secondary instructions, one with no secondary object index and the other with such an index, should be distinguished.

Figure 8C:
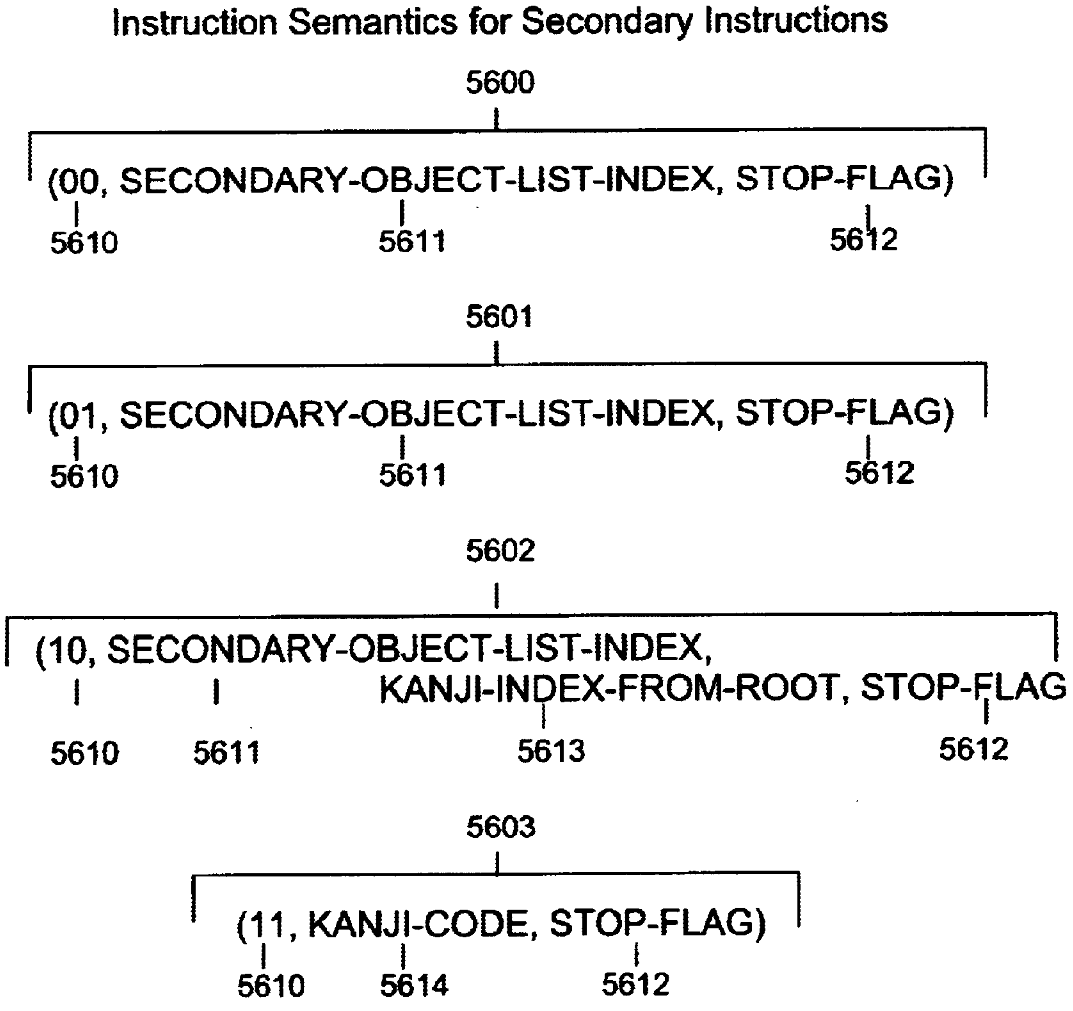
FIG. 8C depicts the semantic components of an embodiment of four different types of secondary instructions used to build Midashigo text objects.

In the latter case, i.e. when the secondary object index in the instruction is non-zero and a kanji is to be appended to the Midashigo, the reading associated with the kanji to be appended can be determined by the system, because the system keeps track of which syllables have been appended to the associated reading in the primary object list since a character was last appended to the Midashigo text object specified by the index in the instruction. As described above, each reading of each kanji character is stored in the database starting at the root of the tree; where the code for the kanji character is fully specified in the associated instruction. Thus, in an instruction where a kanji character is to be appended to a previously existing Midashigo, the kanji is specified by storing an index which corresponds to the position of the fully specified kanji character which appears in the secondary object list of the determined reading starting from the root of the tree structure. This approach enables a large majority of the occurrences of kanji characters in the database to be specified with far fewer bits than is normally required, since the index stored will fall within a very limited range of values which can be determined at the time that the database is created. For example, in a database in which approximately 89,000 words are encoded, approximately 89% of the occurrences of kanji characters re preferably stored in this manner. In one preferred embodiment, as shown in FIG. 8C, there are four types of secondary instructions, each beginning with a two-bit format field set to one of four distinct values, for example:

| | |
|---|---|
| 00 | PRESERVE instruction 5600: Preserve the Midashigo from the previous list specified by SECONDARY-OBJECT-LIST-INDEX in the list created by the current node (the kana appended by the primary instruction will be part of the Yomikata used to identify the next kanji element to be appended to this Midashigo) |
| 01 | KANA instruction 5601: Add the kana appended by the primary instruction (as a literal kana) to the previous Midashigo specified by SECONDARY-OBJECT-LIST-INDEX, and add this modified Midashigo to the current list |
| 10 | INDIRECT KANJI instruction 5602: The kana appended by the primary instruction completes the Yomikata for a kanji to be appended to the previous Midashigo specified by SECONDARY-OBJECT-LIST-INDEX; |

-continued

| | |
|---|---|
| | a separate N-bit field KANJI-INDEX-FROM-ROOT contains the list index where the kanji to be appended is found as fully-specified Midashigo in the node reached by tracing the completed Yomikata starting from root node. Note: one or more of these N-bit codes may be reserved to represent other specific special objects (such as the kanji repeat character or an escape sequence preceding a larger data item) to be appended to the previous Midashigo specified by SECONDARY-OBJECT-LIST-INDEX. |
| 11 | DIRECT KANJI instruction 5603: The following N'-bit field KANJI-CODE fully specifies the encoding of kanji (as the first element of a Midashigo), such that the reading associated with the kanji includes all of the kana appended to the Yomikata from the root node up to and including the kana appended by the associated primary instruction. |

Thus, as shown in FIG. 8C, instructions 5600–5602 with format field codes 5610 set to 00, 01 and 10 all include a field 5611 SECONDARY-OBJECT-LIST-INDEX specifying the index of a previously existing Midashigo in the list created by the immediately preceding node. In a PRESERVE instruction 5600, the indexed Midashigo is the one that is preserved in the list so that it is modified by one or more instructions in subsequent nodes. In a KANA instruction 5601, the indexed Midashigo is modified by appending the kana specified by the associated primary instruction. In an INDIRECT KANJI instruction 5602, the kana reading for the kanji to be appended is determined from the preceding sequence of instructions together with the primary instruction with which the instruction 5602 is associated. The kanji to be appended is specified by the KANJI-INDEX-FROM-ROOT field 5613, which is the index of the instruction in the secondary instruction list associated with the primary instruction which appends the final kana of the determined reading in a sequence starting from the root node 1011. In a DIRECT KANJI instruction 5603, a larger KANJI-CODE bit field 5614 is included which contains enough information to recover the full encoding of a given kanji. All of the instruction formats 5600–5603 also include a STOP-FLAG field 5612 which serves to distinguish the last instruction of a group associated with a given primary instruction.

Examples of these various cases are illustrated in FIG. 18 which shows a representation of some possible instruction lists in three nodes of a database tree structure. Note that for purposes of illustration, FIG. 18 shows the primary instructions in a "decoded" form, showing the actual kana to append rather than the Logical Symbol Index (as in FIG. 7) that would actually be stored in a database instruction. Also for purposes of illustration, the list object created by each instruction is shown in curly brackets to the right of the instruction. FIG. 18 shows partial listings of both primary and secondary instruction lists of the nodes for three successive activations of the "2か" key (e.g. key 122 of FIG. 1*d*). The left hand column shows instructions for the first level node (i.e. starting from the root of the tree structure), representing the text objects created as a result of the first activation of the key in the sequence. The next two columns show the instructions for the second and third activations of the key. Each primary instruction in a list is labeled as Y1, . . . , Yn (where "Y" stands for "Yomikata"), and each primary instruction is shown with its associated list of secondary instructions, each labeled as M1, . . . , Mn ("M" for "Midashigo"). In FIG. 18, Y0 and M0 represent "null" text objects. Thus, as would be expected at the root level (level 1) all of the primary instructions specify Y0 and all of the secondary instructions specify M0. Thus, the secondary instructions represented at this level are DIRECT KANJI instructions (i.e. no SECONDARY-OBJECT-LIST-INDEX field is included), and the character code for each kanji character "X" shown in FIG. 18 as "M0+X" is fully specified in the KANJI-CODE field of the instruction. Since DIRECT KANJI instructions are only used to specify a kanji which appears as the first character of a Midashigo, even when such an instruction appears below the first level of the tree, no preceding PRESERVE instruction is required. Thus, no instructions of the form "M0+P" appear in level 1 since they can be inferred, and there is no need to preserve a "null" text object. For example, in the middle column (level 2), primary instruction Y1 appends the kana く to the Yomikata Y1 of the preceding level (i.e. か), thus creating a Yomikata object かく at the second level. The fifth secondary instruction M5 is a DIRECT KANJI instruction, and thus corresponds to the complete reading かく which includes all kana appended from the root node down to the current level. The instruction also contains enough information to determine the correct output code for the character 画. This same kanji character is also part of the Midashigo created by the secondary instruction M1 associated with the primary instruction Y2 at level 3. The primary instruction Y2 appends the kana く to the Yomikata Y11 of the preceding level (i.e. きか), thus creating a Yomikata object きかく at the third level. The secondary instruction M1 associated with this primary instruction Y2 is shown as "M5+[M5]". This instruction is an INDIRECT KANJI instruction, and thus includes a SECONDARY-OBJECT-LIST-INDEX field which specifies a value of 5 (indicated in FIG. 18 as "M5+"). This refers to the fifth Midashigo object associated with Y11 (referenced by the OBJECT-LIST-INDEX field of the primary instruction) at the preceding level 2. This Midashigo object at level 2 is created by the primary instruction Y11: "Y2+か" and its associated secondary instruction M5: "M7+P" (a PRESERVE instruction, indicating that the Midashigo object 企 created and fully specified by instruction M7 associated with Yomikata Y2 of the preceding level (level 1) is to be duplicated (preserved) as the fifth Midashigo object in the list at the current level (level 2). This "preserve" instruction serves as a placeholder, and indicates that the kana added at this level (か) is the start of the reading of a kanji to be appended by a later instruction. This occurs at the level 3 INDIRECT KANJI instruction, Y2:M1: "M5+[M5]" where the reading associated with the indexed kanji [M5] is known to be the preserved か plus the く added by Y2 at level 3 (く). Looking up this reading く starting from the root leads to Y1 at level 2, where the index [M5] leads to the fully-specified kanji 画. Appending this to the preserved Midashigo from level 1 creates the fully specified Midashigo 企画.

Figure 8D:
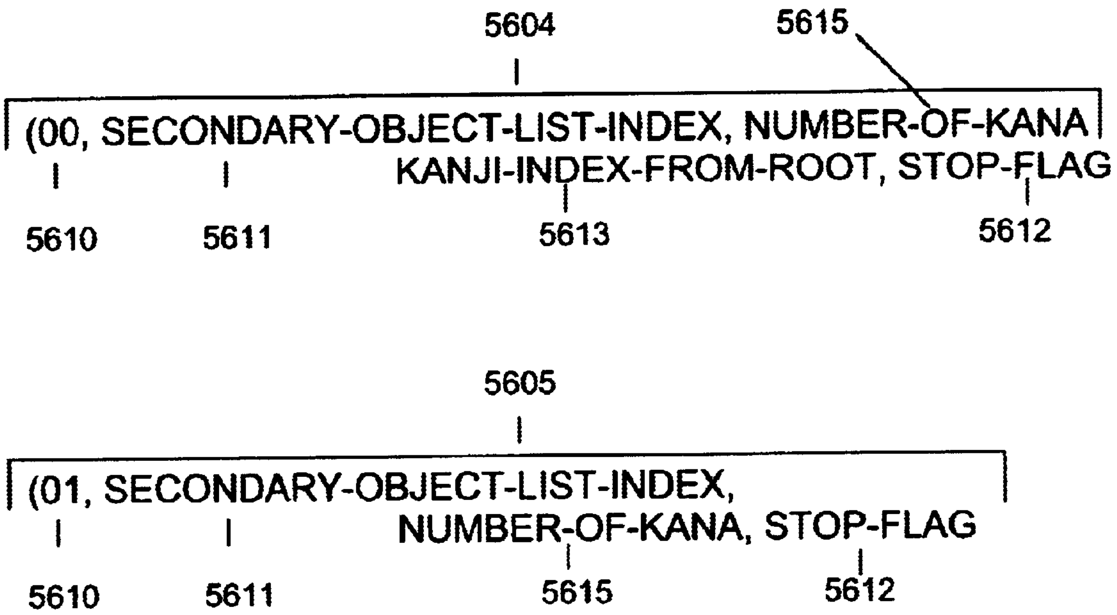
FIG. 8D depicts the semantic components of another preferred embodiment of two of the four different types of secondary instructions used to build Midashigo text objects.
Figure 8E:
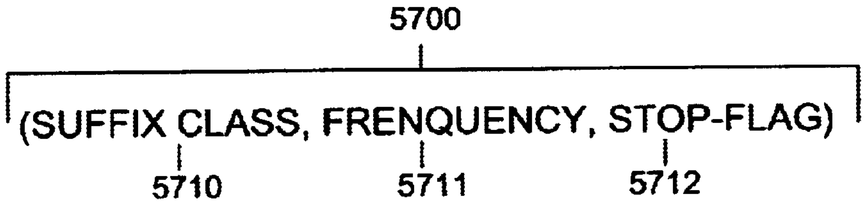

In another preferred embodiment, an alternate method is used to implement the function provided by the "preserve" instruction (format code 00 in the embodiment described above). In this alternate embodiment, as shown in FIG. 8D, alternate instruction format 5604 with format code 00 is similar to instruction format 5602 in that it specifies both a KANJI-INDEX-FROM-ROOT field 5613 and the SECONDARY-OBJECT-LIST-INDEX field 5611 specifying the index of a previously existing Midashigo. However, in this alternate embodiment, the SECONDARY-OBJECT-LIST-INDEX refers not to the immediately preceding node, but to a node that precedes the current node by one more node than the number of nodes specified by the NUMBER-OF-KANA field 5615. The reading corresponding to the kanji to be appended is determined by tracing back through the chain of primary instructions from the referenced node up to the associated primary instruction in the current node. The advantage of this approach is that no separate PRESERVE instructions are required at the intervening nodes, so the database can be made more compact. The disadvantage is that multiple object lists from previous nodes must be maintained in processing keystroke sequences, rather than just one list from the preceding node. Similarly, in the alternate form of the KANA instruction 5605, the SECONDARY-OBJECT-LIST-INDEX refers to a node that precedes the current node by the number of nodes specified by the NUMBER-OF-KANA field 5615. The sequence of one or more kana to be appended is determined by tracing back through the chain of primary instructions from the referenced node up to the associated primary instruction in the current node. The same advantages and disadvantages apply as for the alternate PRESERVE instruction. As will be evident to one of ordinary skill in the art, the FORMAT CODE field (5610), the SECONDARY-OBJECT-LIST-INDEX field (5611), and the NUMBER-OF-KANA field (5615) may be combined in various ways, for example, by using Huffman encoding, to achieve greater compression in the stored instructions.

In another preferred embodiment of the present invention, further compression of the database is achieved without a substantial additional processing burden through the following mechanism. In many cases, the reading associated with a given kanji changes when it appears in a non-initial position in a word. In the vast majority of such cases, this phonetic change is a result of co-articulation effects of the pronunciation of the preceding kanji, and causes the initial consonant of the non-initial kanji to change from unvoiced to voiced, or from a fricative to a plosive. This corresponds to the addition of dakuten or handakuten to the first kana of the reading of the non-initial kanji. In the data storage and retrieval scheme disclosed above, this would require that an additional entry be made to the database to store the fully-encoded kanji associated with the alternate reading (with dakuten or handakuten) stored in a sequence of nodes starting at the root of the tree. In this preferred embodiment, when a kanji appears in a non-initial position with such an alternate reading, an INDIRECT KANJI instruction is used to specify the desired kanji in reference to the alternate reading. To reduce the size of the database, the referenced kanji is not stored from the root in association with the alternate reading, but only in association with its standard reading (without dakuten or handakuten). In order to identify the intended kanji, the value stored in the SECONDARY-OBJECT-LIST-INDEX field of the INDIRECT KANJI instruction is modified in the following manner: let N represent the number of kanji that are stored from the root in association with the alternate reading, and let X represent the SECONDARY-OBJECT-LIST-INDEX value that corresponds to the position of the intended kanji where it is stored from the root in association with its standard reading (without dakuten or handakuten). Then the SECONDARY-OBJECT-LIST-INDEX field of the INDIRECT KANJI instruction is set to the value (N+X). In processing the INDIRECT KANJI instruction, the system first searches the kanji stored from the root in association with the alternate reading, and determines that there are only N kanji stored there, which is less than the field value (N+X). Determining that the associated reading begins with a kana with dakuten or handakuten, the corresponding standard reading is generated, the determined number of kanji N is subtracted from the field value (N+X), and the intended kanji is found under the determined standard reading at the determined index position X.

V. Representative System Operation Using Ambiguous Keystrokes

FIG. 19 illustrates three representative examples of the operation of the system shown in FIG. 1*a*. These examples illustrate the operation of the system and the nature of the feedback provided in an embodiment including the use of the data keys 21–30, Select key 60, Convert key 62, and Diacritic key 68. The examples show the text that would appear in the text area 66, including the special formatting of the object at the insertion point 88 (dotted underline or solid underline), as a result of each keystroke. Each keystroke is identified by the numeric label of the key shown in FIG. 1*a*.

Example 1 in FIG. 19 illustrates how the phrase お願いします is input in one preferred embodiment of the system of FIG. 1*a*. After each of the first three keystrokes on keys 21, 25 and 22, the most frequent Yomikata is displayed, each corresponding to a word of length one, two and three kana, respectively. The fourth keystroke on the Diacritic key 68 specifies that the kana of the preceding keystroke on key 22 corresponds to a kana with dakuten, and the displayed Yomikata changes to the most common three-kana Yomikata matching the key sequence 21, 25, 22, and having a kana with dakuten in the third position (うなぎ). After the fifth keystroke on key 21, the most common Yomikata is おねがい which corresponds to the first word of the desired input phrase. The following keystroke on the Convert key 62 changes the displayed text to the most common Midashigo corresponding to the displayed Yomikata, which in this case also corresponds to the first word of the desired input phrase. The next keystroke is on data key 23, which starts the input of a new keystroke sequence to be disambiguated since it follows one or more activations of either the Select key 60 or the Convert key 62 (in this case, one activation of the Convert key 62). Following this keystroke on key 23, and the next two keystrokes on keys 27 and again on 23, as always the most frequent Yomikata are displayed. In this case also, the word displayed after these keystrokes corresponds to the desired word します of the input phrase. A final keystroke on the Select key 60 indicates that the keystroke sequence of the current word object is finished, so that a next keystroke on a data key 21–30 would start a new input sequence.

Example 2 in FIG. 19 shows the display during the input of the phrase ありがとう ございます which is included in the database. Following the seventh keystroke (on key 22), the only object in the database that matches the input key sequence is the desired input phrase itself. Thus, even though the sequence at that point does not correspond to a completed word or phrase, the most frequent matching stem (ありがとうご in this case) is displayed. Furthermore, since there is only one potentially matching object in the database, and the kana in the current position of this object includes dakuten, the kana is displayed with the dakuten even though the Diacritic key 68 has not been activated. Thus, in this case, activating the Diacritic key 68 is optional, and Example 2 shows the generation of the phrase without activating the Diacritic key 68 for either the ご or the ざ kana. A stem is displayed for the seventh through the tenth keystrokes of the sequence, until the input phrase is completed by the eleventh keystroke.

Example 3 illustrates various functions associated with the Select key 60 and the Convert key 62 in an embodiment. After the first two keystrokes on key 22 and key 25, the most frequent matching Yomikata is determined to be この. The next keystroke on the Select key 60 signals the end of the data key sequence for the current word object, and is indicated by the dotted underline changing to a solid underline. A second press of the Select key 60 selects the second most common Yomikata くに. The following keystroke on the Convert key 62 selects the most common Midashigo corresponding to the selected and displayed Yomikata くに. The following two keystrokes on the Convert key 62 cycle through a less common Midashigo which is a single kanji character, and the last Midashigo in the sequence which shows the selected Yomikata in the form of katakana. The following keystroke on the Convert key 62 cycles back to the originally displayed hiragana as the first textual interpretation in the sequence of Midashigo which is identical to this Yomikata. An additional keystroke on the Convert key 62 repeats the cycle, again showing the most common kanji interpretation. Following that, a press of the Select key 60 reverts to the display of the currently selected Yomikata くに. A second press of the Select key 60 advances to the next (third most frequent) Yomikata かね. The following two keystrokes on the Convert key 62 cycle through the first two (most common) Midashigo associated with this Yomikata, each of which is a single kanji character. A final press-and-hold of the Convert key 62 cycles backward in the Midashigo list to re-select the previously displayed kanji.

The reduced keyboard Japanese text input system disclosed herein reduces the size of the computer or other device that incorporates the system. The reduced number of keys allows a device to be constructed to be held by the user in one hand, while being operated with the other hand. The disclosed system is particularly advantageous for use with cellular phones, PDAs, two-way pagers, or other small electronic devices that benefit from accurate, high-speed text entry. The system can provide both efficiency and simplicity when implemented on a touchscreen based device or a device with a limited number of mechanical keys that may also have limited display screen area. The system of the present invention generates input in the form of the kana comprising the Japanese phonetic syllabary, and integrates the process of converting the input kana into the intended kanji or other textual interpretation corresponding to the kana reading. Furthermore, the system of the present invention provides a method for storing the information required for the system's operation in a database that is extremely compact, and that requires only minimal processing overhead in execution.

Those skilled in the art will also recognize that minor changes can be made to the design of the keyboard arrangement and the underlying database design, without significantly departing from the underlying principles of the current invention. Consequently, within the scope of the appended claims, it will be appreciated that the invention can be practiced otherwise than as specifically described herein.

The embodiments of the invention in which an exclusive property or privilege is claimed are defined as follows:

1. A system for generating input sequences of Japanese phonetic kana characters entered by a user, the input system comprising:

a. a user input device having a plurality of input means, each of the plurality of input means associated with a plurality of characters, an ordered input sequence pair being generated each time a sequence of two input means is selected by manipulating the user input device;

b. a memory associating each syllable of the Japanese syllabary with one or more ordered input sequence pairs, wherein:

each of the following sets of Japanese syllables is associated with a set of ordered input sequence pairs, all members of each said associated set of ordered input sequence pairs having the same input means as the first element, and wherein the first element is a different input means for each set, said sets of syllables comprising: {A, I, U, E, O}, {KA, KI, KU, KE, KO, KYA, KYU, KYO}, {SA, SHI, SU, SE, SO, SHA, SHU, SHO}, {TA, CHI, TSU, TE, TO, CHA, CHU, CHO}, {NI, NJ, NU, NE, NO, NYA, NYU, NYO}, {HA, HI, FU, HE, HO, HYA, HYU, HYO}, {MA, MI, MU, ME, MO, MYA, MYU, MYO}, {YA, YU, YO}, {RA, RI, RU, RE, RO, RYA, RYU, RYO}, and {WA, WO}; and each of the following sets of Japanese syllables is associated with a set of ordered input sequence pairs, all members of each said associated set of ordered input sequence pairs having the same input means as the second element, and wherein the second element is a different input means for each set, said sets of syllables comprising: {A, KA, SA, TA, NA, HA, MA, YA, RA, WA}, {I, KI, SHI, CHI, NI, HI, MI, RI}, {U, KU, SU, TSU, NU, FU, MU, YU, RU}, {E, KE, SE, TE, NE, HE, ME, RE}, {O, KO, SO, TO, NO, HO, MO, YO, RO, WO}, {YA, KYA, SHA, CHA, NYA, HYA, MYA, RYA}, {YU, KYU, SHU, CHU, NYU, HYU, MYU, RYU}, and {YO, KYO, SHO, CHO, NYO, HYO, MYO, RYO};

c. a display to depict system output to the user; and d. a processor coupled to the user input device, memory and display, said processor comprising:

a sequence identifying component for classifying each selection of an input means as a first or second selection of an ordered pair of selections, and identifying from the memory the Japanese syllable associated with each completed input sequence pair; and an output component for displaying the identified Japanese syllable associated with each generated input sequence pair as the textual interpretation of the generated input sequence.

2. The system of claim 1, wherein upon receiving the first input of a generated input sequence pair, the processor causes the output display to display the set of Japanese syllables associated with the set of ordered input sequence pairs, all members of said associated set of ordered input sequence pairs having the received input means as the first element.

3. The system of claim 2, wherein each syllable in the displayed set of Japanese syllables is displayed in association with an indication of the input means comprising the second element of the ordered input sequence pair associated with said syllable.

4. The system of claim 1, wherein there are ten input means associated with a plurality of characters.

5. The system of claim 1, wherein there are nine input means associated with a plurality of characters, such that the two sets of characters {A, I, U, E, O} and {YA, YU, YO} are both associated with ordered input sequence pairs having the same input means as the first element.

6. The system of claim 1, wherein the Japanese syllables small TSU and N are associated with sets of ordered input sequence pairs having distinct input means as the second element, respectively.

7. A disambiguating system for disambiguating ambiguous input sequences entered by a user and generating textual output in the Japanese language, the disambiguating system comprising:

a. a user input device having a plurality of inputs, each of a plurality of said plurality of inputs is associated with a plurality of characters, an input sequence being generated each time an input is selected by manipulating the user input device, the generated input sequence having a textual interpretation that is ambiguous due to the plurality of characters associated with said inputs;

b. a memory containing data used to construct a plurality of Yomikata objects, each of the plurality of Yomikata objects associated with an input sequence and a frequency of use, wherein each of the plurality of Yomikata objects comprises a sequence of kana which corresponds to the phonetic reading to be output to the user, said Yomikata objects including completed word and phrase objects, stem objects comprising a sequence of the initial kana of a yet uncompleted word or phrase object, and objects that are both a completed word or phrase and a stem of a word or phrase, and wherein all word, phrase and stem objects are constructed from data stored in the memory in a tree structure comprised of a plurality of nodes, each node associated with an input sequence and with one or more Yomikata objects;

c. a display to depict system output to the user; and d. a processor coupled to the user input device, memory and display, the processor constructing the one or more Yomikata objects from the data in the memory associated with each generated input sequence and identifying at least one candidate object with the highest frequency of use, wherein said candidate object is a word or phrase object when at least one word or phrase object is associated with the generated input sequence, and wherein said candidate object is a stem object when no word or phrase object is associated with the generated input sequence, and generating an output signal causing the display to display the at least one identified candidate object associated with each generated input sequence as a textual interpretation of the generated input sequence.

8. The system of claim 7 in which one or more kana which include special diacritic marks including dakuten and handakuten are associated with the same input with which the corresponding kana without special diacritic marks is associated.

9. The system of claim 7 in which the user input device includes an additional input that is associated with the special diacritic marks including dakuten and handakuten, and in which text objects that include one or more of the kana which include these special diacritic marks are associated with input sequences that include one or more activations of this additional input.

10. The system of claim 7, wherein one or more Yomikata object in the tree structure in memory is associated with one or more Midashigo objects, wherein each Midashigo object is a textual interpretation of the associated Yomikata object, and wherein each Midashigo object is comprised of a sequence of characters comprised of any combination of kanji, hiragana katakana, symbols, letters and numbers, and wherein each Midashigo object is associated with a frequency of use.

11. The system of claim 10, wherein the frequency of use associated with each Yomikata object corresponds to the sum of the frequencies of use of all Midashigo objects associated with said Yomikata object.

12. The disambiguating system of claim 10, wherein a. one of the plurality of inputs is an unambiguous Selection input, wherein the user may accept the Yomikata object having the highest frequency of use as the textual interpretation of the entered input sequence by selecting said unambiguous Selection input;

b. the user may select an alternate Yomikata object as the interpretation of the input sequence by additional selections of said unambiguous Selection input, each selection of said unambiguous Selection input selecting a Yomikata object from the identified one or more Yomikata objects in the memory associated with the generated input sequence, said alternate Yomikata object having a decreasing frequency of use;

c. one of the plurality of inputs is an unambiguous Conversion input, wherein the user may select the Midashigo object having the highest frequency of use associated with the Yomikata object having the highest frequency of use as the textual interpretation of the entered input sequence by selecting said unambiguous Conversion input;

d. the user may select an alternate Midashigo object associated with the Yomikata object having the highest frequency of use as the textual interpretation of the entered input sequence by additional selections of said unambiguous Conversion input, each selection of said unambiguous Conversion input selecting a Midashigo object from the identified one or more Midashigo objects in the memory associated with the Yomikata object having the highest frequency of use, said alternate Midashigo object having a decreasing frequency of use;

e. after the user has selected an alternate Yomikata object as the interpretation of the input sequence by additional selections of said unambiguous Selection input, the user may select the Midashigo object having the highest frequency of use associated with said selected Yomikata object as the textual interpretation of the entered input sequence by selecting said unambiguous Conversion input; and f. after the user has selected an alternate Yomikata object as the interpretation of the input sequence by additional selections of said unambiguous Selection input, the user may select an alternate Midashigo object associated with said selected Yomikata object as the textual interpretation of the entered input sequence by additional selections of said unambiguous Conversion input, each selection of said unambiguous Conversion input selecting a Midashigo object from the identified one or more Midashigo objects in the memory associated with the selected Yomikata object, said alternate Midashigo object having a decreasing frequency of use.

13. The disambiguating system of claim 12, wherein a. a selection of any one of the plurality of inputs associated with one or more characters following one or more selections of said unambiguous Selection input is processed as the first input of a new input sequence; and b. a selection of any one of the plurality of inputs associated with one or more characters following one or more selections of said unambiguous Conversion input is processed as the first input of a new input sequence.

14. The system of claim 12, wherein one or more kana syllables are specified unambiguously by additional subsequences of one or more inputs, such that when the user selects the unambiguous Selection input following an input sequence of one or more inputs associated with one or more characters including one or more subsequences which unambiguously specify one or more kana syllables, the processor identifies from the one or more constructed Yomikata objects only those Yomikata objects which contain the same unambiguously specified one or more kana syllables in the same positions.

15. The system of claim 14 wherein the one or more kana syllables are specified unambiguously by an ordered pair of keystrokes.

16. The system of claim 14 wherein the one or more kana syllables are specified unambiguously by selecting the input with which the syllable is associated one or more times, wherein each syllable that is associated with each input is associated with a unique number of times that the input is to be selected to unambiguously generate the syllable.

17. The disambiguating system of claim 7, wherein one of the plurality of inputs is an unambiguous Selection input, wherein the user may accept the Yomikata object having the highest frequency of use as the textual interpretation of the entered input sequence by selecting said unambiguous Selection input, such that a following selection of one of the plurality of inputs associated with one or more characters is processed as the first input of a new input sequence.

18. The disambiguating system of claim 17, wherein the user may select an alternate Yomikata object as the interpretation of the input sequence by additional selections of said unambiguous Selection input, each selection of said unambiguous Selection input selecting a Yomikata object from the identified one or more Yomikata objects in the memory associated with the generated input sequence, said alternate Yomikata object having a decreasing frequency of use, and such that a selection of one of the plurality of inputs associated with one or more characters following one or more selections of said unambiguous Selection input is processed as the first input of a new input sequence.

19. The disambiguating system of claim 18, wherein each of the plurality of inputs that is associated with a plurality of characters is also associated with a numeric digit, such that each generated input sequence has a numeric textual interpretation that is composed of said numeric digits due to the numeric digit associated with each input, and wherein said numeric interpretation is included among the Yomikata objects that the user may select as the interpretation of the input sequence by additional selections of said unambiguous Selection input.

20. The disambiguating system of claim 19, wherein said numeric interpretation is presented to the user following all of the Yomikata objects that the user may select as the interpretation of the input sequence by additional selections of said unambiguous Selection input.

21. The system of claim 18 wherein one or more kana syllables to be output are specified unambiguously by additional subsequences of one or more inputs, such that when the user selects the unambiguous Selection input following an input sequence of one or more inputs associated with one or more characters including one or more subsequences which unambiguously specify one or more kana syllables, the processor identifies from the one or more constructed Yomikata objects only those Yomikata objects which contain the same unambiguously specified one or more kana syllables in the same positions.

22. The system of claim 21 wherein the one or more kana syllables are specified unambiguously by an ordered pair of keystrokes.

23. The system of claim 21 wherein the one or more kana syllables are specified unambiguously by selecting the input with which the syllable is associated one or more times, wherein each syllable that is associated with each input is associated with a unique number of times that the input is to be selected to unambiguously generate the syllable.

24. The disambiguating system of claim 7, wherein the plurality of nodes are connected by a plurality of paths, each of the plurality of paths linking a parent node associated with a base input sequence with a child node associated with the base input sequence of the parent node and an additional input.

25. The disambiguating system of claim 24, wherein the Yomikata objects associated with a child node are based on the Yomikata objects associated with the corresponding parent node to which the child node is linked.

26. The disambiguating system of claim 25, wherein the Yomikata objects associated with a child node are constructed using a code pre-stored in memory to modify Yomikata objects associated with the corresponding parent node.

27. The disambiguating system of claim 26, wherein the code used to construct Yomikata objects associated with a child node by modifying Yomikata objects associated with the corresponding parent node comprises a specification of the numerical index of the Yomikata object associated with the corresponding parent node and a specification of the numerical index of one of the characters associated with the additional input linking the parent node to the child node.

28. The disambiguating system of claim 27, wherein the code used to construct Yomikata objects associated with a child node by modifying Yomikata objects associated with the corresponding parent node further includes a specification of whether the code is the final code of the sequence of codes which create objects associated with the child node.

29. The disambiguating system of claim 27, wherein the number and identity of additional inputs which correspond to child nodes linked to a parent node is indicated in the parent node by a field of valid key bits that indicate the number and identity of said child nodes.

30. The disambiguating system of claim 29, wherein each set of one or more codes used to create the Yomikata objects associated with a child node is immediately followed by a pointer to said child node, and wherein the one or more sets of one or more codes and following pointer are placed sequentially in memory within the parent node in the same order as the valid key bits that indicate the number and identity of said child nodes.

31. The disambiguating system of claim 27, wherein the sequence of codes which create Yomikata objects associated with a child node are ordered in memory such that Yomikata objects are created in a sequence that is sorted with respect to the frequency of use of said objects.

32. The disambiguating system of claim 27, wherein the indices of the characters associated with each of the inputs are assigned sequentially to the characters in descending order of the frequency of occurrence of the characters in Yomikata objects in memory.

33. The disambiguating system of claim 32, wherein the code used to construct Yomikata objects associated with a child node by modifying Yomikata objects associated with the corresponding parent node also includes a specification of an object type associated with the constructed object associated with the child node.

34. The disambiguating system of claim 33, wherein the object type that is specified includes information regarding the part of speech of the constructed object.

35. The disambiguating system of claim 33, wherein the object type that is specified includes information regarding the inflectional endings and suffixes that may be appended to the constructed object.

36. The disambiguating system of claim 33, wherein the object type that is specified includes a code that uniquely identifies the constructed object among the objects in memory.

37. The disambiguating system of claim 33, wherein the object type that is specified includes information regarding the frequency of use of the constructed object.

38. The disambiguating system of claim 33, wherein the object type that is specified includes information regarding whether the constructed object is a completed word.

39. The disambiguating system of claim 27, wherein the indices of the characters associated with each input means are assigned sequentially to the characters in descending order of the frequency of occurrence of the characters following the immediately preceding character in the Yomikata object associated with the corresponding parent node to which the indexed character is appended to form a Yomikata object associated with the child node.

40. The disambiguating system of claim 27, wherein where two parent nodes of the tree are redundant in that all codes associated with a given input means that are present in both of said redundant parent nodes are identical in that the codes occur in the same sequence and specify the same numerical Yomikata object index and the same numerical character index, and further in that for all inputs for which child nodes are linked to each of the two redundant parent nodes said child nodes are also redundant in the same recursive sense, one of said redundant parent nodes is omitted from the tree structure in memory and the remaining redundant parent node is augmented by any codes and links to child nodes that were present only in the omitted redundant parent node.

41. The disambiguating system of claim 40, wherein one or more codes that are associated with a given input means and are present in both of said redundant parent nodes are defined as being identical when the codes specify the same numerical Yomikata object index and the same numerical character index, even when said codes occur in a different sequence in the two redundant parent nodes.

42. The disambiguating system of claim 40, wherein one or more codes that are associated with a given input means and are present in both of said redundant parent nodes are defined as being identical when the codes specify the same numerical Yomikata object index and the same numerical character index and the same object type, even when said codes occur in a different sequence in the two redundant parent nodes.

43. The disambiguating system of claim 40, wherein one or more codes used to construct Yomikata objects associated with child nodes by modifying Yomikata objects associated with the corresponding parent node also include a specification of an object type associated with the constructed Yomikata object associated with the child node, and wherein two codes are defined as being identical when they specify the same numerical Yomikata object index and the same numerical character index, wherein the code that is present in the remaining redundant parent node that is augmented by any codes and links to child nodes that were present only in the omitted redundant parent node includes the specification of all said object types that were specified in either redundant node.

44. The system of claim 27, wherein each Yomikata object constructed in each node of the tree structure in memory is associated with zero or more Midashigo objects, wherein each Midashigo object is a textual interpretation of the associated Yomikata object, and wherein each Midashigo object is comprised of a sequence of characters comprised of any combination of kanji, hiragana, katakana, symbols, letters and numbers.

45. The disambiguating system of claim 44, wherein the Midashigo objects associated with a Yomikata object in a child node are based on the Midashigo objects associated with one or more of the corresponding parent nodes of which the child node is a descendent.

46. The disambiguating system of claim 45, wherein a Midashigo object associated with a Yomikata object in a child node is constructed using a code pre-stored in memory to modify a Midashigo object associated with one of the corresponding ancestor nodes.

47. The disambiguating system of claim 46, wherein the code used to construct a Midashigo object associated with a Yomikata object in a child node by modifying a Midashigo object associated with one of the corresponding ancestor nodes comprises a specification of the number of nodes that must be traversed back up in the tree to reach the corresponding ancestor node and a specification of the numerical index of the Midashigo object associated with the Yomikata object in the corresponding ancestor node from which the Yomikata object in the child node was constructed and a specification of a numerical character code designating a kanji or other character to be appended to the specified Midashigo object in the ancestor node to construct a Midashigo object associated with the Yomikata object in the child node.

48. The disambiguating system of claim 46, wherein the code used to construct a Midashigo object associated with a Yomikata object in a child node by modifying a Midashigo object associated with one of the corresponding ancestor nodes comprises a specification of the number of nodes that must be traversed back up in the tree to reach the corresponding ancestor node and a specification of the numerical index of the Midashigo object associated with the Yomikata object in the corresponding ancestor node from which the Yomikata object in the child node was constructed and a specification that indicates that the sequence of one or more kana that is appended to the Yomikata object in the corresponding ancestor node in constructing the Yomikata object in the child node is also to be appended as hiragana to the specified Midashigo object in the ancestor node to construct a Midashigo object associated with the Yomikata object in the child node.

49. The disambiguating system of claim 46, wherein the code used to construct Midashigo objects associated with a Yomikata object in a child node by modifying Midashigo objects associated with the corresponding parent node further includes a specification of whether the code is the final code of the sequence of codes which create objects associated with the Yomikata object in the child node.

50. The disambiguating system of claim 47, wherein the code used to construct a Midashigo object associated with a Yomikata object in a child node by modifying a Midashigo object associated with one of the corresponding ancestor nodes appends a kanji character, wherein the specification of said kanji character to be appended comprises:

a. a specification of the number of nodes that must be traversed back up in the tree to reach the corresponding ancestor node;

b. a specification of the numerical index of the Midashigo object associated with the Yomikata object in the corresponding ancestor node from which the Yomikata object in the child node was constructed;

c. a specification that indicates that the sequence of one or more kana that is appended to the Yomikata object in the corresponding ancestor node in constructing the Yomikata object in the child node comprises the root Yomikata object which can be found in said tree structure starting from the root node and with which said kanji character is associated as a Midashigo object; and d. a specification of the numerical index of the Midashigo object that is associated with said root Yomikata object and that corresponds to said kanji character to be appended to construct said Midashigo object associated with a Yomikata object in a child node.

51. A disambiguating system for disambiguating ambiguous input sequences entered by a user and generating textual output in the Japanese language, the disambiguating system comprising:

a. a user input device having a plurality of inputs, each of a plurality of said plurality of inputs is associated with a plurality of romaji characters, an input sequence being generated each time an input is selected by manipulating the user input device, the generated input sequence having a textual interpretation that is ambiguous due to the plurality of characters associated with each input;

b. a memory containing data used to construct a plurality of Yomikata objects, each of the plurality of Yomikata objects associated with an input sequence and a frequency of use, wherein each of the plurality of Yomikata objects comprises a sequence of romaji characters corresponding to the kana which comprise the phonetic reading to be output to the user, said Yomikata objects including completed word and phrase objects, stem objects comprising a sequence of the romaji corresponding to the initial kana of a yet uncompleted word or phrase object, and objects that are both a completed word or phrase and a stem of a word or phrase, and wherein all word, phrase and stem objects are constructed from data stored in the memory in a tree structure comprised of a plurality of nodes, each node associated with an input sequence and with one or more Yomikata objects;

c. a display to depict system output to the user; and d. a processor coupled to the user input device, memory and display, the processor constructing the one or more Yomikata objects from the data in the memory associated with each generated input sequence and identifying at least one candidate object with the highest frequency of use, wherein said candidate object is a word or phrase object when at least one word or phrase object is associated with the generated input sequence, and wherein said candidate object is a stem object when no word or phrase object is associated with the generated input sequence, and generating an output signal causing the display to display the at least one identified candidate object associated with each generated input sequence as a textual interpretation of the generated input sequence.

52. The system of claim 51, wherein each Yomikata object in the tree structure in memory is associated with one or more Midashigo objects, wherein each Midashigo object is a textual interpretation of the associated Yomikata object, and wherein each Midashigo object is comprised of a sequence of characters comprised of any combination of kanji, hiragana, katakana, symbols, letters and numbers.

53. The disambiguating system of claim 52, wherein a. one of the plurality of inputs is an unambiguous Selection input, wherein the user may accept the Yomikata object having the highest frequency of use as the textual interpretation of the entered input sequence by selecting said unambiguous Selection input;

b. the user may select an alternate Yomikata object as the interpretation of the input sequence by additional selections of said unambiguous Selection input, each selection of said unambiguous Selection input selecting a Yomikata object from the identified one or more Yomikata objects in the memory associated with the generated input sequence, said alternate Yomikata object having a decreasing frequency of use;

c. one of the plurality of inputs is an unambiguous Conversion input, wherein the user may select the Midashigo object having the highest frequency of use associated with the Yomikata object having the highest frequency of use as the textual interpretation of the entered input sequence by selecting said unambiguous Conversion input;

d. the user may select an alternate Midashigo object associated with the Yomikata object having the highest frequency of use as the textual interpretation of the entered input sequence by additional selections of said unambiguous Conversion input, each selection of said unambiguous Conversion input selecting a Midashigo object from the identified one or more Midashigo objects in the memory associated with the Yomikata object having the highest frequency of use, said alternate Midashigo object having a decreasing frequency of use;

e. after the user has selected an alternate Yomikata object as the interpretation of the input sequence by additional selections of said unambiguous Selection input, the user may select the Midashigo object having the highest frequency of use associated with said selected Yomikata object as the textual interpretation of the entered input sequence by selecting said unambiguous Conversion input; and f. after the user has selected an alternate Yomikata object as the interpretation of the input sequence by additional selections of said unambiguous Selection input, the user may select an alternate Midashigo object associated with said selected Yomikata object as the textual interpretation of the entered input sequence by additional selections of said unambiguous Conversion input, each selection of said unambiguous Conversion input selecting a Midashigo object from the identified one or more Midashigo objects in the memory associated with the selected Yomikata object, said alternate Midashigo object having a decreasing frequency of use.

54. The disambiguating system of claim 53, wherein a. a selection of any one of the plurality of inputs associated with one or more romaji characters following one or more selections of said unambiguous Selection input is processed as the first input of a new input sequence; and b. a selection of any one of the plurality of inputs associated with one or more romaji characters following one or more selections of said unambiguous Conversion input is processed as the first input of a new input sequence.

55. A disambiguating system for disambiguating ambiguous input sequences entered by a user and generating textual output in the Japanese language, the disambiguating system comprising:

a. a user input device having a plurality of inputs, each of the plurality of inputs is associated with a plurality of characters, an input sequence being generated each time an input is selected by manipulating the user input device, the generated input sequence having a textual interpretation that is ambiguous due to the plurality of characters associated with said inputs;

b. a memory containing data used to construct a plurality of Yomikata objects, each of the plurality of Yomikata objects associated with an input sequence and a frequency of use, wherein each of the plurality of Yomikata objects comprises a sequence of kana which corresponds to the phonetic reading to be output to the user, said Yomikata objects including completed word and phrase objects, stem objects comprising a sequence of the initial kana of a yet uncompleted word or phrase object, and objects that are both a completed word or phrase and a stem of a word or phrase, and wherein all word, phrase and stem objects are constructed from data stored in the memory in a tree structure comprised of a plurality of nodes, each node associated with an input sequence and with one or more Yomikata objects;

c. a display to depict system output to the user; and d. a processor coupled to the user input device, memory and display, the processor constructing the one or more Yomikata objects from the data in the memory associated with each generated input sequence and identifying at least one candidate object with the highest frequency of use, wherein said candidate object is a word or phrase object when at least one word or phrase object is associated with the generated input sequence, and wherein said candidate object is a stem object when no word or phrase object is associated with the generated input sequence, and generating an output signal causing the display to display the at least one identified candidate object associated with each generated input sequence as a textual interpretation of the generated input sequence;

wherein one or more Yomikata object in the tree structure in memory is associated with one or more Midashigo objects, wherein each Midashigo object is a textual interpretation of the associated Yomikata object, and wherein each Midashigo object is comprised of a sequence of characters comprised of any combination of kanji, hiragana katakana, symbols, letters and numbers, and wherein each Midashigo object is associated with a frequency of use;

and wherein aa. one of the plurality of inputs is an—unambiguous Selection input, wherein the user may accept the Yomikata object having the highest frequency of use as the textual interpretation of the entered input sequence by selecting said unambiguous Selection input;

bb. the user may select an alternate Yomikata object as the interpretation of the input sequence by additional selections of said unambiguous Selection input, each selection of said unambiguous Selection input selecting a Yomikata object from the identified one or more Yomikata objects in the memory associated with the generated input sequence, said alternate Yomikata object having a decreasing frequency of use;

cc. one of the plurality of inputs is an unambiguous Conversion input, wherein the user may select the Midashigo object having the highest frequency of use associated with the Yomikata object having the highest frequency of use as the textual interpretation of the entered input sequence by selecting said unambiguous Conversion input;

dd. the user may select an alternate Midashigo object associated with the Yomikata object having the highest frequency of use as the textual interpretation of the entered input sequence by additional selections of said unambiguous Conversion input, each selection of said unambiguous Conversion input selecting a Midashigo object from the identified one or more Midashigo objects in the memory associated with the Yomikata object having the highest frequency of use, said alternate Midashigo object having a decreasing frequency of use;

ee. after the user has selected an alternate Yomikata object as the interpretation of the input sequence by additional selections of said unambiguous Selection input, the user may select the Midashigo object having the highest frequency of use associated with said selected Yomikata object as the textual interpretation of the entered input sequence by selecting said unambiguous Conversion input; and ff. after the user has selected an alternate Yomikata object as the interpretation of the input sequence by additional selections of said unambiguous Selection input, the user may select an alternate Midashigo object associated with said selected Yomikata object as the textual interpretation of the entered input sequence by additional selections of said unambiguous Conversion input, each selection of said unambiguous Conversion input selecting a Midashigo object from the identified one or more Midashigo objects in the memory associated with the selected Yomikata object, said alternate Midashigo object having a decreasing frequency of use;

and wherein each Yomikata object in the tree structure in memory is associated with one or more Midashigo objects, and wherein each Midashigo object is comprised of a sequence of characters comprised of any combination of kanji, hiragana, katakana, symbols, letters and numbers, and wherein a corresponding katakana-only Midashigo object comprised only of katakana is generated by the processor for each Yomikata object, and wherein said katakana-only Midashigo object is included among the Midashigo objects that the user may select as the interpretation of the input sequence by additional selections of said unambiguous Conversion input.

56. The disambiguating system of claim 55, wherein said katakana-only Midashigo object is presented to the user following all of the Midashigo objects that the user may select as the interpretation of the input sequence by additional selection of said unambiguous Conversion input.

* * * * *